(12) United States Patent
Vermeer et al.

(10) Patent No.: US 8,678,805 B2
(45) Date of Patent: Mar. 25, 2014

(54) SYSTEM AND METHOD FOR LAYERWISE PRODUCTION OF A TANGIBLE OBJECT

(75) Inventors: Adrianus Johannes Petrus Maria Vermeer, Geldrop (NL); Herman Hendrikus Maalderink, Nuenen (NL); Jacobus Hubertus Theodoor Jamar, Vessem (NL); Andries Rijfers, Kamerik (NL); Mark Herman Else Vaes, Eindhoven (NL); Brian Bauman, Liberty Hill, TX (US); Richard Thomas, Sleepy Hollow, IL (US)

(73) Assignee: DSM IP Assets BV, Te Heerlen (NL)

( * ) Notice: Subject to any disclaimer, the term of this patent is extended or adjusted under 35 U.S.C. 154(b) by 0 days.

(21) Appl. No.: 13/365,028

(22) Filed: Feb. 2, 2012

(65) Prior Publication Data

US 2012/0313294 A1 Dec. 13, 2012

Related U.S. Application Data

(63) Continuation of application No. 13/166,674, filed on Jun. 22, 2011, now abandoned, which is a continuation-in-part of application No. 13/141,360, filed as application No. PCT/NL2009/050783 on Dec. 18, 2009.

(30) Foreign Application Priority Data

Dec. 22, 2008 (EP) .................................... 08172644
Jul. 7, 2009 (EP) .................................... 09164821

(51) Int. Cl.
*B28B 17/00* (2006.01)

(52) U.S. Cl.
USPC ........ 425/174.4; 425/115; 425/375; 264/446; 264/494

(58) Field of Classification Search
USPC ................ 425/115, 174.4, 375; 264/446, 494
See application file for complete search history.

(56) References Cited

U.S. PATENT DOCUMENTS

| 3,545,997 | A | 12/1970 | Hochberg |
| 4,575,330 | A | 3/1986 | Hull |

(Continued)

FOREIGN PATENT DOCUMENTS

| DE | 102006019860 | 11/2006 |
| EP | 0466422 | 1/1992 |

(Continued)

OTHER PUBLICATIONS

International Search Report and Written Opinion mailed Feb. 15, 2010 (PCT/NL2009/050783); ISA/EP.

(Continued)

*Primary Examiner* — Joseph S Del Sole
*Assistant Examiner* — David N Brown, II
(74) *Attorney, Agent, or Firm* — Banner & Witcoff, Ltd.

(57) ABSTRACT

A system and method for layer-by-layer production of an object is provided. The system includes a construction shape having a carrying surface adapted for carrying a layer of build material, a plate having a holding surface adapted for holding an object in an object build area, a moveable reservoir having a plurality of containment surfaces defining a containment area adapted for containing a volume of build material within the moveable reservoir, and an exposure unit adapted for exposing at least a portion of the layer of build material in the object build area so that the portion of the layer of build material solidifies to form a solidified layer of the object.

19 Claims, 31 Drawing Sheets

(56) References Cited

U.S. PATENT DOCUMENTS

| | | |
|---|---|---|
| 4,752,498 A | 6/1988 | Fudim |
| 4,801,477 A | 1/1989 | Fudim |
| 4,929,402 A | 5/1990 | Hull |
| 4,996,010 A | 2/1991 | Modrek |
| 4,999,143 A | 3/1991 | Hull et al. |
| 5,015,424 A | 5/1991 | Smalley |
| 5,058,988 A | 10/1991 | Spence |
| 5,059,359 A | 10/1991 | Hull et al. |
| 5,071,337 A | 12/1991 | Heller et al. |
| 5,076,974 A | 12/1991 | Modrek et al. |
| 5,096,530 A | 3/1992 | Cohen |
| 5,104,592 A | 4/1992 | Hull et al. |
| 5,130,064 A | 7/1992 | Smalley et al. |
| 5,133,987 A | 7/1992 | Spence et al. |
| 5,135,379 A | 8/1992 | Fudim |
| 5,137,662 A | 8/1992 | Hull et al. |
| 5,141,680 A | 8/1992 | Almquist et al. |
| 5,143,663 A | 9/1992 | Leyden et al. |
| 5,143,817 A | 9/1992 | Lawton et al. |
| 5,164,128 A | 11/1992 | Modrek et al. |
| 5,171,490 A | 12/1992 | Fudim |
| 5,174,931 A | 12/1992 | Almquist et al. |
| 5,174,943 A | 12/1992 | Hull |
| 5,182,055 A | 1/1993 | Allison et al. |
| 5,182,056 A | 1/1993 | Spence et al. |
| 5,182,715 A | 1/1993 | Vorgitch et al. |
| 5,184,307 A | 2/1993 | Hull et al. |
| 5,192,469 A | 3/1993 | Smalley et al. |
| 5,192,559 A * | 3/1993 | Hull et al. ............ 425/89 |
| 5,209,878 A | 5/1993 | Smalley et al. |
| 5,234,636 A | 8/1993 | Hull et al. |
| 5,236,637 A | 8/1993 | Hull |
| 5,238,639 A | 8/1993 | Vinson et al. |
| 5,248,456 A | 9/1993 | Evans, Jr. et al. |
| 5,256,340 A | 10/1993 | Allison et al. |
| 5,258,146 A | 11/1993 | Almquist et al. |
| 5,267,013 A | 11/1993 | Spence |
| 5,273,691 A | 12/1993 | Hull et al. |
| 5,306,446 A | 4/1994 | Howe |
| 5,321,622 A | 6/1994 | Snead et al. |
| 5,344,298 A | 9/1994 | Hull |
| 5,345,391 A | 9/1994 | Hull et al. |
| 5,358,673 A | 10/1994 | Heller et al. |
| 5,447,822 A | 9/1995 | Hull et al. |
| 5,481,470 A | 1/1996 | Snead et al. |
| 5,495,328 A | 2/1996 | Spence et al. |
| 5,501,824 A | 3/1996 | Almquist et al. |
| 5,529,473 A | 6/1996 | Lawton et al. |
| 5,554,336 A | 9/1996 | Hull |
| 5,556,590 A | 9/1996 | Hull |
| 5,569,349 A | 10/1996 | Almquist et al. |
| 5,569,431 A | 10/1996 | Hull |
| 5,571,471 A | 11/1996 | Hull |
| 5,573,722 A | 11/1996 | Hull |
| 5,597,520 A | 1/1997 | Smalley et al. |
| 5,598,340 A | 1/1997 | Medard et al. |
| 5,609,812 A | 3/1997 | Childers et al. |
| 5,609,813 A | 3/1997 | Allison et al. |
| 5,610,824 A | 3/1997 | Vinson et al. |
| 5,611,880 A | 3/1997 | Onishi |
| 5,630,981 A | 5/1997 | Hull |
| 5,637,169 A | 6/1997 | Hull et al. |
| 5,650,260 A | 7/1997 | Onishi |
| 5,651,934 A | 7/1997 | Almquist et al. |
| 5,667,820 A | 9/1997 | Heller et al. |
| 5,672,312 A | 9/1997 | Almquist et al. |
| 5,676,904 A | 10/1997 | Almquist et al. |
| 5,688,464 A | 11/1997 | Jacobs et al. |
| 5,693,144 A | 12/1997 | Jacobs et al. |
| 5,695,707 A | 12/1997 | Almquist et al. |
| 5,711,911 A | 1/1998 | Hull |
| 5,762,856 A | 6/1998 | Hull |
| 5,776,409 A | 7/1998 | Almquist et al. |
| 5,779,967 A | 7/1998 | Hull |
| 5,785,918 A | 7/1998 | Hull |
| 5,814,265 A | 9/1998 | Hull |
| 5,840,239 A | 11/1998 | Partanen et al. |
| 5,854,748 A | 12/1998 | Snead et al. |
| 5,855,718 A | 1/1999 | Nguyen et al. |
| 5,855,836 A | 1/1999 | Leyden et al. |
| 5,870,307 A | 2/1999 | Hull et al. |
| 5,885,511 A | 3/1999 | Heller et al. |
| 5,891,382 A | 4/1999 | Almquist et al. |
| 5,902,537 A | 5/1999 | Almquist et al. |
| 5,902,538 A | 5/1999 | Kruger et al. |
| 5,936,861 A | 8/1999 | Jang et al. |
| 5,943,235 A | 8/1999 | Earl et al. |
| 5,945,058 A | 8/1999 | Manners et al. |
| 5,965,079 A | 10/1999 | Manners |
| 5,989,476 A | 11/1999 | Lockard et al. |
| 5,989,679 A | 11/1999 | Sauerhoefer |
| 5,999,184 A | 12/1999 | Smalley et al. |
| 6,001,297 A | 12/1999 | Partanen et al. |
| 6,027,324 A | 2/2000 | Hull |
| 6,027,682 A | 2/2000 | Almquist et al. |
| 6,029,096 A | 2/2000 | Manners et al. |
| 6,036,911 A | 3/2000 | Allison et al. |
| 6,048,487 A | 4/2000 | Almquist et al. |
| 6,084,980 A | 7/2000 | Nguyen et al. |
| 6,103,176 A | 8/2000 | Nguyen et al. |
| 6,107,008 A | 8/2000 | Howell et al. |
| 6,110,602 A | 8/2000 | Dickens et al. |
| 6,132,665 A | 10/2000 | Bui et al. |
| 6,133,353 A | 10/2000 | Bui et al. |
| 6,133,355 A | 10/2000 | Leyden et al. |
| 6,157,663 A | 12/2000 | Wu et al. |
| 6,172,996 B1 | 1/2001 | Partanen et al. |
| 6,179,601 B1 | 1/2001 | Kruger et al. |
| 6,180,050 B1 | 1/2001 | Arai et al. |
| 6,193,923 B1 | 2/2001 | Leyden et al. |
| 6,200,514 B1 | 3/2001 | Meister |
| 6,215,095 B1 | 4/2001 | Partanen et al. |
| 6,261,506 B1 | 7/2001 | Nguyen et al. |
| 6,261,507 B1 | 7/2001 | Gigl et al. |
| 6,264,873 B1 | 7/2001 | Gigl et al. |
| 6,270,335 B2 | 8/2001 | Leyden et al. |
| 6,309,581 B1 | 10/2001 | Gervasi |
| 6,333,741 B1 | 12/2001 | Snead et al. |
| 6,347,101 B1 | 2/2002 | Wu et al. |
| 6,366,825 B1 | 4/2002 | Smalley et al. |
| 6,395,811 B1 | 5/2002 | Nguyen et al. |
| 6,397,922 B1 | 6/2002 | Sachs et al. |
| 6,399,010 B1 | 6/2002 | Guertin et al. |
| 6,406,531 B1 | 6/2002 | Bui et al. |
| 6,409,902 B1 | 6/2002 | Yang et al. |
| 6,500,378 B1 | 12/2002 | Smith |
| 6,508,971 B2 | 1/2003 | Leyden et al. |
| 6,528,613 B1 | 3/2003 | Bui et al. |
| 6,529,265 B1 | 3/2003 | Henningsen |
| 6,532,394 B1 | 3/2003 | Earl et al. |
| 6,547,552 B1 | 4/2003 | Fudim |
| 6,558,606 B1 | 5/2003 | Kulkarni et al. |
| 6,564,852 B1 | 5/2003 | Wendt et al. |
| 6,600,965 B1 | 7/2003 | Hull et al. |
| 6,622,062 B1 | 9/2003 | Earl et al. |
| 6,627,376 B1 | 9/2003 | Ueno |
| 6,629,559 B2 | 10/2003 | Sachs et al. |
| 6,630,009 B2 | 10/2003 | Moussa et al. |
| 6,641,897 B2 | 11/2003 | Gervasi |
| 6,660,209 B2 | 12/2003 | Leyden et al. |
| 6,699,424 B2 | 3/2004 | Nguyen et al. |
| 6,752,948 B2 | 6/2004 | Newell et al. |
| 6,771,226 B1 | 8/2004 | Dujmovic |
| 6,797,351 B2 | 9/2004 | Kulkarni et al. |
| 6,814,926 B2 | 11/2004 | Geving et al. |
| 6,825,433 B2 | 11/2004 | Wright et al. |
| 6,833,231 B2 | 12/2004 | Moussa et al. |
| 6,841,116 B2 | 1/2005 | Schmidt |
| 6,841,589 B2 | 1/2005 | Schmidt et al. |
| 6,855,482 B2 | 2/2005 | McLean et al. |
| 6,902,246 B2 | 6/2005 | Varnon et al. |
| 6,915,178 B2 | 7/2005 | O'Brien et al. |
| 6,916,441 B2 | 7/2005 | Newell et al. |
| 6,927,018 B2 | 8/2005 | Burgess |

(56) References Cited

U.S. PATENT DOCUMENTS

| | | |
|---|---|---|
| 6,932,145 B2 | 8/2005 | Frasier et al. |
| 6,936,212 B1 | 8/2005 | Crawford |
| 6,974,656 B2 | 12/2005 | Hinczewski |
| 6,989,225 B2 | 1/2006 | Steinmann |
| 7,052,263 B2 | 5/2006 | John |
| 7,074,029 B2 | 7/2006 | Stockwell et al. |
| 7,077,638 B2 | 7/2006 | Leyden et al. |
| 7,090,484 B2 | 8/2006 | Ueno |
| 7,125,649 B2 | 10/2006 | McLean et al. |
| 7,128,866 B1 | 10/2006 | Henningsen |
| 7,137,801 B2 | 11/2006 | Ueno |
| 7,153,135 B1 | 12/2006 | Thomas |
| 7,176,253 B2 | 2/2007 | Xu et al. |
| 7,195,472 B2 | 3/2007 | John |
| 7,270,528 B2 | 9/2007 | Sherwood |
| 7,271,877 B2 | 9/2007 | Fries |
| 7,285,237 B2 | 10/2007 | Newell et al. |
| 7,318,718 B2 | 1/2008 | Ueno |
| 7,327,377 B2 | 2/2008 | Matsumoto |
| 7,358,283 B2 | 4/2008 | Xu |
| 7,378,460 B2 | 5/2008 | Schmidt et al. |
| 7,399,796 B2 | 7/2008 | Xu et al. |
| 7,402,273 B2 | 7/2008 | Sherwood |
| 7,438,846 B2 | 10/2008 | John |
| 7,467,939 B2 | 12/2008 | Sperry et al. |
| 7,520,740 B2 | 4/2009 | Wahlstrom et al. |
| 7,585,450 B2 | 9/2009 | Wahlstrom et al. |
| 7,614,866 B2 | 11/2009 | Sperry et al. |
| 7,621,733 B2 | 11/2009 | Reynolds et al. |
| 7,636,610 B2 | 12/2009 | Schillen et al. |
| 7,690,909 B2 | 4/2010 | Wahlstrom |
| 7,706,910 B2 | 4/2010 | Hull et al. |
| 7,731,887 B2 | 6/2010 | Hull et al. |
| 7,771,183 B2 | 8/2010 | Hull et al. |
| 7,845,930 B2 | 12/2010 | Shkolnik et al. |
| 7,892,474 B2 | 2/2011 | Shkolnik et al. |
| 7,894,921 B2 | 2/2011 | John et al. |
| 7,931,851 B2 | 4/2011 | Ueno |
| 8,003,039 B2 | 8/2011 | Sperry et al. |
| 2001/0025203 A1 | 9/2001 | Gervasi |
| 2001/0048183 A1* | 12/2001 | Fujita ........................... 264/401 |
| 2002/0013636 A1 | 1/2002 | O'Brien et al. |
| 2002/0157799 A1 | 10/2002 | Sachs et al. |
| 2003/0062145 A1 | 4/2003 | Frasier et al. |
| 2003/0082487 A1 | 5/2003 | Burgess |
| 2003/0189028 A1 | 10/2003 | Wright et al. |
| 2003/0190472 A1 | 10/2003 | Moussa |
| 2004/0094870 A1 | 5/2004 | Ueno |
| 2004/0134250 A1 | 7/2004 | Durney et al. |
| 2004/0137368 A1 | 7/2004 | Steinmann |
| 2004/0170923 A1 | 9/2004 | Steinmann et al. |
| 2004/0182202 A1 | 9/2004 | Geving et al. |
| 2004/0226405 A1 | 11/2004 | Geving et al. |
| 2004/0229002 A1 | 11/2004 | Davis et al. |
| 2005/0040562 A1 | 2/2005 | Steinmann et al. |
| 2005/0208168 A1 | 9/2005 | Hickerson |
| 2006/0046010 A1 | 3/2006 | Davis et al. |
| 2006/0078638 A1 | 4/2006 | Holmboe et al. |
| 2006/0239588 A1 | 10/2006 | Hull et al. |
| 2006/0249884 A1 | 11/2006 | Partanen et al. |
| 2006/0267252 A1 | 11/2006 | Steinmann et al. |
| 2007/0019174 A1 | 1/2007 | Tinnemans et al. |
| 2007/0063366 A1 | 3/2007 | Cunningham et al. |
| 2007/0071902 A1 | 3/2007 | Dietrich et al. |
| 2007/0074659 A1 | 4/2007 | Wahlstrom |
| 2007/0075461 A1 | 4/2007 | Hunter et al. |
| 2007/0077323 A1 | 4/2007 | Stonesmith et al. |
| 2007/0257055 A1 | 11/2007 | Scott et al. |
| 2008/0054531 A1 | 3/2008 | Kerekes et al. |
| 2008/0113293 A1 | 5/2008 | Shkolnik et al. |
| 2008/0169586 A1 | 7/2008 | Hull et al. |
| 2008/0171284 A1 | 7/2008 | Hull et al. |
| 2008/0179786 A1 | 7/2008 | Sperry et al. |
| 2008/0179787 A1 | 7/2008 | Sperry et al. |
| 2008/0180515 A1 | 7/2008 | Nomura et al. |
| 2008/0181977 A1 | 7/2008 | Sperry et al. |
| 2008/0206383 A1 | 8/2008 | Hull et al. |
| 2008/0217818 A1 | 9/2008 | Holmboe et al. |
| 2008/0226346 A1 | 9/2008 | Hull et al. |
| 2008/0231731 A1 | 9/2008 | Hull et al. |
| 2008/0259228 A1 | 10/2008 | Henningsen |
| 2008/0259306 A1 | 10/2008 | Henningsen |
| 2008/0315461 A1 | 12/2008 | Henningsen |
| 2009/0267269 A1 | 10/2009 | Lim et al. |
| 2011/0272857 A1 | 11/2011 | Sperry et al. |

FOREIGN PATENT DOCUMENTS

| | | |
|---|---|---|
| EP | 0748684 | 12/1996 |
| EP | 0787547 | 8/1997 |
| EP | 0958912 | 11/1999 |
| EP | 1025981 | 8/2000 |
| EP | 1025981 A2 | 8/2000 |
| EP | 1250997 | 10/2002 |
| EP | 1354658 | 10/2003 |
| EP | 1482684 | 12/2004 |
| EP | 1719607 | 11/2006 |
| EP | 1719607 A1 | 11/2006 |
| EP | 1733866 | 12/2006 |
| EP | 1849586 | 10/2007 |
| EP | 1849587 | 10/2007 |
| EP | 1852243 | 11/2007 |
| EP | 1852244 | 11/2007 |
| EP | 1880830 | 1/2008 |
| EP | 1894705 | 3/2008 |
| EP | 1935620 | 6/2008 |
| EP | 1946907 | 7/2008 |
| EP | 1946908 | 7/2008 |
| EP | 1950032 | 7/2008 |
| EP | 1982824 | 10/2008 |
| EP | 2011631 | 1/2009 |
| EP | 2075110 | 7/2009 |
| EP | 2075110 A1 | 7/2009 |
| EP | 2199067 | 6/2010 |
| GB | 2309658 | 8/1997 |
| GB | 2348393 | 10/2000 |
| JP | 57176721 | 10/1982 |
| JP | 2001205708 | 7/2001 |
| KR | 20040022725 | 3/2004 |
| KR | 20040100320 | 12/2004 |
| KR | 20040100321 | 12/2004 |
| KR | 100531688 | 11/2005 |
| KR | 100930788 | 12/2009 |
| KR | 20100080298 | 7/2010 |
| KR | 101006414 | 1/2011 |
| WO | 8806494 | 9/1988 |
| WO | 8910254 | 11/1989 |
| WO | 9110211 | 7/1991 |
| WO | 9847042 | 10/1998 |
| WO | 9847048 | 10/1998 |
| WO | 9939889 | 8/1999 |
| WO | 0021735 | 4/2000 |
| WO | 00/30834 A1 | 6/2000 |
| WO | 0030834 | 6/2000 |
| WO | 0051761 | 9/2000 |
| WO | 0057253 | 9/2000 |
| WO | 01/40866 A2 | 6/2001 |
| WO | 0140866 | 6/2001 |
| WO | 0189738 | 11/2001 |
| WO | 2004028937 | 4/2004 |
| WO | 2004108588 | 12/2004 |
| WO | 2005110721 | 11/2005 |
| WO | 2006110489 | 10/2006 |
| WO | 2006122564 | 11/2006 |
| WO | 2008004872 | 1/2008 |
| WO | 2008007956 | 1/2008 |
| WO | 2008010708 | 1/2008 |
| WO | 2008010715 | 1/2008 |
| WO | 2008055533 | 5/2008 |
| WO | 2008088637 | 7/2008 |
| WO | 2008088638 | 7/2008 |
| WO | 2008088639 | 7/2008 |
| WO | 2008088640 | 7/2008 |
| WO | 2008088641 | 7/2008 |

(56) References Cited

FOREIGN PATENT DOCUMENTS

| WO | 2008088642 | 7/2008 |
|---|---|---|
| WO | 2009084957 | 7/2009 |
| WO | 2009102200 | 8/2009 |
| WO | 2009132245 | 10/2009 |
| WO | 2010074566 | 7/2010 |
| WO | 2010087708 | 8/2010 |
| WO | 2010101465 | 9/2010 |
| WO | 2010101466 | 9/2010 |

OTHER PUBLICATIONS

Kaneko, Y., et al. "UV Exposure System for Photolithography and Rapid Prototyping Using DMD Projector", Department of Electrical and Electronic Systems, Faculty of Engineering, Saitama University, 2001, 4 pages.

International Search Report and Written Opinion in related International PCT Application No. PCT/NL2009/050783; mailed Feb. 15, 2010.

Carima Article retrieved from the Internet http://www.carima.com on Apr. 25, 2012, 1 page.

Avingnews.network Article, Special Report on "Ceatec Japan 2009" retrieved from the Internet http://news.nate.com/view/20091012n20947 on Apr. 25, 2012, 4 pages.

Avingnews.network Article retrieved from the Internet http://news.nate.com/view/20090414n17941 on Apr. 25, 2012, 4 pages.

* cited by examiner

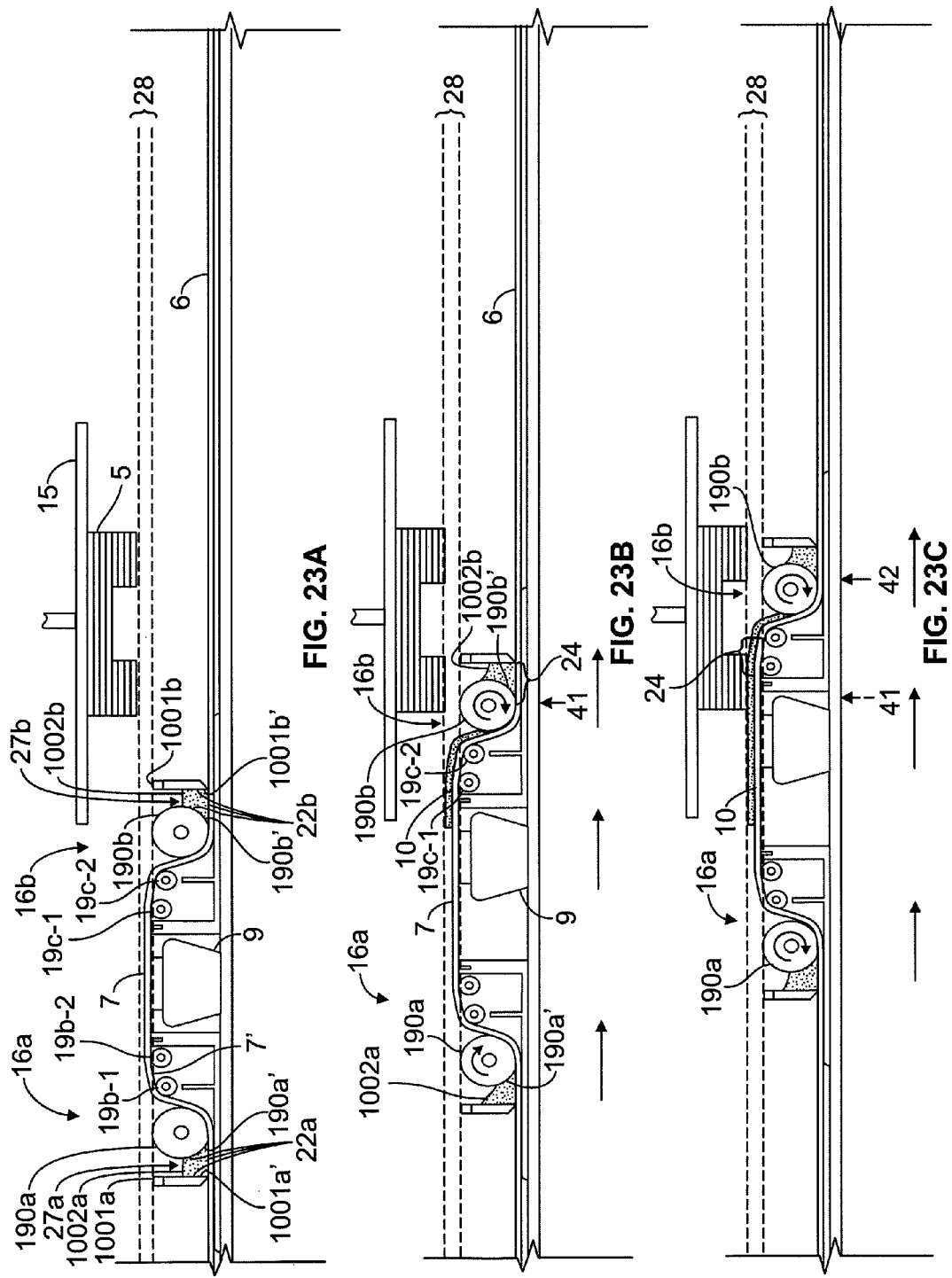

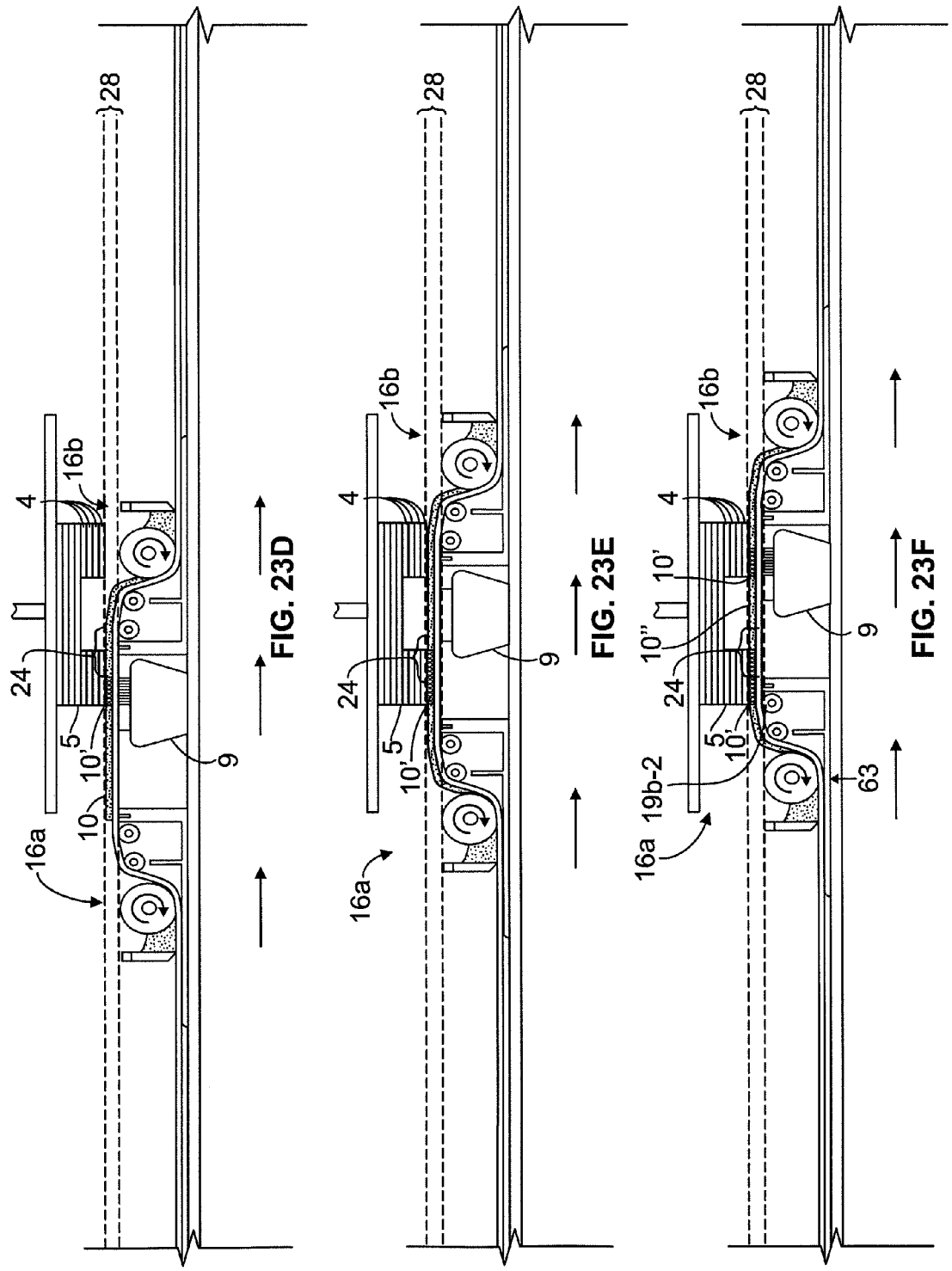

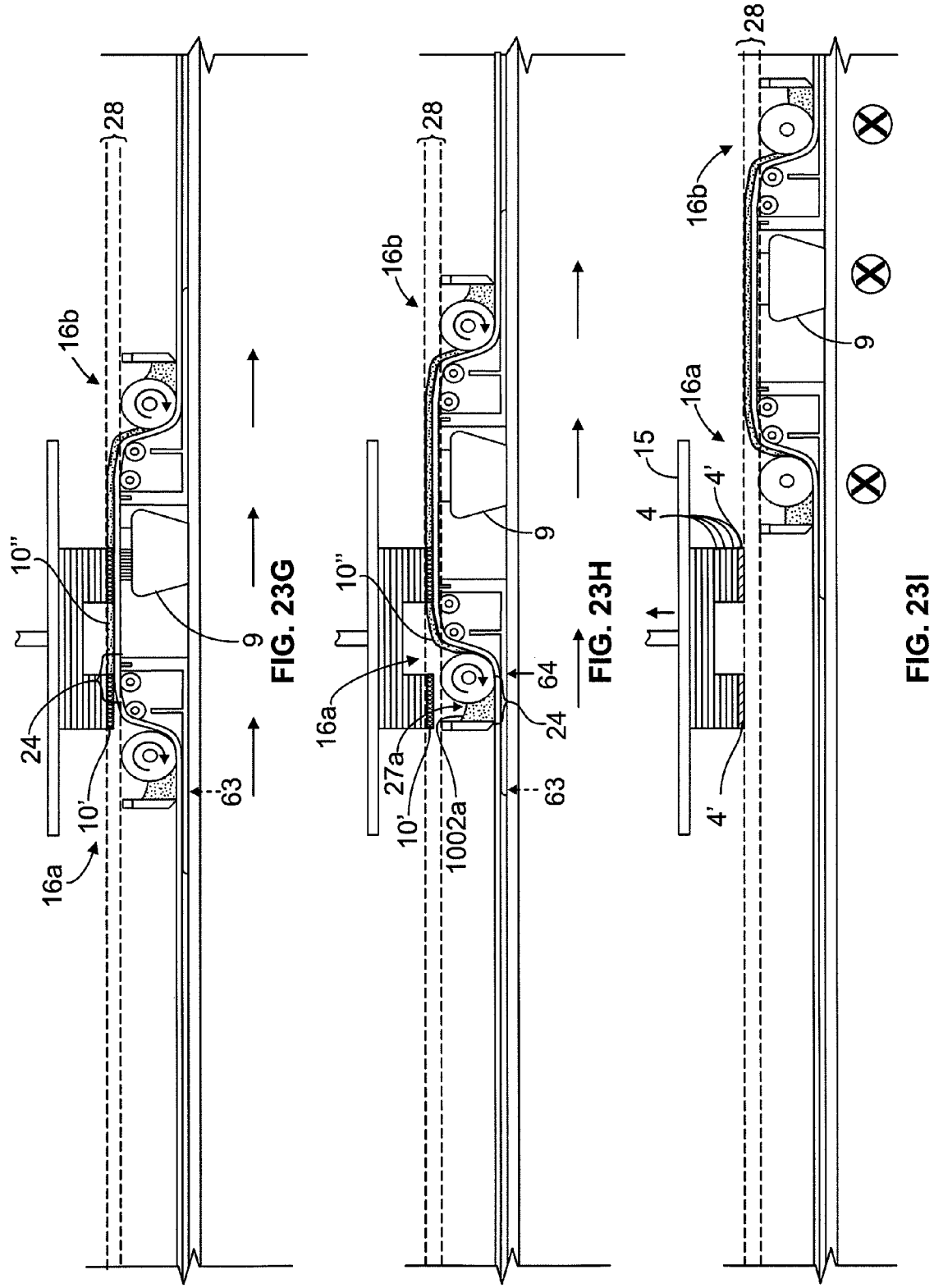

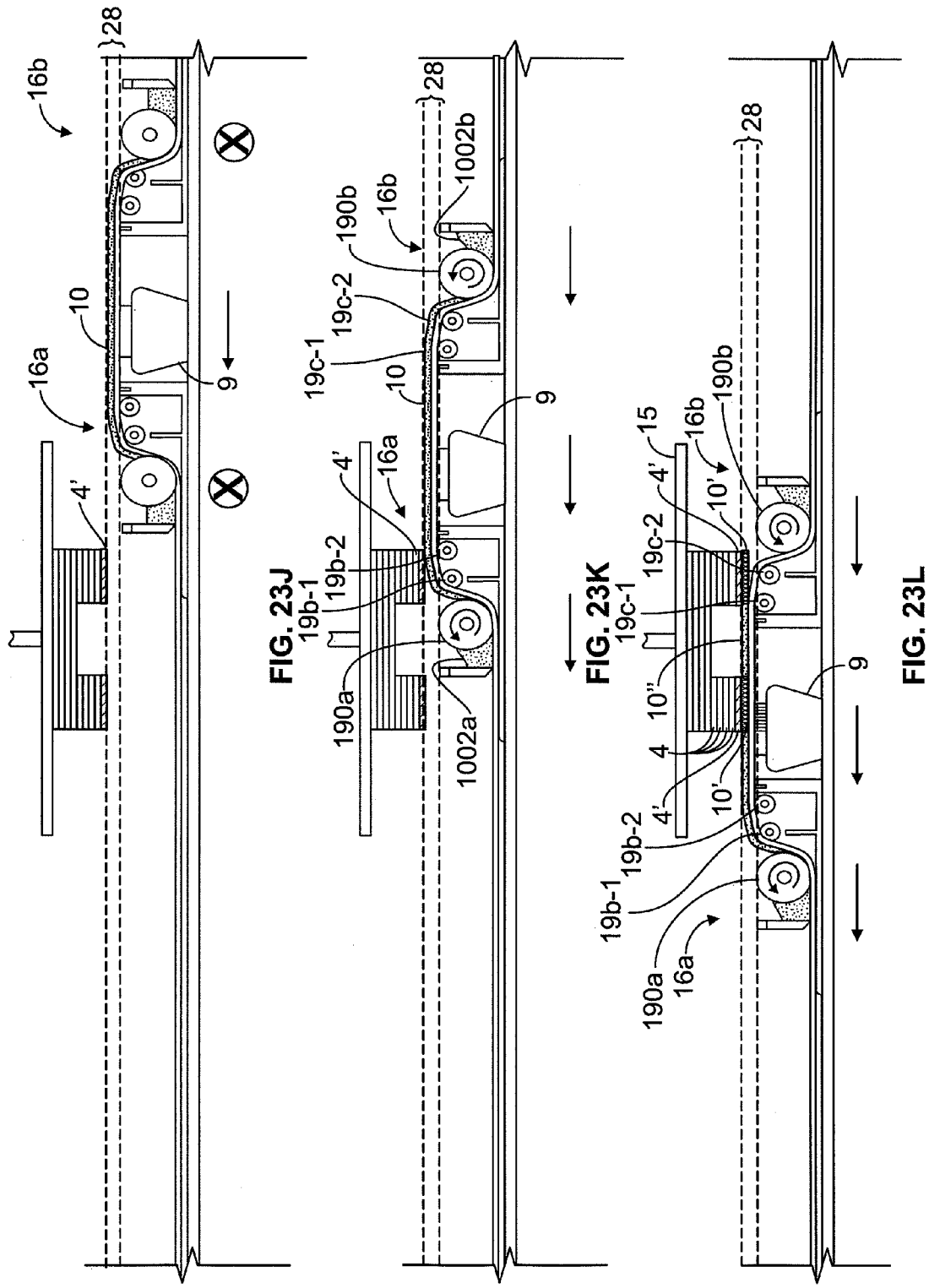

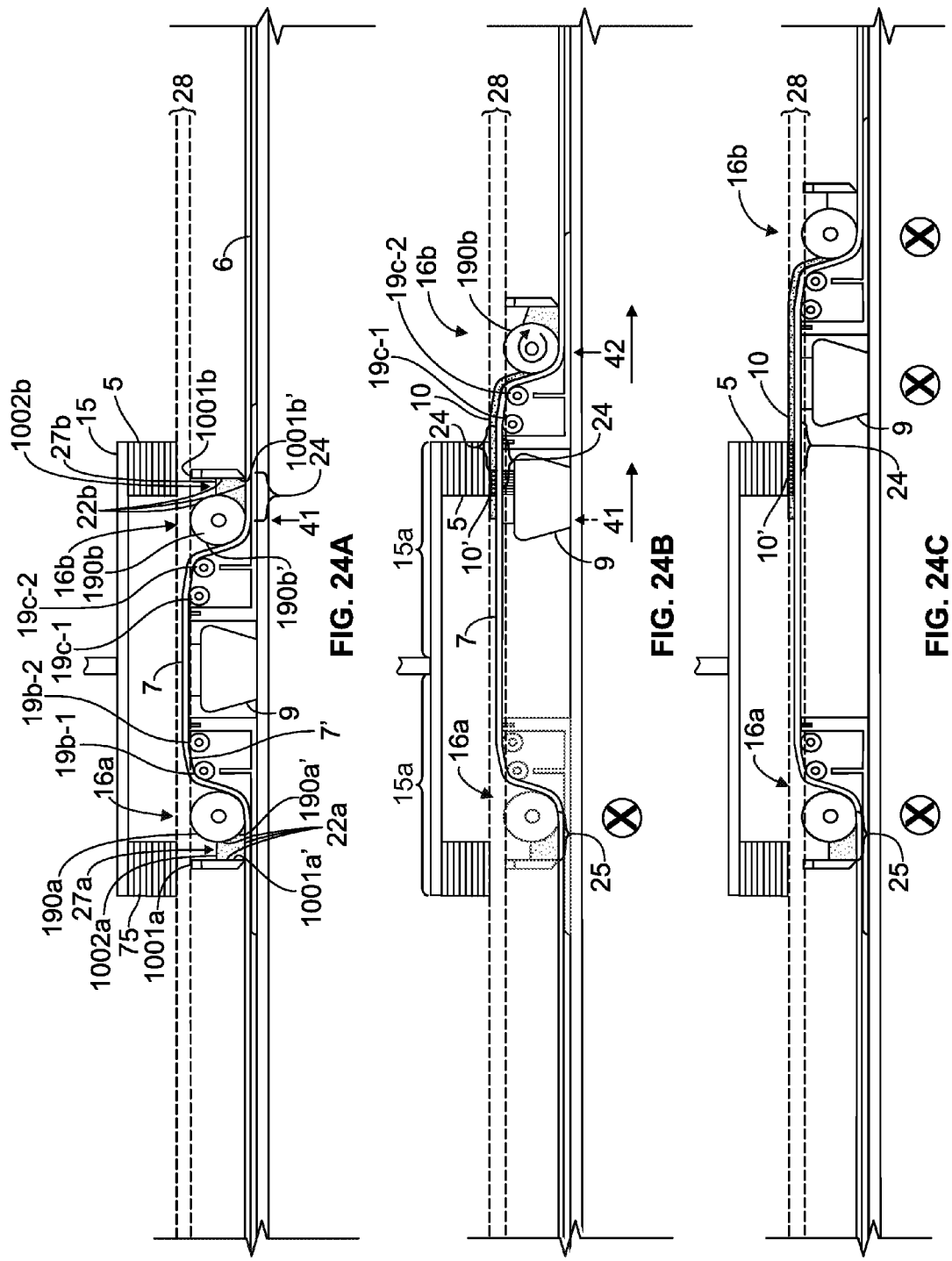

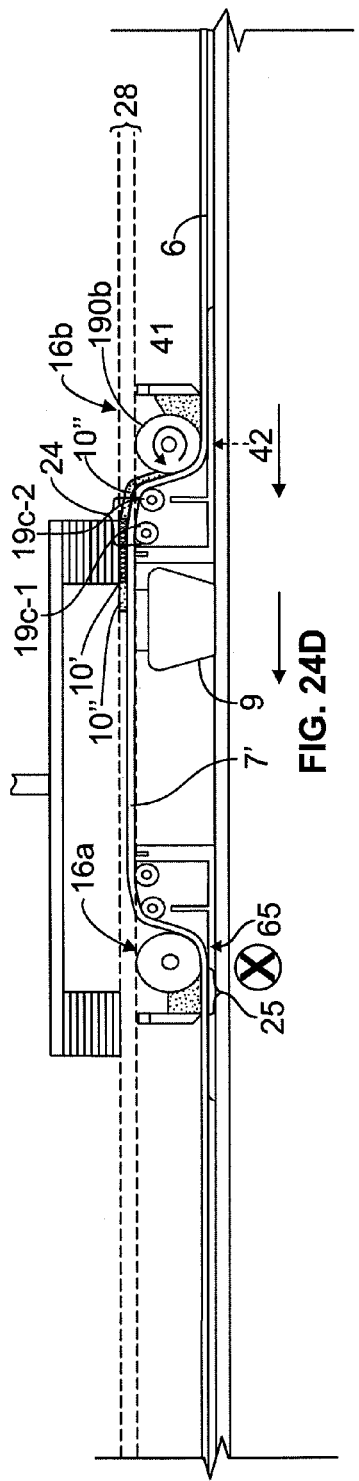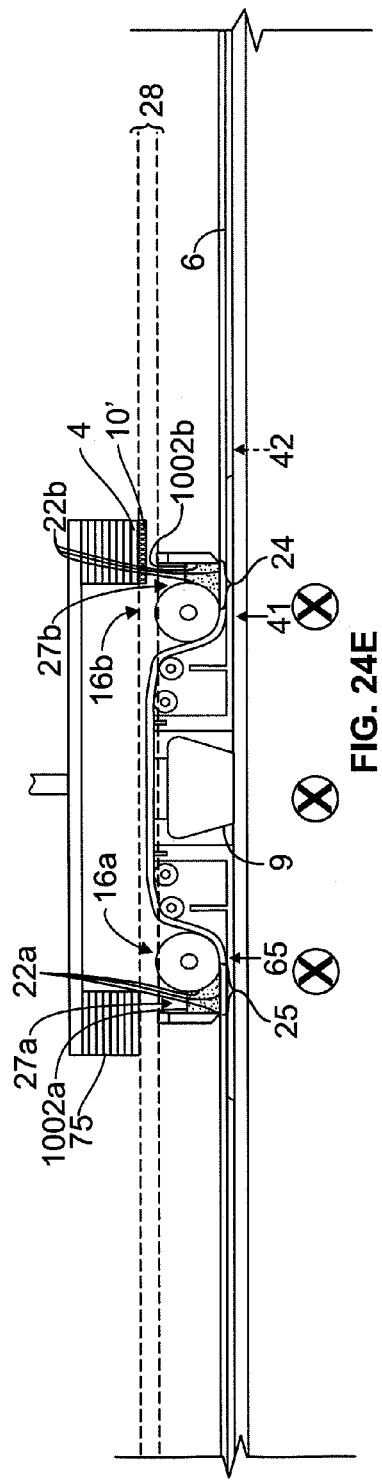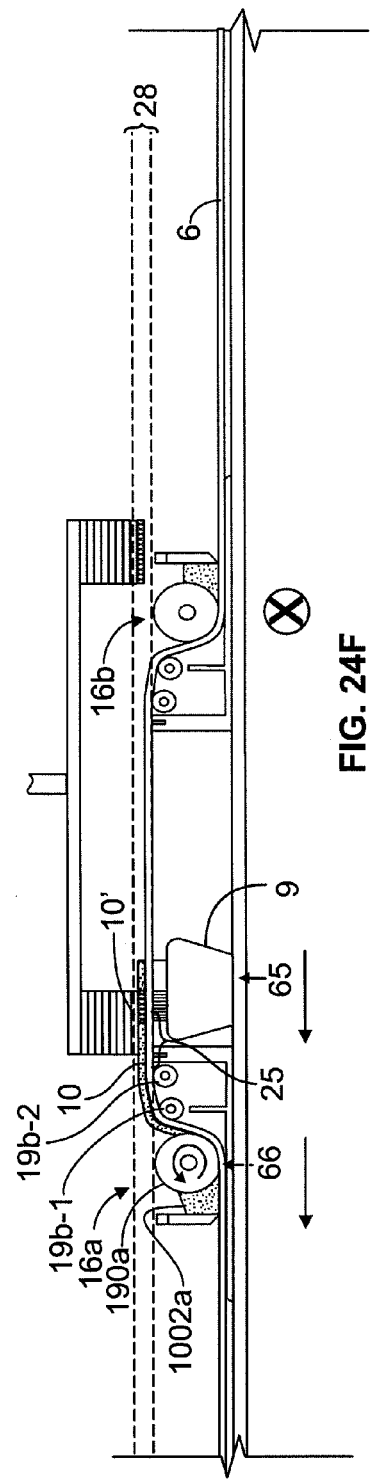

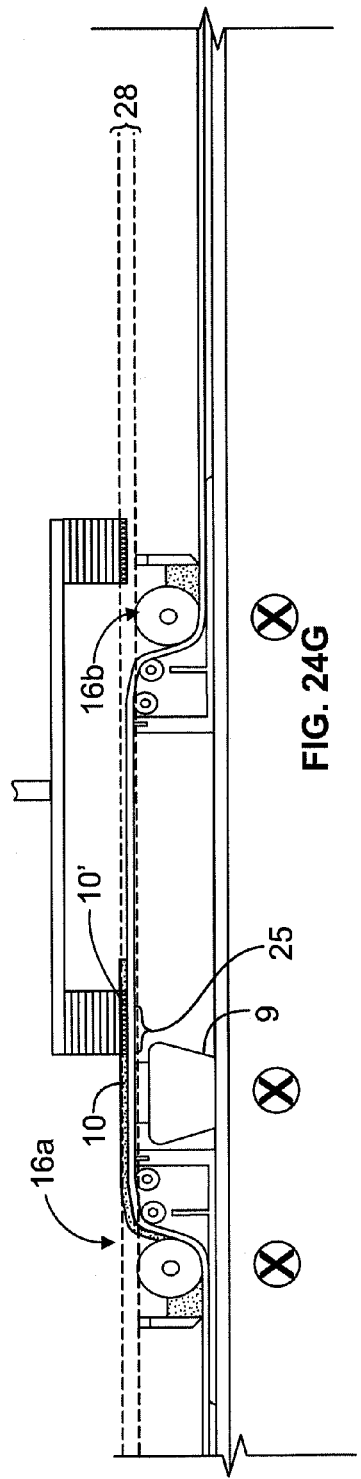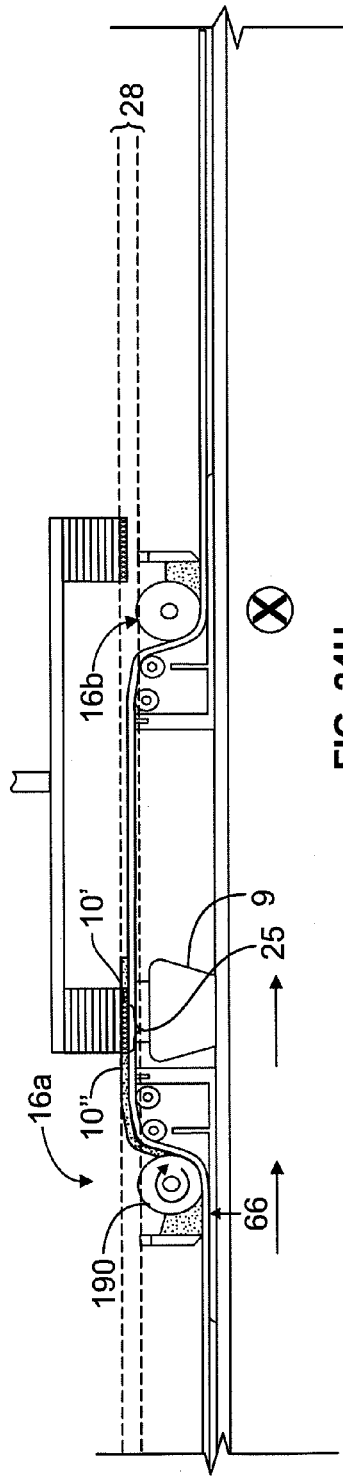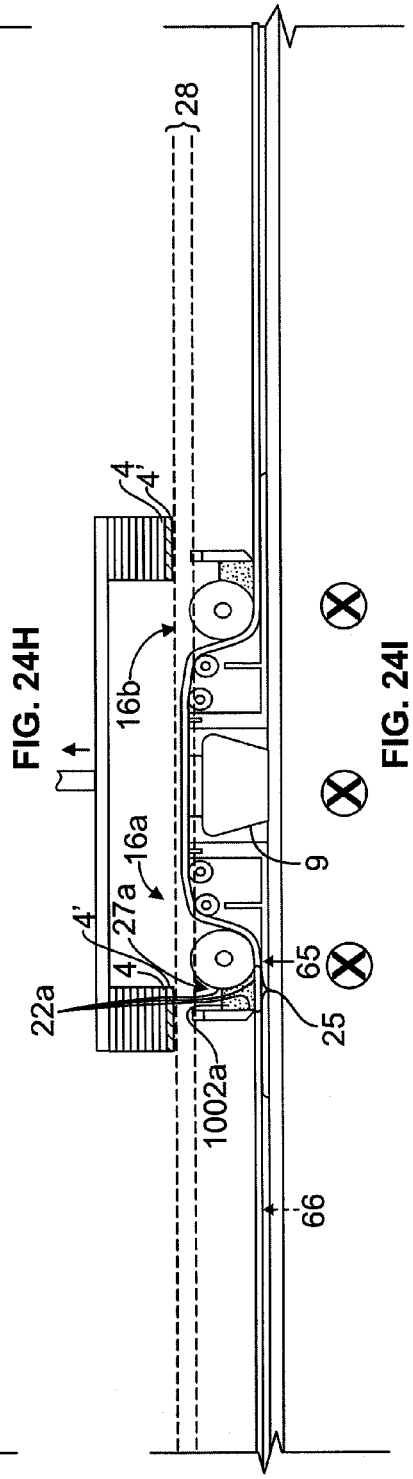

US 8,678,805 B2

SYSTEM AND METHOD FOR LAYERWISE PRODUCTION OF A TANGIBLE OBJECT

CROSS-REFERENCE TO RELATED APPLICATIONS

The present application is a continuation of U.S. patent application Ser. No. 13/166,674 filed Jun. 22, 2011, now abandoned entitled "System and Method for Layerwise Production of a Tangible Object," which is continuation-in-part application of co-pending U.S. patent application Ser. No. 13/141,360, filed Sep. 6, 2011, entitled "Method And Apparatus For Layerwise Production of a 3D Object," which is a U.S. National Filing of International Application No. PCT/NL2009/050783, filed Dec. 18, 2009, which claimed priority to EP08172644.0, filed on Dec. 22, 2008, and EP09164821.2, filed on Jul. 7, 2009. The present application claims priority to and the benefit of all such applications, which applications are incorporated herein by references in their entireties.

FIELD AND BACKGROUND OF THE INVENTION

Aspects of the invention relate to a method for layerwise production of a tangible object. Aspects of the invention also relate to a system for layerwise production of a tangible object.

Such a method is known. For example it is known from U.S. Pat. No. 6,547,552 a small volume of liquid is pressed between a foil and a tangible object to provide a thin liquid layer than can be solidified. The flexible foil is transmittent to curing radiation. A firstly formed solid layer of the tangible object is adhered to the underside of the carrier plate by selectively solidifying the liquid. Consecutively formed solid layers are each adhered to a previously formed solid layer, respectively.

Each time after solidification of a new layer, a foil guiding stage is moved to peel off the foil from the earlier solidified layers adhered thereon in order to separate the last formed solid layer from the foil.

A desire exists to increase the speed of the production process.

SUMMARY OF THE INVENTION

It is an object of an aspect of the invention to enable a faster production of a tangible object.

Therefore, a method according to the first aspect of the invention is provided, a construction shape is provided; and method cycles are repeatedly performed, each method cycle comprising the steps of:

providing a liquid layer on the construction shape of limited height that does not contact the tangible object;

moving, relative to one another, the construction shape to a predetermined position relative to the tangible object, for carrying out a successive such method cycle for solidifying a predetermined area of a successive such liquid layer;

solidifying a predetermined area of a layer of the liquid so as to obtain a solid layer of the tangible object, the solid layer thus having a predetermined shape; and separating said solid layer from said construction shape;

wherein for at least one of said method cycles said moving of said construction shape and said solidifying of said predetermined area are carried out to take place simultaneously. Favourable effects of such simultaneous movement and solidifying are elucidated as follows.

At first, the simultaneous movement and solidifying provides a speed gain of the process in itself. That is, the start of solidifying a layer does not have to wait until all parts of the layer have been provided with the liquid. Hence, there is little or no downtime of the solidifying means. Furthermore, operation is simplified and material cost can be decreased.

Furthermore, according to a second aspect of the invention, a system for layerwise production of a tangible object (5), the system comprising:

a construction shape (6) arranged to provide a liquid layer of limited height that does not contact the tangible object, to be brought in contact with the tangible object;

solidifying means (9) for solidifying a predetermined area of a layer (10) of the liquid (3), so as to obtain a solid layer 14 of the tangible object 5, the solid layer thus having a predetermined shape;

removing means for removing uncured material from the layer outside the intersection pattern;

moving means (18) for moving, relative to one another, the construction shape to a predetermined position relative to the tangible object, for solidifying a predetermined area of a successive such liquid layer;

characterized in that the system is arranged to move said construction shape (6) and said solidifying means (9) simultaneously to contact the liquid layer with the tangible object (5) while solidifying a predetermined area of such layer.

According to another aspect of the invention, a system for layer-by-layer production of an object is provided where, in one embodiment, the system includes a construction shape having a carrying surface adapted for carrying a layer of build material, a plate having a holding surface adapted for holding an object in an object build area, a moveable reservoir having a plurality of containment surfaces defining a containment area adapted for containing a volume of build material within the moveable reservoir, and an exposure unit adapted for exposing at least a portion of the layer of build material in the object build area so that the portion of the layer of build material solidifies to form a solidified layer of the object. In one embodiment, the moveable reservoir is moveable between a first position and a second position and at least one of the plurality of containment surfaces of the moveable reservoir includes a portion of the carrying surface when the moveable reservoir is in the first position, and the portion of the carrying surface is positioned in the object build area when the moveable reservoir is in the second position.

According to another aspect of the invention, a method is provided for layer-by-layer production of an object where the method includes the steps of a) positioning an object in an object build area and out of contact with a portion of a carrying surface of a construction shape, where the portion of the carrying surface of the construction shape is positioned outside of the object build area; b) positioning a moveable reservoir in a first position, where the moveable reservoir includes a plurality of containment surfaces defining a containment area adapted for containing a volume of build material within the moveable reservoir, and where at least one of the plurality of containment surfaces includes the portion of the carrying surface of the construction shape, and where the portion of the carrying surface is positioned outside of the object build area when the moveable reservoir is in the first position; c) moving the moveable reservoir to a second position, where movement of the moveable reservoir from the first position to the second position moves the portion of the carrying surface such that the portion of the carrying surface is positioned in the object build area when the moveable reservoir is in the second position; d) applying a layer of build material on the portion of the carrying surface during movement of the moveable reservoir from the first position to the second position; e) contacting the object in the object build area with at least a portion of the layer of build material when the moveable reservoir is in the second position; and f) exposing at least a portion of the layer of build material in the object build area so that the portion of the layer of build material solidifies to form a solidified layer of the object.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

FIGS. 23A through 23L depict various states of an embodiment of the current invention during operation; and FIGS. 24A through 24I depict various states of an embodiment of the current invention during operation.

DETAILED DESCRIPTION

Figure 1:
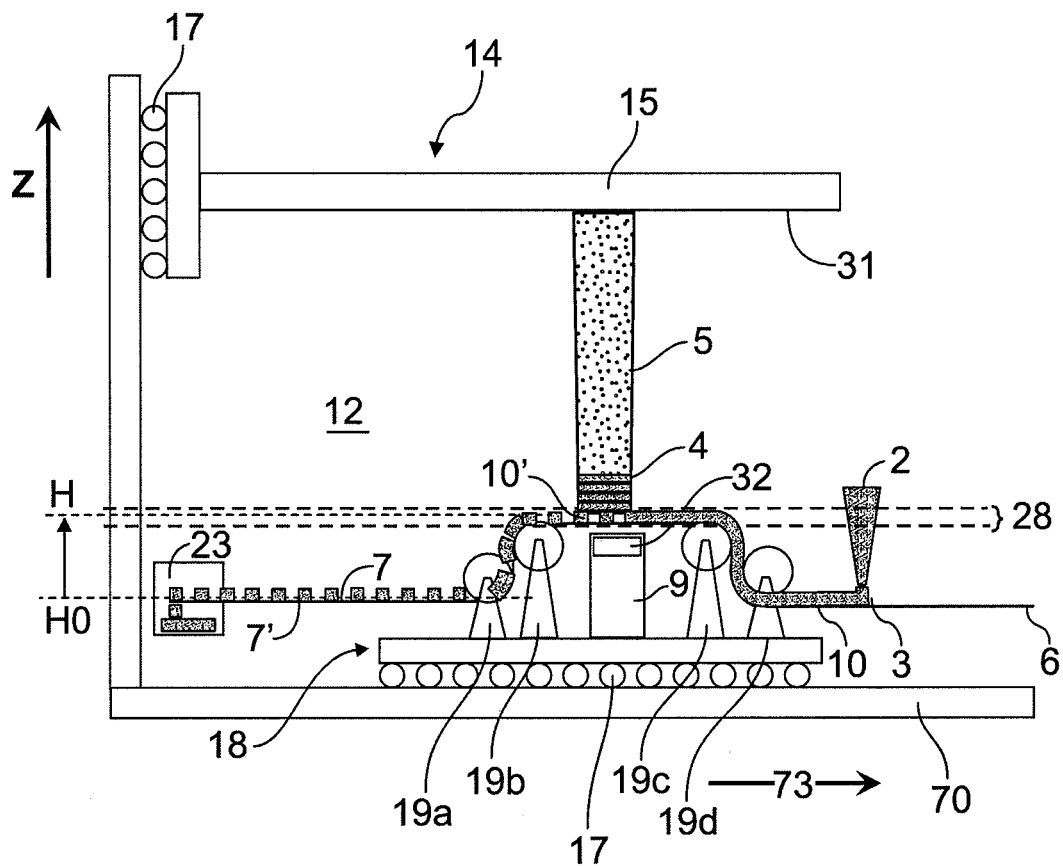
FIG. 1 schematically shows a sectional side view of an example of an embodiment of a system according to an aspect of the invention.

Each of the examples of FIGS. 1-24 relates example embodiments of a system of the current invention and example methods applying such system. In the respective figures sometimes the same reference signs are used for similar or identical parts or aspects of the systems.

Hence, each of the examples of FIGS. 1-24 relates to example embodiments of aspects of systems for layerwise production of a tangible object 5. Layerwise production of a tangible object may also be referred to as layer-by-layer production of a three-dimensional object 5. The systems may comprise: a construction shape 6 onto which a liquid layer is applied; a solidifier 9 for solidifying a predetermined area of a layer 10 of the liquid 3, so as to obtain a solid layer 4 of the tangible object 5, the solid layer thus having a predetermined shape; a separator 18; 19b; 19c for separating said solid layer from said construction shape; and a mover 18 for moving, relative to one another, the construction shape 6 to a predetermined position relative to the tangible object 5, for carrying out a successive such method cycle for solidifying a predetermined area of a successive such liquid layer. Preferably but not necessarily the system comprises a dispenser 2 to dispense a limited volume of liquid adhered to the construction shape and adjust the volume to form a liquid layer of limited height. Before moving of the construction shape to the tangible object, the liquid layer does not contact the tangible object.

Additionally, the liquid layer may be formed by dispensing of said layer from a reservoir; and said moving of said construction shape and said dispensing of said liquid layer may be carried out to take place simultaneously.

Reference is now made to FIG. 1, which shows a system 12 according to the invention.

In this embodiment, the system 12 comprises a liquid applicator 2 which, in the shown example, is filled with a liquid 3. The system 12 further comprises a construction shape in the form of a flexible foil 6. On the foil 6, a liquid layer is formed of limited height to be brought in contact with the tangible object 5. The system 1 further comprises a solidifier 9 for solidifying a predetermined area 10 of a layer of the liquid 3, said liquid layer 10 adjoining the construction shape 6, so as to obtain a solid layer 4 of the tangible object 5, the solid layer thus having a predetermined shape.

In one embodiment, the solidifier 9 is an energy source arranged to project a pattern through the foil 6 when the liquid layer 3 contacts the tangible object 5. In particular, the energy source 9 is arranged for at least partially curing at least part of an intersection pattern in the liquid layer. To enable the light or other radiation of the solidifier 9 to solidify the liquid layer 3, the construction shape 6 (flexible foil 6) is preferably substantially transparent to the radiation.

As will be explained somewhat further below, the system 1 may further comprise a separator for separating said solid layer 4 from said construction shape 6. Additionally, the separator removes unsolidified parts from the tangible object so as to obtain a solid layer (4) of the tangible object (5), the solid layer thus having a predetermined shape.

The system 1 further comprises a mover 18 arranged to move, relative to one another, the construction shape 6 to a predetermined position relative to the tangible object 5, for carrying out a successive such method cycle for solidifying a predetermined area of a successive such layer 4. In this way the mover can position the construction form in successive steps to form multiple layers of the tangible object.

In one embodiment, the mover comprises a movable foil guiding stage 18 located below the construction shape 6. Further, in the shown example embodiment, the energy source 9 is positioned on the movable foil guiding stage 18, between foil guiding elements 19, to expose the layer of uncured material through the foil 6.

In one embodiment, each time after solidification and separation of a new layer, carrier plate (z-stage) 15 together with the tangible object 5 including solidified layers adhered thereon are moved upwards. Hence, the method for layerwise production of a tangible object is a cyclic method, wherein the described steps of positioning, solidifying, and separating together are comprised in a single cycle step of the method.

In one embodiment, the system is arranged in such a way, that for at least one of said method cycles, a limited volume of liquid 3 is dispensed adhered to the construction shape 6 and adjusted to form a liquid layer 10 of limited height that does not contact the tangible object. The liquid layer 10 may also be referred to as the layer of curable material or a layer of build material. This is explained in an example embodiment as follows:

The flexible foil 6 has a liquid contacting side 7 for being in contact with the liquid 3 to form liquid layer 10. The liquid contacting side 7 may also be referred to as the resin-contacting side or the carrying surface 7. At least upper parts in FIG. 1 of the guide 18 are in pressing contact with a side of the flexible foil 6 opposite to the liquid contacting side. The side of the flexible foil 6 opposite to the liquid contacting side can also be referred to as the non-carrying surface 7' of the foil. In the shown example, said pressing contact is realized by a sliding or rolling movement of the guide 18 along said opposite side of the flexible foil 6. Lower parts in FIG. 1 of the guide 18 are in rolling contact with a support platform by means of rollers 17. Both the guide 18 and the solidifier 9 are movable relative to the platform 70 via these rollers 17 in either or both directions indicated by arrow 73 in FIG. 1. The solidifier may be movable respective to the guide 18.

In the shown example, the foil 6 is transparent to radiation from solidifier 9. As an example it is now assumed that, in the course of time during the performing of a method cycle, the guide 18 and the solidifier 9 are synchronously moving in the right-hand direction of arrow 73 in FIG. 1. Then, at the instantaneous moment in time shown in FIG. 1, there are contacting parts of the layer 10 contacting the tangible object 5 for solidifying certain parts of the layer 10'. During the movement of the guide 18 and the solidifier 9, these contacting parts 10 are time-dependently varying. Thus, over time, the contacting parts 10 may vary depending, in particular, of the position of the guide 18 relative to the tangible object 5.

In FIG. 1 on the left-hand side of the figure, these contacting parts 10 have been separated from said other, already solidified parts of the layer 10.

Movable z-stage 14 can be moved in a z-direction before a new layer of curable material is provided to the tangible object 5. With z-direction is meant the direction transverse to the layer of curable material 3 positioned on the foil 6. The z-stage 14 may be raised while the foil guiding stage 18 is not moving. In this embodiment, rolling elements 17 enable movement of the z-stage 14. The rolling elements 17 of the z-stage 14 may also be referred to as a positioner for moving the z-stage 14 and plate 15 to position a portion of object 5 in object build area 28. Tangible object 5 is connected to the z-stage 15 and in each method cycle a new layer is stacked from below. For sake of clarity, the layer of curable material is shown with an exaggerated thickness.

The apparatus 12 may include a guide in the form of a foil guiding stage 18, for providing a layer of curable material to the tangible object 5. The apparatus 12 may further comprise a remover for removing the uncured material from the layer outside the intersection pattern. In the embodiment of FIG. 1, the foil guiding stage 18 is arranged for dispensing a layer of curable material to the foil, illuminating the layer to solidify a further patterned layer to the tangible object 5, and for removing the uncured material from the layer outside the pattern. As an alternative, removing the uncured material from the layer outside the intersection pattern may be performed by e.g. removing the uncured material with a blower. This is especially suitable when the uncured material has a dry, powder like structure or is a low viscosity liquid.

Figure 6:
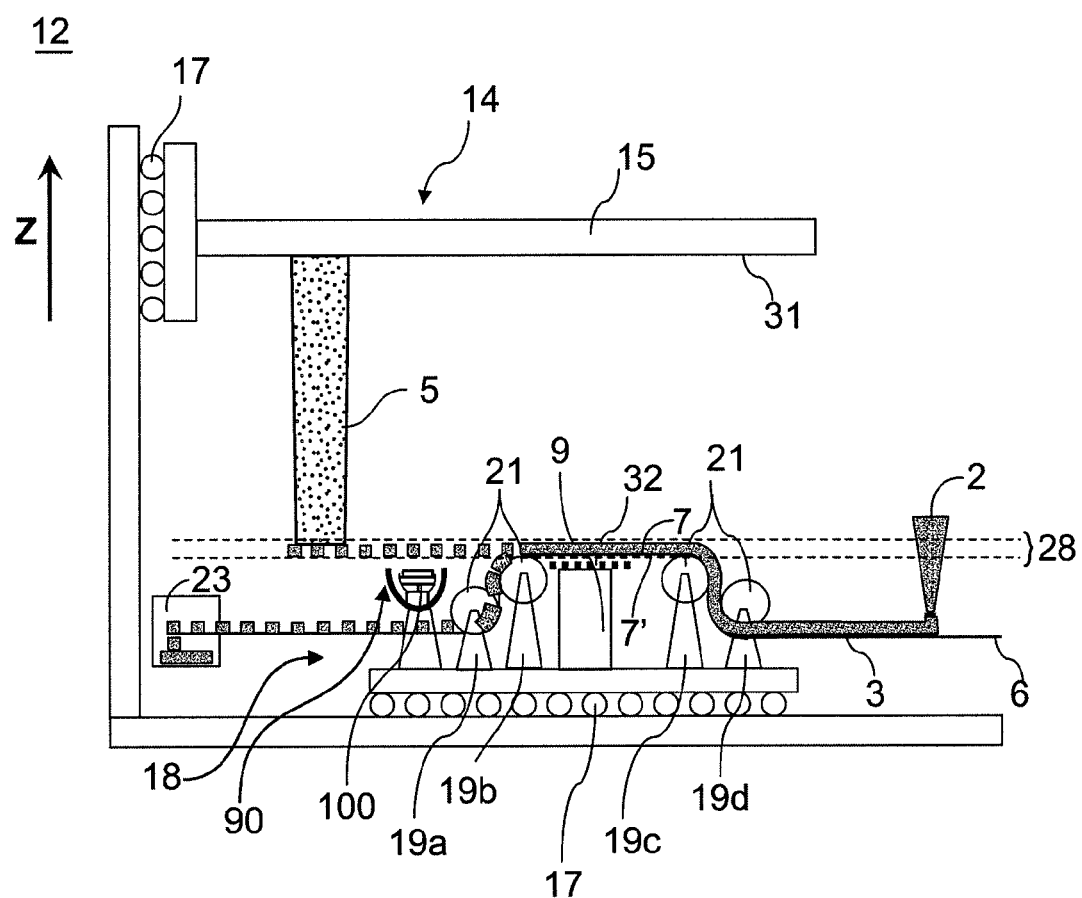
FIG. 6: Schematic representation of an embodiment of an apparatus according to an aspect of the present invention.

The foil guiding stage 18 may be movable transverse to the z-direction. In one embodiment, the movement of the foil guiding stage 18 is enabled by rolling elements 17. Other ways of moving, like sliding are also possible. The foil guiding stage 18 further comprises foil guiding elements 19a, 19b, 19c and 19d protruding from the stage 18 for guiding a foil 6 along the tangible object 5 so as to apply a layer of curable material to the tangible object 5. In illustrated embodiment 1, the foil guiding elements 19 comprise rollers. The foil guiding stage 18 can be reciprocable. Two foil guiding elements (19a, 19b) arranged on the stage 18 define a contact height defined by a height H where the tangible object 5 contacts the liquid layer 10 and at least one position H0 distanced from the contact height H, for guiding the foil 6 to or from the contact height to contact the tangible object 5 by movement along the tangible object 5 while keeping the foil fixed relative to the tangible object 5 at least during contacting. The area which can be occupied by the foil at contact height H in combination with the layer of build material on the foil at contact height H defines an object build area 28. In the example shown in FIG. 1, the portion of the foil positioned at contact height H and the layer of build material on the portion of the foil positioned at contact height H are in the object build area 28. The object build area 28 extends laterally (as shown in FIG. 6). The portion of the foil and the layer of build material positioned at position H0 distanced from the contact height H are outside of the object build area 28. The build area, stated another way, is the volume that includes the construction shape and the layer of build material upon the construction shape when the construction shape is in a position (such as height H) such that the build may come in contact with at least a portion of the layer of build material and form an additional layer of the build.

The foil 6 can be arranged for carrying the curable layer material 10 supplied from a dispenser 2 to the tangible object 5 and for carrying the removed uncured material away from the tangible object 5, possibly to a residue reservoir 23. Typically, the uncured material outside the intersection pattern sticks to the moving foil 6 because the adhesive force between the uncured material and the foil 6 are larger than the adhesive force between the uncured material and the tangible object 5.

The foil 6 and the foil guiding stage 18 may be moved independently. In one operating mode, in a first step, the foil 6 is moved so as to provide a layer of curable material beneath the tangible object 5. The curable material is, at that time, not yet in contact with the tangible object 5. In a second step, the foil guiding stage 18 moves along the tangible object 5 to apply the layer of curable material to the tangible object 5, expose the curable material and remove the uncured material.

In the second, step, the foil 6 does not substantially move relative to the tangible object 5 transverse to the z-direction.

The apparatus 12 may comprise an energy source 9 arranged for at least partially curing at least part of an intersection pattern in the layer of curable material 3. In the embodiment of FIG. 1 the energy source 9 comprises a plurality of individually operable LEDs arranged in rows and columns (not shown). The energy source 9 may be moveably disposed relative to the layer of curable material 3, such that it can move in a direction 8 parallel to the layer of curable material 3. The motion of the energy source 9 may be controlled by a controller, which also controls the lighting of the LEDs. In use, the energy source 9 may be moved rectilinearly in a direction that extends at an angle with the directions of the rows and columns of the LED array 32 to enhance the effective resolution of the system. This technique is described in more detail in copending application EP 07150447.6 in the name of applicant, which is incorporated herein by reference for further information regarding this aspect. The energy source 9 may be positioned on the movable foil guiding stage 18, between the protruding foil guiding elements 19 so as to expose the layer of uncured material through the foil 6. The energy source may be covered by a transparent plate, e.g. a glass plate to improve the guidance of the foil 6.

The combination of using a LED light source comprising a plurality of individually operable LEDs and partially curing at least part of the intersection pattern may be advantageous. Before explaining this further, the LED light source as used in this embodiment will be described in some detail.

The LED light source may comprise a two dimensional matrix of typically about 80×120 light emitting diodes (LEDs); that are imaged via a multilens array (not shown) to the layer of curable material 3. The length of the matrix is typically about 60 centimeters. The LED's are individually operable to write the intersection pattern with a control speed of an individual LED typically in the order of nanoseconds, by a plurality of electrical pathways, selectively connected to the respective LEDs. In this example, accordingly, the energy source 9 may be provided by a two-dimensional array of LEDs extending in a plane parallel to the layer of curable material 3.

When the complete intersection pattern is fully cured, the LED light source may typically move over the layer of uncured material with a scanning speed of about 10 centimeters per second.

Figure 2:
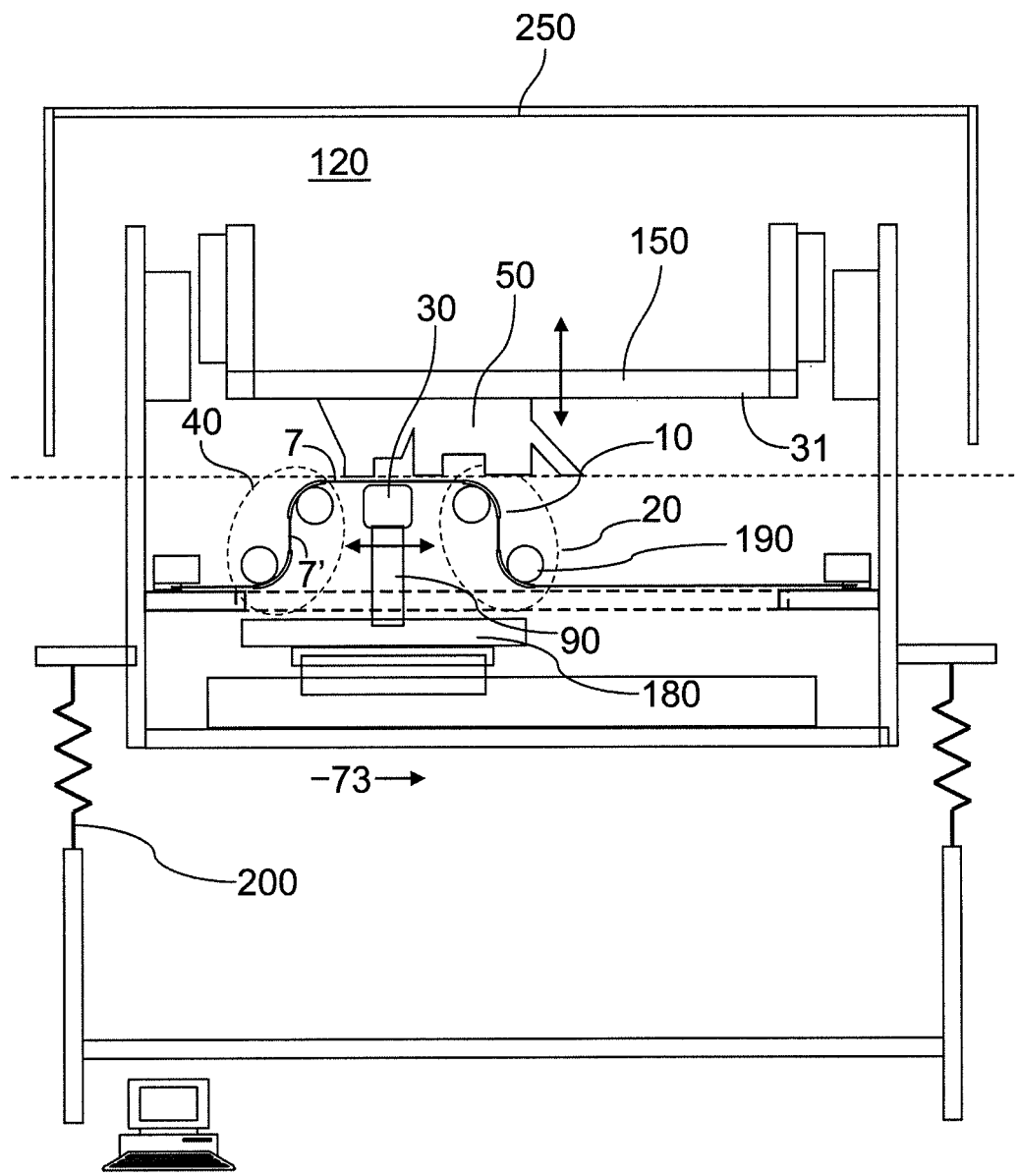
FIG. 2 schematically shows a sectional side view of another example of an embodiment of a system according to an aspect of the invention.

FIG. 2 shows a further detailed embodiment wherein the subprocesses 'layer provision' 20 and 'solidifying' 30 may be carried out simultaneously. In addition, the separating step 40 may also be carried out in the same operational movement of foil guiding stage 180. Furthermore additional sub processes can be carried out simultaneously, which could include simultaneous execution of other process steps (besides coating—lifting—exposing—peeling) such as foil cleaning, object cleaning, post curing, heating, cooling (compensate for exothermic reaction), and pre-curing). Pre—and post curing steps can be carried out by applying heat or specific radiation as further exemplified in FIG. 6.

The functional process units that carry out these process steps are preferably kept with a limited extension in the movement direction which enhances the simultaneity and thus the overall efficiency. It is noted that the subsystems layer provision and layer removal will be interchanged when reversing movement of stage 180; in FIG. 2, the movement is from left to right (arrow 73). Such a reciprocal solidification process is further exemplified in FIG. 14 and FIGS. 15A and 15B. However, it is also possible that a unidirectional solidification process is performed, wherein, in only a single direction a layer is provided and solidified; and a 'fly back' movement is performed by the stage 180 without performing layer provision and solidification. This may depend on how fast the exposure unit 90 can perform a fly-back movement from end point to start point.

The solidifying means, in the example formed by 'exposure unit' 90 for carrying out the solidification can have a dimension that is limited in the direction of the foil guiding stage 180, since in this direction, by scanning movement, a full length dimension of the tangible object 5 can be built. The simultaneity of the layer provision 20 and solidifying 30 processes can be used to achieve an additional gain in required process time.

As an additional advantage, in contrast to sequential operation, the layer provision 20 and exposure unit 30 used for carrying out said subprocesses can be used more efficiently (close to 100% of the time). In addition, since all of the machine parts for separate process steps can be dimensioned relatively small, high process speed can be provided which diminishes process time for all sub processes.

The figure illustrates a machine in which the product is built by adding layers successively to the underside of the product 50 which is attached to the 'product holder' 150. The product holder 150 may also be referred to as the carrier plate 15, plate, and/or platform. The product holder 150 includes a holding surface 31 for holding the product 50. The product 50 can also be referred to as the object, tangible object, model, three-dimensional object, and build.

The 'working area' is large enough to accommodate the product 50 to be made. The present invention is especially useful when the working area is relatively large, e.g. about 50×50 cm2.

In FIG. 2 the 'product holder' 150 defines a working area of at least about 50 cm long (from left to right in the figure) and about 50 cm wide (perpendicular to the plane of the drawing).

In one embodiment, for each layer two process steps are always required (1) providing (20) a layer of resin 10, exposure (30) of the resin 10; in many applications there is also releasing (40) the unexposed resin 10 from the building surface ('peeling' in the example of the drawing).

Conventionally these processes may be carried out on the entire working area.

In one aspect of the invention, the processes may be performed on only a small part of the working area at a time. So process equipment (e.g. exposure unit) is required that can address a part of the working area at any instant of time.

Thus, while FIG. 2 illustrates a single foil guiding stage 180 covering at least one length dimension of the working area, a multi stage arrangement can be provided where the processes are carried out in parallel, simultaneously on different parts of the working area. This may considerably reduce a total process time:

In one embodiment, each of the 3 processes requires a process time TP(i), i=1.3 that is determined by:

the net process time TP(i): e.g. the required exposure time (e.g. lower light output results in a longer exposure time) or the speed at which the process can be carried out: movement [m/s] from left to right. This in turn is determined by properties of e.g. the resin and the product (e.g. the product can only withstand small forces resulting in lower movement speed).

the lead in and lead out time. In the example of the FIG. 2 arrangement, wherein a moving process is depicted by moving a reciprocable guide stage 18, as opposed to stationary process equipment, the distance to be travelled is the length of the working area+the length of the guide stage LPE(i) resulting in an additional process time T PE(i)=LPE(i)/v (where v is the travelling speed). so the total time for one layer will be:
conventionally for stationary systems: TP1+TP2+TP3.
with the moving stage: max (TP1, TP2, TP3)+TPE1+TPE2+TPE3.

It follows that TP1, TP2 and TP3 are preferably comparable, and when the process equipment can be made small compared to the working area. For large working area, an arrangement comprising a moving foil guiding stage thus may provide process time reduction.

To shorten the length direction of the stage, an exposure unit 9 is typically limited in length, for example, for working areas of about 50 cm, only about 6 cm length can be realised with elements ('pixels', each having a LED+microlens) of 2×2 mm2, and still provide a high resolution of about 15 pixels per mm of working-area-width.

In addition, the coater 20 and peeler 40 mechanisms are preferably limited in length, also typically about a few cm. For the coater rollers preferably knurled rollers 190 are used as an example of a profiled applicator for flattening and adjusting the layer volume provided from the dispenser. A carefully designed profile allows the liquid to evenly spread to the foil by urging the profile to the foil and allowing the liquid in the recesses of the profile and thus form a layer of uniform height. The system 120 is provided with vibration damping 200 and a protective cap 250. A controller can be arranged to control the method steps carried out by the system 120.

Figure 3:
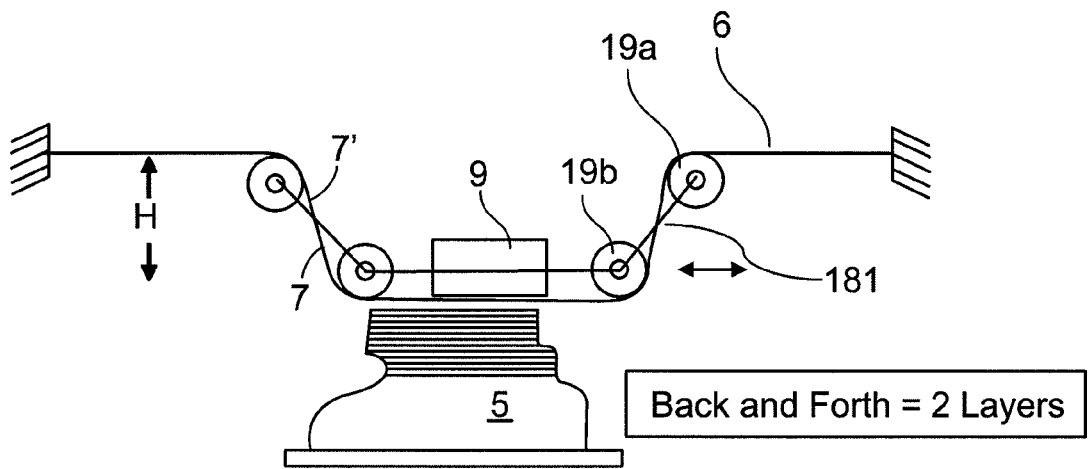
FIGS. 3-5 schematically show sectional sides of further examples of yet other embodiments of a system according to an aspect of the invention.

FIG. 3 shows a schematic example including a foil guiding carriage 181. In one embodiment, the foil guiding stage comprises at least two foil guiding elements 19a and 19b arranged thereon defining a contact height H and at least one position distanced from the contact height, for guiding the foil 6 to or from the contact height to contact the tangible object 5 by movement along the tangible object 5 while having opposite ends fixed relative to the tangible object at least during contacting. The stage is operative in both directions to be used either as a coater or as a peeler, so the machine can be operated with a bi-directional movement; in such an embodiment, moving back the complete mechanism from the end-of-scan position to the start-of-scan position is not needed. Accordingly, two layers can be produced in a cycle where the carriage returns to its initial position.

Figure 4:
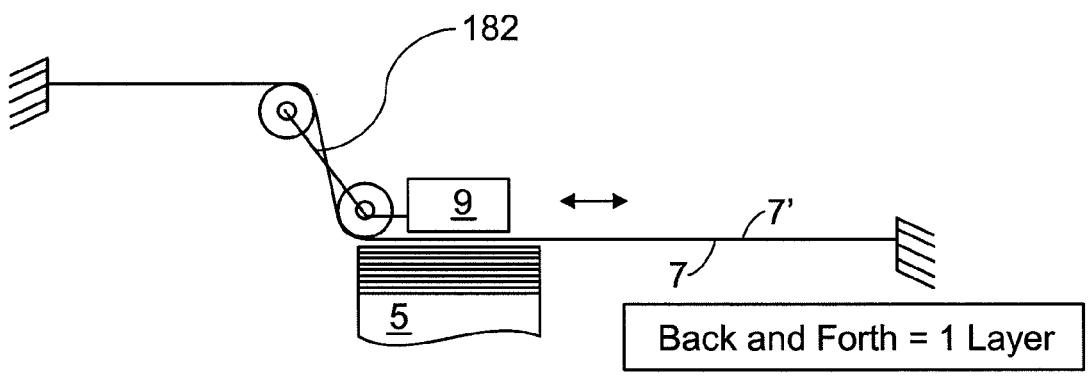

FIG. 4 shows an alternative embodiment, wherein carriage 182 is operated in a unidirectional way: Here a back and forth movement results in the production of a single layer.

Figure 5:
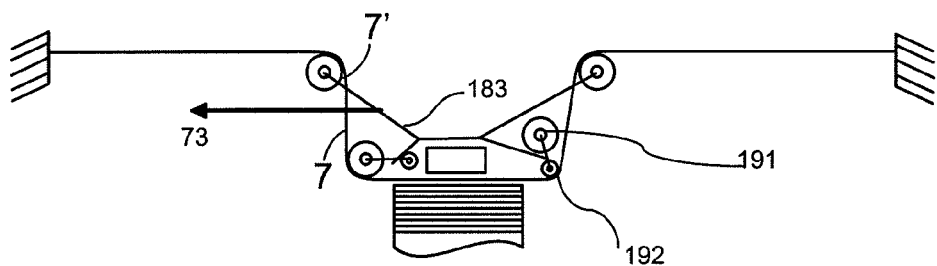

FIG. 5 shows a foil guiding stage arrangement 183 wherein the foil guiding elements comprise a separator guide 192 and an applicator guide 191, the separator guide 192 having a smaller bending radius than the applicator guide. The operating movement is indicated by arrow 73. Preferably, in bidirectional mode, this system comprises a changing system to change the separator guide 192 and the applicator guide 191 relative to the guiding stage direction 73.

While the embodiments detail construction shapes in the form of a flexible foil, other construction shapes are possible without departing from the scope of the invention, in particular, rigid shapes, such as drums, planar shapes etc. Furthermore, while the moving means are typically provided as a carriage 18, 180, 181, 182, 183, other systems, in particular, drum actuating designs may provide movement of the construction shape to the tangible object.

According to a further aspect, an apparatus is provided for building a 3D model by stacking layers in a rapid prototyping or rapid manufacturing process, the apparatus comprising a stage 14 arranged for holding the model, an applicator 18 arranged for providing a layer of curable material to the model, a first energy source 9 arranged for at least partially curing at least part of an intersection pattern in the layer of curable material, a remover for removing the uncured material from the layer outside the intersection pattern, and a second energy source 100 for post-curing the layer, wherein the second energy source may comprise a wide-range energy source.

FIG. 6 further illustrates an embodiment, wherein, according to one aspect of the present invention, the system 12 comprises a movable foil guiding stage 18, said foil guiding stage 18 being movable transverse to the z-direction, said foil guiding stage 18 comprising foil guiding elements 19 protruding from the stage 18 for guiding a foil 6 along the model 5 so as to apply a layer of curable material 3 to the model 5.

According to a further aspect, the first energy source 9 can be positioned on the movable foil guiding stage 18, between the protruding foil guiding elements 19 so as to expose the layer of uncured material through the foil 6.

As used herein, the term 'curable material' includes any material which is curable (i.e., which can by polymerized and/or cross-linked) by, for example, a UV light, a laser, ionizing radiation (including but not limited to an electron beam, gamma rays or x-rays), or a combination of any of the foregoing. The term 'curable material' shall also be construed to mean a composite material comprising a mixture of both curable and non-curable materials, such as a resin in which fibers and/or fillers are intermixed.

Partially curing comprises curing to such a degree that the intersection pattern remains stable while removing the uncured material from the layer outside the intersection pattern. The curable material is not fully cured, but only to such an extent that the material is sufficiently stabilized that it is not removed with the uncured material during the step of removing the uncured material outside the intersection pattern.

In the shown embodiment of FIG. 6, the extra energy needed for fully curing may be provided in a post-curing step in a cost-effective way by a wide-range energy source 100. The use of a wide-range energy source 100 is feasible because the uncured material outside the intersection pattern may be removed first.

Fully curing an intersection pattern needs a certain exposure time. Partially curing the intersection pattern means curing the pattern to a lower degree. When the energy source operates at the same power with which the full curing is done, the exposure may be shorter and the speed of the RM and RP processes increases.

The transition of a resin cured by UV from liquid to solid passes a so-called gel-point. At this point all monomers are chemically bonded to form one big molecule. More curing forms more bonds, e.g. cross links, to realize a higher E-modulus of the material. The degree of curing desired in partially curing may be defined by curing the curable material to a degree on or near the gel-point degree of the material, where the intersection pattern remains stable while removing the uncured material from the layer outside the intersection pattern. In practice, curing to a degree on or near the gel-point degree may be interpreted as a degree within a range of about 80%-120% of the gel-point degree.

This gel-point degree of curing pc is defined by the formula pc=2/favg. In this formula, favg is the parameter average 'functionality' related to the number of chemical bonds per monomer, a property of the resin. Typically, values of favg are in the range of about 3 to 6. This means the gel-point is reached at a curing degree pc between about ⅔ and ⅓.

The curing degree used for regular production may be about 0.9. The potential productivity gain by partially curing may then be between about 35% and 170%. A characteristic of typical curable materials that are used in RP and RM is that they may be partially cured up to a certain degree and if energy is provided within a certain time after the partial curing, this energy will add up to the energy for the partial curing until the material is fully cured. The energy provided during the partial curing is not lost, or is at least substantially preserved.

Curing at least part of the intersection pattern includes fully curing as well, as opposed to the partially curing being described above, of a raster pattern in the layer of curable material 3, said raster pattern being dimensioned to hold uncured material. The material may thus be fully cured, but only a raster pattern is cured instead of the complete intersection pattern.

The amount of material that has to be exposed for curing a raster pattern is less than for curing the complete intersection pattern. A laser source may e.g. travel a shorter path, which increases the RP and RM speed. The raster patterns may be further optimized for improving the on and off duty sequence of the individual LED's of the LED light source. This may further improve the output power of the LED's and the building speed.

A combination of partially curing and curing at least part of an intersection pattern, for example, curing a raster of the intersection pattern to a certain degree only, is also possible. This may further speed up the RP and RM process.

One way of removing the uncured material outside the intersection pattern is to blow the material away. This way is especially suitable when the uncured material has a dry, powder like structure or is a low viscosity liquid.

One possibility to hold uncured material inside the raster pattern during the step of removing the uncured material may be realised by dimensioning the raster pattern to provide capillaries for holding the uncured material. When using the mechanism of capillarity, the dimensions of the raster are, for example, related to the viscosity of the uncured material.

Another possibility to hold uncured material inside the raster pattern during the step of removing the uncured material is to provide additional material inside the raster pattern after having first removed substantially all the uncured material from the layer. This introduces an extra process step. However, it also creates the opportunity to fill the object with an additional material that differs from the curable material of the layer if the required characteristics of the surface of the model differ from the characteristics of the inside. The surface may, for example, be smooth or soft, while the inside is desired to be light or rigid. The additional material may be sticky to hold the material inside the raster pattern.

After at least partially curing at least part of the intersection pattern and removing the uncured material outside the raster pattern, the layer may be post-cured with a wide-range energy source 100. The wide-range energy source 100 is typically a wide-range UV light source, for example, but not restricted to, a UV TL light source. However, the use of a wide-range thermal source is also contemplated.

FIG. 6 shows an embodiment of an apparatus 12 for building a 3D model by stacking layers in a rapid prototyping or rapid manufacturing process according to the present invention. The apparatus 12 comprises a stage 14 for holding the model. In this embodiment, the stage 14 is a movable z-stage 15 that may be moved in a z-direction before the applicator 18 provides a layer of curable material to the model. Movement in the z-direction the direction can be transverse to the layer of curable material. The stage 14 may be raised while the applicator 18 is not moving, but it is also possible to lower the applicator 18 as long as the distance between the model 5 and the applicator 18 is increased. In this embodiment, rolling elements 17 enable movement of the z-stage 15.

FIG. 6 shows that the model 5 is connected under the z-stage 15 and that a new layer is stacked from below. For sake of clarity, the layer of curable material is shown with an exaggerated thickness.

In one embodiment, the apparatus 12 comprises an applicator 18 for providing a layer of curable material to the model 5. The apparatus 12 further comprises a remover for removing the uncured material from the layer outside the intersection pattern. In the embodiment of FIG. 6, the applicator 18 is arranged for both providing a layer of curable material to the model 5 and for removing the uncured material from the layer outside the intersection pattern. This is convenient but alternatives for removing the uncured material from the layer outside the intersection pattern are possible, for example, removing the uncured material with a blower. This is especially suitable when the uncured material has a dry, powder like structure or is a low viscosity liquid.

In this embodiment the applicator 18 is formed by a movable foil guiding stage. The foil guiding stage 18 is movable transverse to the z-direction. The movement of the foil guiding stage 18 may be enabled by rolling elements 17. Other ways of moving, like sliding are also possible. The foil guiding stage 18 further comprises foil guiding elements 19a, 19b, 19c and 19d protruding from the stage 18 for guiding a foil 20 along the model 5 so as to apply a layer of curable material to the model 5. In one embodiment, the foil guiding elements 19 comprise four rollers 21.

In the embodiment illustrated in FIG. 6, the foil 6 is arranged for carrying the curable material supplied from a supply reservoir 2 to the model 5 and for carrying the removed uncured material from the model 5 to a residue reservoir 23. Typically, the uncured material outside the intersection pattern sticks to the moving foil 6 because the adhesive force between the uncured material and the foil 6 are larger than the adhesive force between the uncured material and the model 5.

The applicator 18 may further comprise a supply reservoir 2 for storing the curable material and a residue reservoir 23 for storing the uncured material removed from the layer outside the intersection pattern. The reservoirs may be open or closed. Open may have the advantage that filling or emptying is easier. In a closed reservoir, keeping the curable material under certain operating conditions before using or recycling it may be easier. In this embodiment, the foil 6 may be arranged for carrying the curable material supplied from a closed supply reservoir 2 to the model 5 and for carrying the removed uncured material from the model 5 to the residue reservoir 23. In this embodiment, the applicator 18 may further comprise an actuator (not shown) for moving the foil 6 to and from the model 5.

The foil 6 and the foil guiding stage 18 may be moved independently. In one operating mode, in a first step, the foil 6 is moved so as to provide a layer of curable material beneath the model 5. The curable material is, at that time, not yet in contact with the model 5. In a second step, the foil guiding stage 18 moves along the model 5 to apply the layer of curable material to the model 5, expose the curable material and remove the uncured material. In the second step, the foil 6 does not substantially move relative to the model 5 transverse to the z-direction.

In one embodiment, the apparatus 12 according to the present invention comprises a first energy source 9 arranged for at least partially curing at least part of an intersection pattern in the layer of curable material 3. In the embodiment of FIG. 6 the first energy source 9 comprises a plurality of individually operable LEDs arranged in rows and columns (not shown). The first energy source 9 may be moveably disposed below the layer of curable material 3, such that it can move in a direction parallel to the layer of curable material 3. The motion of the first energy source 9 may be controlled by a controller, which also controls the lighting of the LEDs. In use, the first energy source 9 may be moved rectilinearly in a direction that extends at an angle with the directions of the rows and columns of the LED array 32 to enhance the effective resolution of the system. This technique is described in more detail in copending application EP 07150447.6 in the name of applicant, which is incorporated herein by reference for further information regarding this aspect. The first energy source 9 may be positioned on the movable foil guiding stage 18, between the protruding foil guiding elements 19 so as to expose the layer of uncured material through the foil 6. The energy source may be covered by a transparent plate, e.g. a glass plate to improve the guidance of the foil 6.

The combination of using a LED light source comprising a plurality of individually operable LEDs and partially curing at least part of the intersection pattern may be advantageous. Before explaining this further, an example of a LED light source as used in an embodiment of the present invention will be described in some detail.

In one embodiment, the LED light source 32 comprises a two dimensional matrix of typically about 80×120 light emitting diodes (LEDs); that are imaged via a multilens array (not shown) to the layer of curable material 3. The length of the matrix is typically about 60 centimeters. The LEDs may be individually operable to write the intersection pattern with a control speed of an individual LED typically in the order of nanoseconds, by a plurality of electrical pathways, selectively connected to the respective LEDs. In this example, accordingly, the first energy source 9 may be provided by a two-dimensional array of LEDs extending in a plane parallel to the layer of curable material 3, and in between the multi-lens-array and the substrate.

When the complete intersection pattern is fully cured, the LED light source typically moves over the layer of uncured material with a scanning speed of about 10 centimeters per second.

Figure 7:
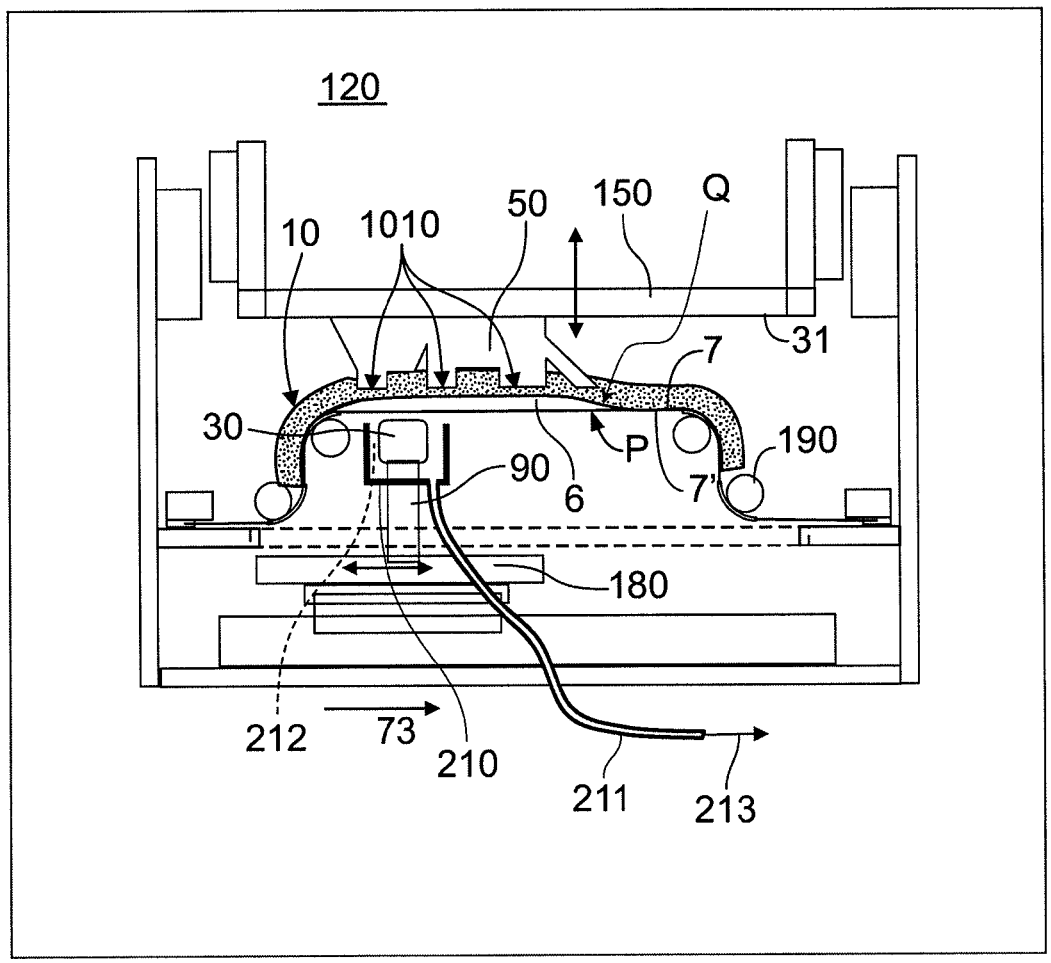
FIG. 7: illustration of lift effects for an object having large cross-section.

FIG. 7 illustrates a problem that can arise when the cross section of the object is large: the capillary forces in the narrow slit between foil 6 and object 50 cause this slit to be narrowed. This may lift the foil from its intended position P to a higher position Q, and makes the layer at the positions to be exposed 1010 thinner. Thus the new layer is too thin. This effect can accumulate during a number of layers, and the accuracy of the product can be severely compromised. Even the building process can be interrupted if the accumulated thickness loss is such that at a certain layer no contact is made any more between the liquid layer moved towards the product and the product itself. A solution for this problem is to apply a compensating downward force on the foil, by creating a pressure difference across the foil.

This can be done by adding a vacuum chamber 210 underneath the foil, more specifically around the exposure unit. An underpressure is applied to the inside 212 of the chamber by applying suction 213 at the connection tubing 211.

In an embodiment, the chamber 210 fits closely (slit of e.g. 1 mm width) around the exposure head 30, to prevent bulging downward of the foil at the slit. Surprisingly, notwithstanding the narrowness of the slit, the required underpressure to prevent the problem of foil lifting is very small, typically 10 mbar or less. Upon analysis it was found that the underpressure is effectively acting on the full area of the exposure head 30.

Figure 8:
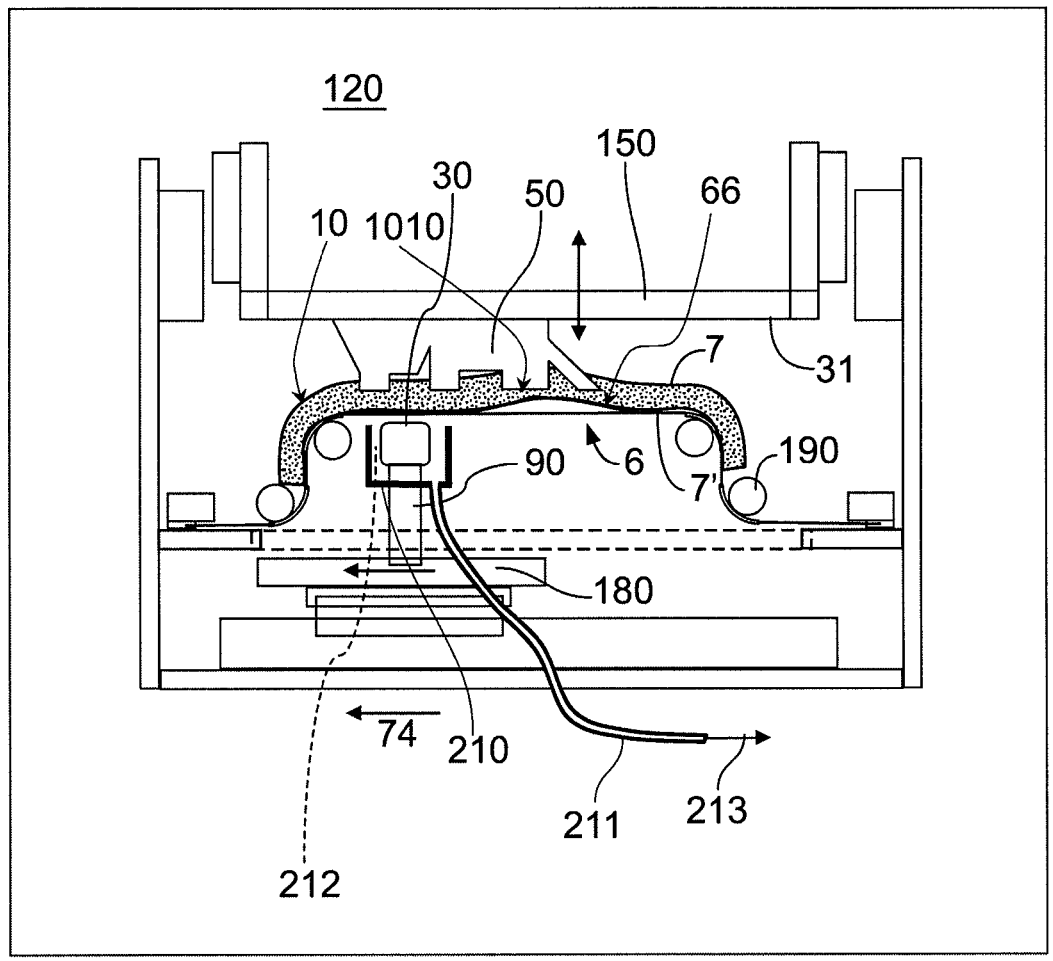
FIG. 8: illustration of residual foil lifting.

In FIG. 8 some residual foil lifting 66 is shown. This does not normally occur because the resin has already been exposed there (in this figure the exposure head is moving right to left) and is strong enough to withstand the capillary forces, but in case lifting yet occurs (depending on e.g. curing speed of the resin used) it can be remedied by extending the vacuum chamber or adding an additional vacuum chamber, always taking care that the slits for letting the underpressure pass from the chamber to underneath the foil are small (~1 mm) in order to keep the foil from bulging downward.

Figure 9:
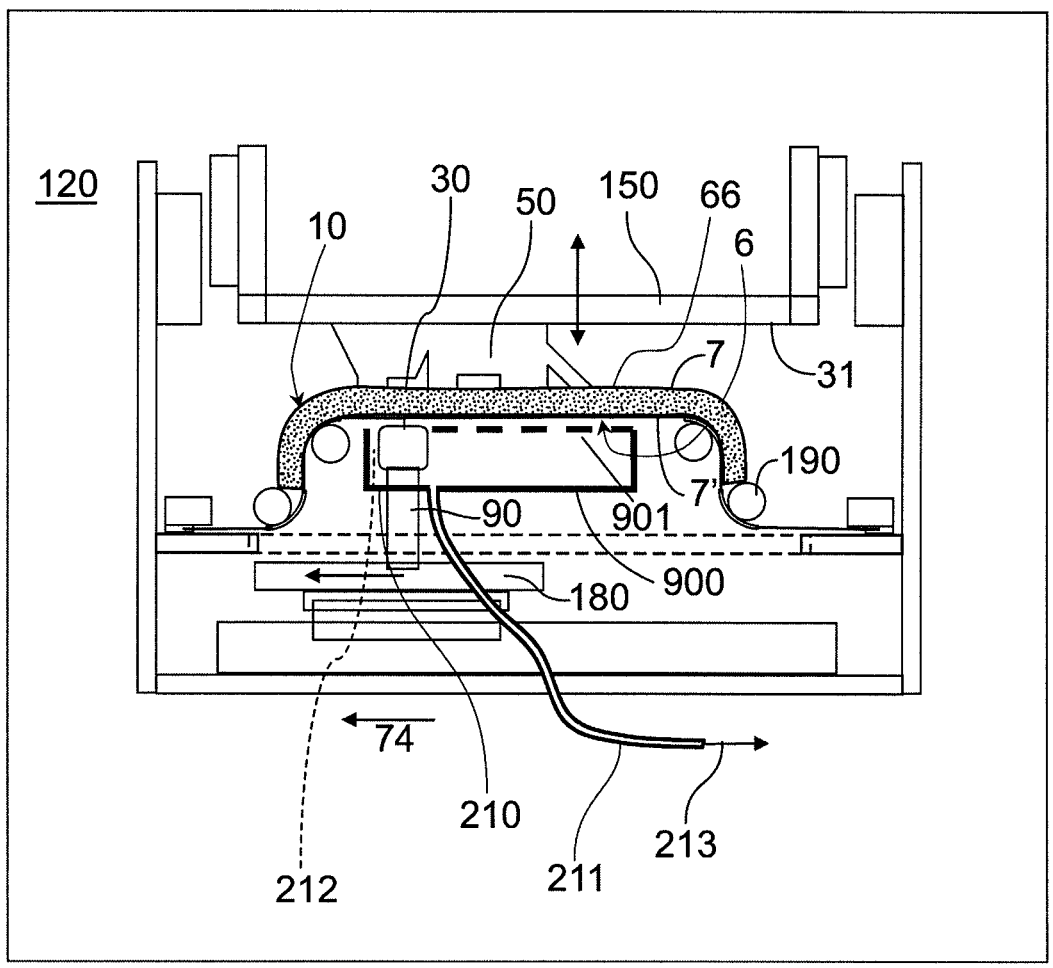
FIG. 9: a schematic embodiment including a perforated plate.

FIG. 9 shows as an example a perforated plate forming a top side 901 of a exposure head extension 900.

It will be clear to a person skilled in the art that the above way of keeping a large area of foil under control with a very small underpressure can be applied in different embodiments, not necessarily only around the exposure head, but in all those cases where spurious forces tend to move the foil away from its intended position. For example, a very small underpressure can be applied, e.g., through a vacuum or a vacuum chamber used at or near the point of the peeling roller or at or near the point where the foil 6 is separated from the last-cured layer of the object (50). In order to stabilize the underpressure preferably, vacuum chamber extension 900 has walls close to foil, to keep leaks here small.

Figure 10:
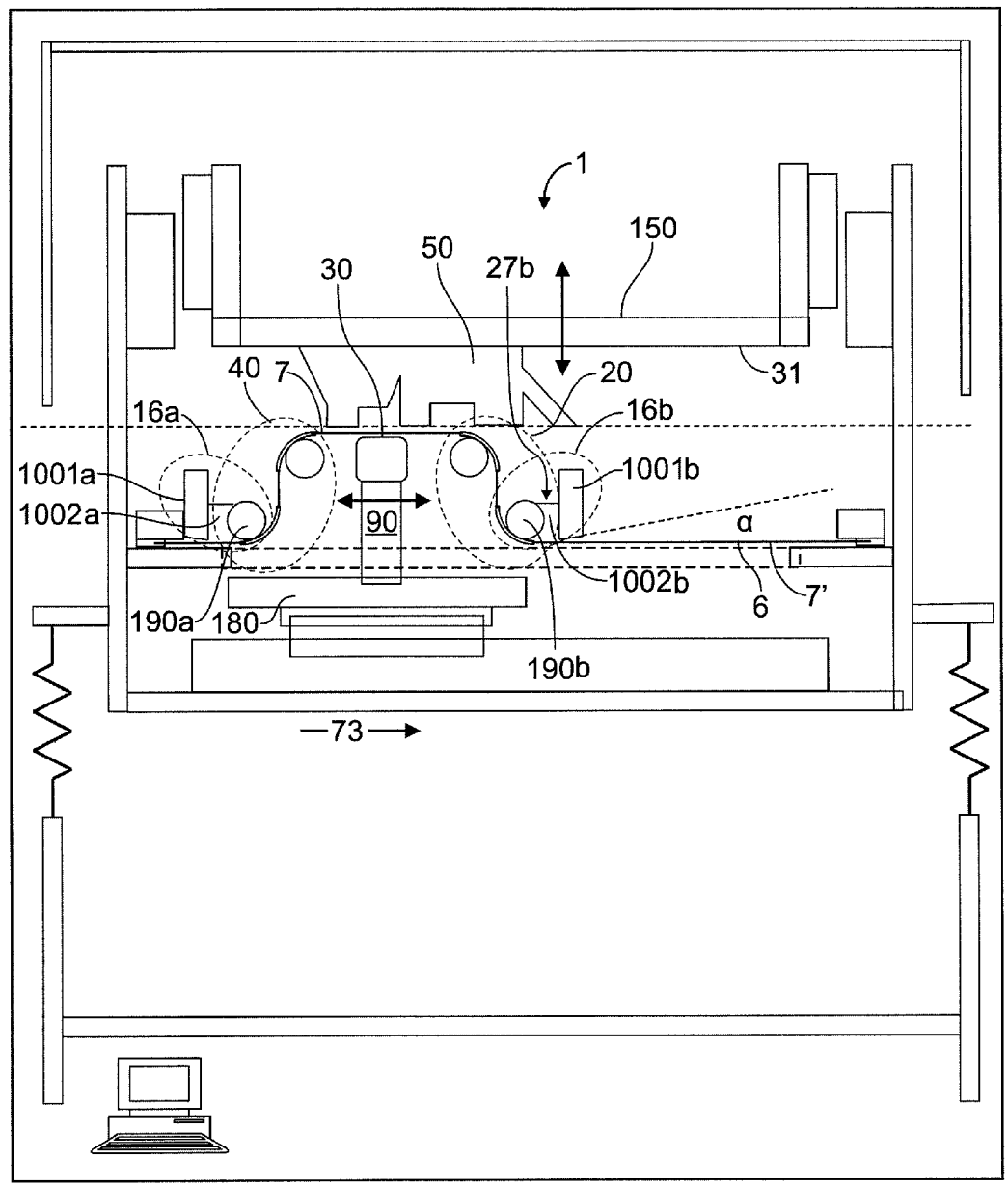
FIG. 10: a schematic embodiment minimizing resin evaporation.
Figure 10A:
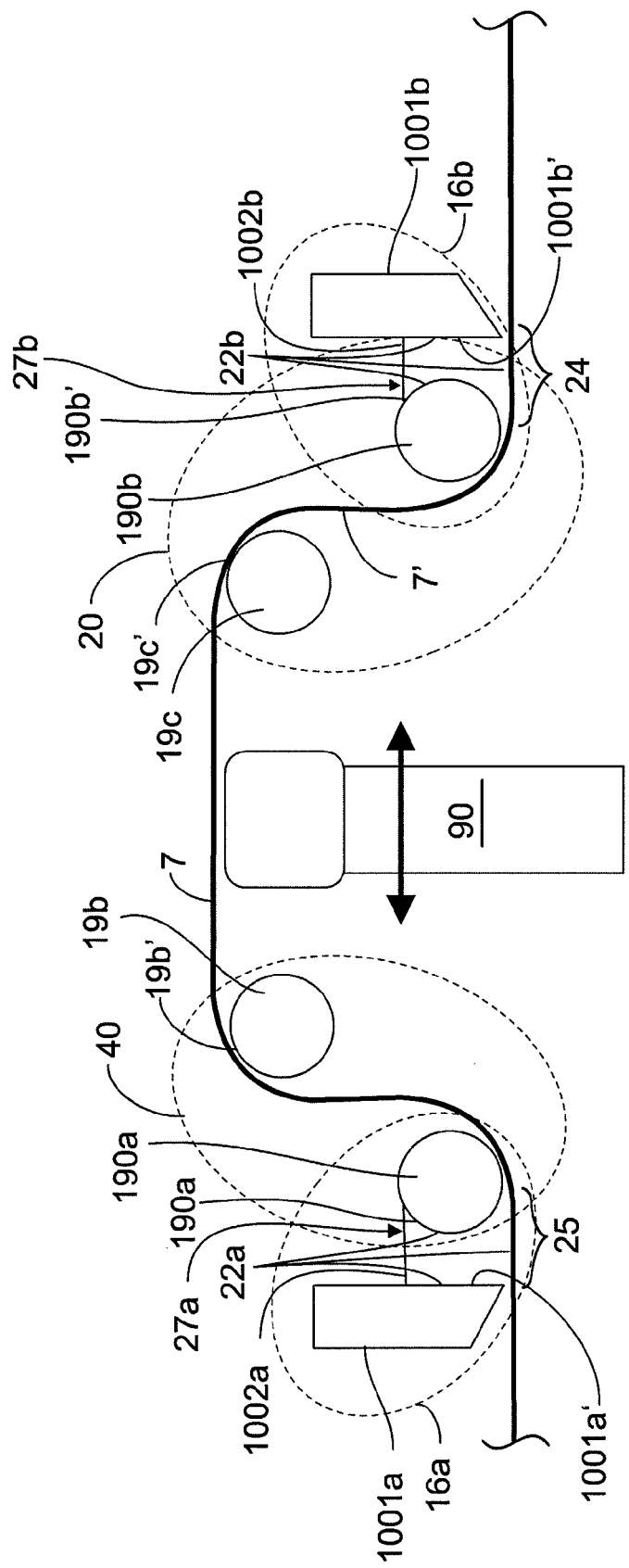
FIG. 10A is a close-up of a portion of FIG. 10.

FIG. 10 shows an embodiment wherein resin evaporation is minimized. To reduce evaporation, it is favorable to remove the resin from the foil in areas where the foil has just been separated (or peeled) from the object 50. This can be done by adding a remover or squeegee 1001, 1001a, or 1001b that moves together with coater assembly 20 or peeler assembly 40, thus forming a reservoir 16, 16a, or 16b of material 1002, 1002a, or 1002b. The reservoir 16b moves together with the assembly 20 and is, therefore, a moveable reservoir 16b. In the example embodiment shown in FIG. 10, the lower roller 190b of assembly 20 and squeegee 1001b form components of the moveable reservoir 16b. In FIGS. 10 and 10A, a plurality of containment surfaces 22b contain a volume of curable material 1002b within the moveable reservoir 16b. Specifically, a surface 1001b' of the squeegee 1001b, a surface 190b' of the lower roller 190b, and a portion 24 of the carrying surface 7 contact and contain the volume of curable material 1002b. The plurality of containment surfaces 22b thereby define a containment area 27b for containing the volume of curable material 1002b within the moveable reservoir 16b.

As shown in FIGS. 10 and 10A, the system 1 can include a second moveable reservoir 16a formed of assembly 40 and as second squeegee 1001a. The moveable reservoir 16a can include the same components as moveable reservoir 16b and be arranged in mirror symmetry with moveable reservoir 16b. For example, a second moveable reservoir 16a can include a second plurality of containment surfaces 22a to contain a second volume of curable material 1002a. A surface 1001a' of the second squeegee 1001a, a surface 190a' of the lower roller 190a, and a second portion 25 of the carrying surface 7 can form portions of the moveable reservoir and can contact and contain the second volume of curable material 1002a. The second plurality of containment surfaces 22a thereby define a second containment area 27a for containing the second volume of curable material 1002a within a moveable reservoir.

Various portions of the carrying surface 7 can form a containment surface of moveable reservoir 16b as the moveable reservoir 16b is moved across the foil. For example, referring to FIG. 15B, moveable reservoir 16b is shown moving from left-to-right (direction 73) and in position 42. Before moveable reservoir reaches position 42, shown in FIG. 15B, it passes through position 41, shown in FIG. 15A. In one embodiment where the moveable reservoir is moved from left-to-right (such as shown and described with regard to 15B), the moveable reservoir 16b can be positioned in a first position 41, shown in FIG. 15A, where a first portion 24 of the carrying surface forms at least one of the plurality of containment surfaces for the volume of curable material 1002b. When the moveable reservoir is moved from the first position 41 to a second position 42 position, slightly to the right of the object 50, the first portion 24 of the carrying surface is positioned in the object build area 28 and a second portion 25 of the carrying surface forms a containment surface of moveable reservoir 16b.

Figure 15A:
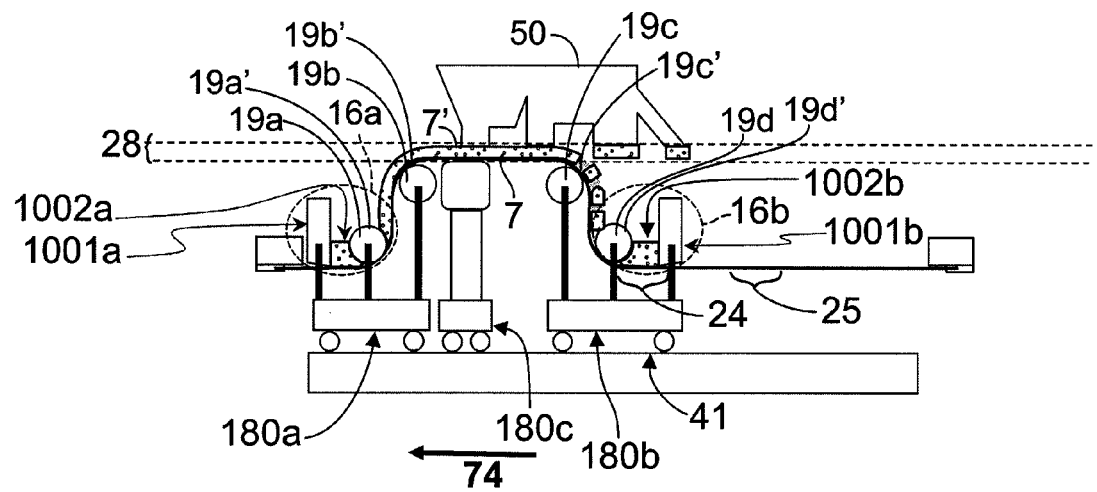
FIGS. 15A and 15B: the embodiment of FIG. 14 in reverse modes.
Figure 15B:
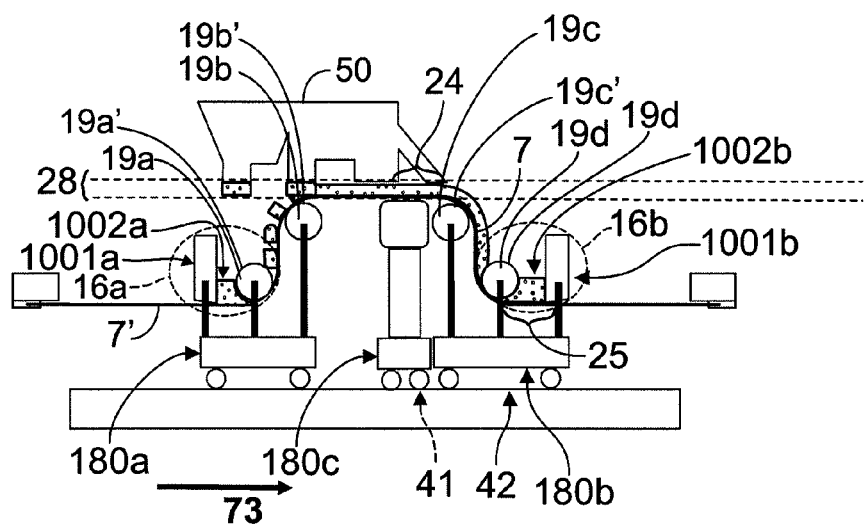

Referring to FIGS. 15A and 15B, in one embodiment, a surface 19c' of the upper roller 19c engages the non-carrying surface 7' of the foil 6 and a surface 19d' of lower roller 19d engages the carrying surface 7 of the foil 6. Surface 19c' can be referred to as a guide surface 19c' of the foil guiding element 19c. Similarly, surface 19d' can be referred to as a guide surface 19d' of the foil guiding element 19d. Guide surfaces 19c' and 19d' guide the foil as the moveable reservoir 16b is moved from the first position 41 to the second position 42 so that the portion 24 of the carrying surface is positioned in the object build area 28 when the moveable reservoir reaches the second position 42. The guide surfaces 19c' and 19d' can also guide the foil 6 out of the object build area, and peel the portion 24 of the carrying surface from the solidified layer of the object, as the moveable reservoir 16b is moved from the second position 42 to the first position 41.

Referring again to FIGS. 15A and 15B, in one embodiment, guide surface 19a' engages the carrying surface 7 of the foil 6 and guide surface 19b' engages the non-carrying surface 7' of the foil. Guide surfaces 19a' and 19b' can guide the foil 6 out of the object build area, and peel the portion 24 of the carrying surface from the solidified layer of the object, as the moveable reservoir 16a is moved from left to right. Guide surfaces 19a' and 19b' can also guide the foil as the moveable reservoir 16a is moved from right to left so that the portion 24 of the carrying surface is positioned in the object build area 28. In one embodiment, coordinated left to right movement of the moveable reservoirs 16a and 16b and coordinated right to left movement of the moveable reservoirs 16a and 16b can result in the building of two successive layers of the object.

Referring to FIG. 10, preferably the squeegee 1001b makes an angle alpha of approximately 10 degrees with the foil 6. This approximate angle was found to have the best scraping capability in one direction and the capability to allow resin to pass in the opposite direction, thus retrieving any resin left on the foil rather than pushing it to the edge of the machine.

Note that 1002b forms a reservoir, because it is enclosed all around: by the squeegee 1001b and by the upward running part of the foil 6. The squeegee 1001b may include extensions 43 having openings for passing shafts 44 of lower roller 190b, and seals 45 around the shaft passings. The extensions of the squeegee can also be referred to as side walls 43a and 43b for containing the volume of curable material.

In a bidirectional embodiment, a reservoir 1002 is formed on each side of the carriage 180. And there may be liquid layer providing roller (e.g., a Meyer bar) 190 also on each side of the foil guiding stage.

In an embodiment, the thickness of the liquid layer provided by the coater bars (Meyer bars) 19a, 19d, 190a, and 190b is at least equal to the thickness of the next layer, but preferably a bit more. For example, for building with layers of 50 um, a good value for the liquid layer thickness is around 70-80 um. Thus when the foil with the liquid layer is moved towards the object, the space of 50 um between the foil and the previous layer on the object is completely filled with liquid resin. The surplus of resin (20-30 um) is pressed forward in front of the roller that lifts the foil towards the object, or sideways into spaces that may be present in the object as built so far.

The rollers that provide the liquid layer (e.g., Meyer bars) 19a, 19d, 190a, and 190b are preferably knurled, or profiled, so that the amount of resin that is transported in the recesses of the Meyer bar from the reservoir side of the Meyer bar to the exposure unit side of the Meyer bar is sufficient to provide the desired (in the example: 70-80 um) thickness of liquid layer. It is to be noted that the liquid in the recesses only partly remains on the foil behind the Meyer bars, and part stays on the Meyer bar. Therefore the size of the recesses has to be determined experimentally.

Figure 11:
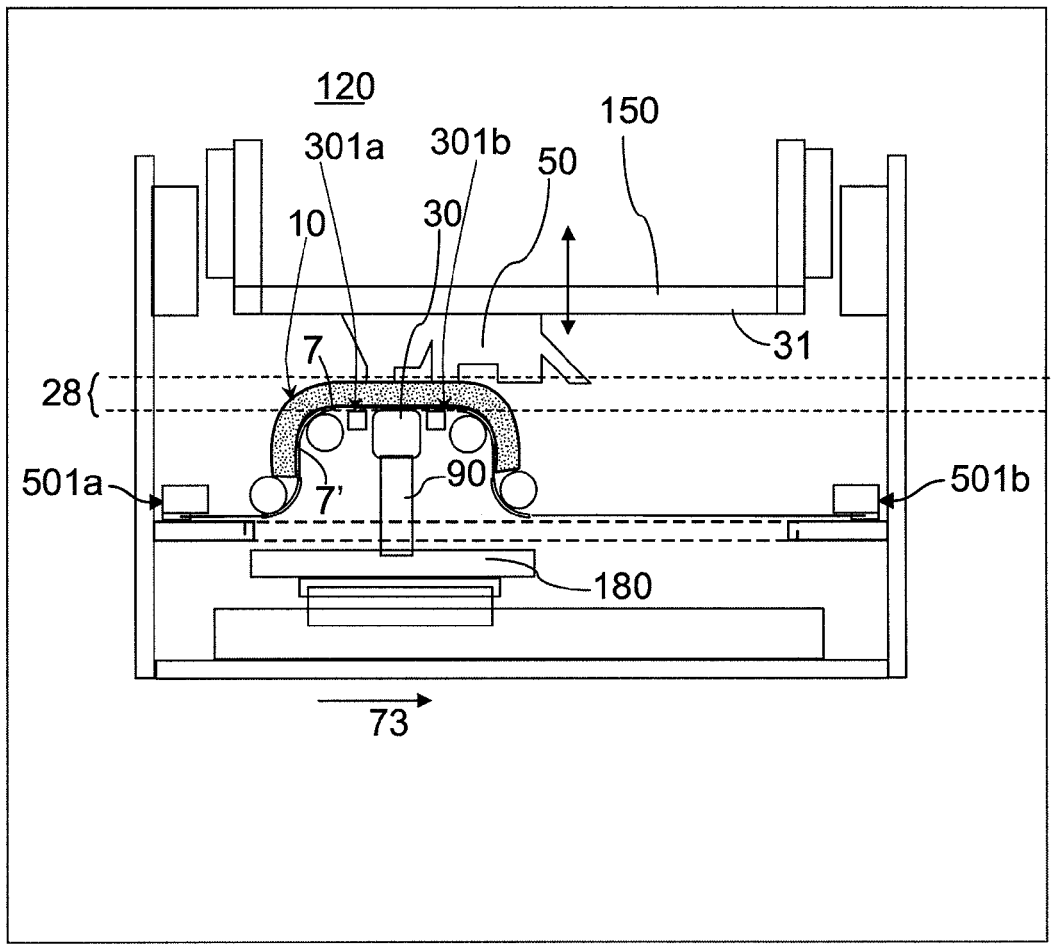
FIG. 11: a schematic embodiment including resin heaters.

FIG. 11 exemplifies an embodiment, where the resin is heated and discloses equipment used for heating and placement to improve the operational temperature conditions of the resin.

For the building process to work well, between the exposure and the separation from the foil, the resin should be cured to a certain extent, in order for the newly formed layer to adhere to the previously built layers of the object. For many resins, e.g. DSM Somos 8120 (an epoxy acrylate), exposed at 365 nm, curing is faster at a higher temperature. In fact, the mentioned resin is found in an embodiment to work well when used above room temperature, preferably approximately between 30 and 40° C. Thus it is beneficial (allows shorter time between exposure and separation) to have a provision to heat the resin to above room temperature. Surprisingly an elegant solution was found to include a small heating bar 301a, 301b to be kept in thermal contact with the underside (non-liquid-contacting side) of the foil, in close proximity of the exposure head. For bidirectional operation, a second heater 301b on the opposite side of the exposure head 30 may be added. The heating bars 301a and 301b can also be referred to as heating elements and can be configured to apply heat to at least one of the volume of curable material 1002, the layer of curable material 10 on the carrying surface 7, the carrying surface 7, the foil 6, and the moveable reservoir 16. The heating elements can be secured to the moveable reservoir 16.

The heater bar 301 is preferably close to the exposure head, to keep the heated area small, and to keep the total system compact (and thereby fast). In case there is also a vacuum chamber, the heater bar(s) can be either inside or outside the vacuum chamber.

At first sight, one might think that such a small bar would not give sufficient temperature increase, because the foil is only in contact with the bar for a very short time, e.g. 0.2 s (heater bar width 2 cm, movement speed 10 cm/s); but we found it does. Analysis showed that this time is sufficient for the heat of the bar to penetrate the foil with resin layer, because the resin and foil are thin (e.g. 0.2 mm in total). The temperature of the bar does not even have to be much above the target temperature to achieve this. E.g. to achieve a foil and resin temperature of 30° C. typically a heater bar temperature of about 40° C. is required.

The heater bar is preferably of a material with high heat conductivity. E.g. it can be an aluminum housing (e.g. a square tube of approximately 2×2 cm), heated e.g. by an electric heater inside.

In an embodiment, the underside of the object built so far, and the top of the exposure unit, are at or around the target temperature (30° C. in the example). This state arises automatically after a number of cycles have been performed. Thus, the building process in this embodiment can be started by performing a number of 'dummy' cycles, i.e. cycles where no exposure is performed, and no vertical movement of the z-stage 150 is performed. This heats up the underside of the platform 150 and the top of the exposure unit to the required process temperature. Alternatively, other heating means can be used to pre-heat these parts before starting the actual building process.

For example, a heating element can be built into the platform 150, and the pre heating of both the platform and the top of the exposure unit are carried out with the platform close to the exposure head (e.g. 1 mm distance or less).

Exothermic Resins:

The curing process of most resins is exothermic, i.e. heat is generated in the curing process. Thus the required amount of heating by the heating bars will vary depending on the resin being processed. Even some cooling may be required to keep the process temperature from rising too much. Thus the heater bars may be provided with a cooling element inside, and the amount of heating/cooling may be controlled (automatically or manually), based on a temperature sensor, that is e.g. built into the top of the exposure unit. Similarly, the object platform may contain not only a heater but also a cooling element.

This heating method is much preferable over a larger heating system, e.g. one which keeps the several moving units of the machine, and the resin reservoir, at an increased temperature. The invented heating method keeps the heated part of the total system as small as possible, and thus requires much less power. Another advantage is that the resin is only at increased temperature during the process phase when this is useful (from exposure through separation); it can cool down immediately afterward, thus preventing any unwanted effects in the unexposed resin, such as aging, evaporation, or thermal curing.

Figure 12:
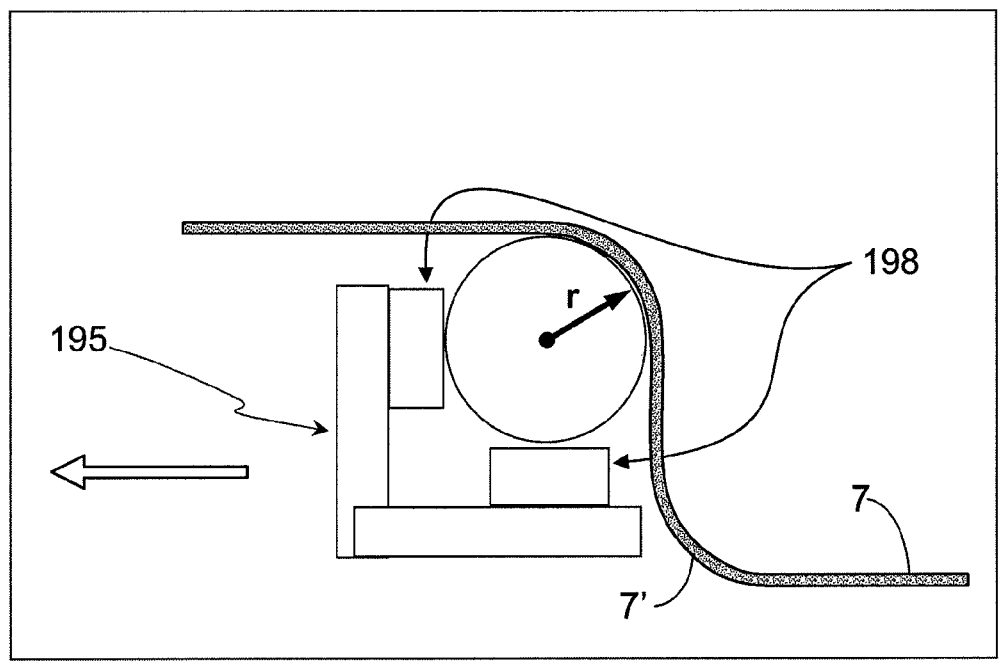
FIG. 12: a detail of a roller assembly.

FIG. 12 discloses a drawing wherein a radius of the roller is disclosed specifically. In addition, FIG. 12 illustrates bearings 198 provided on the outside of the roller. An optimum radius r of peeling rollers is provided in a range smaller than 10 mm. While a large radius r might be supposed to give a gradual, 'gentle' peeling and thus allow sufficient time for the last-cured layer to separate from the foil, surprisingly, it is found that a small radius works better: it allows for a higher separation speed, without damaging the last-cured layer.

A radius of approximately 10 mm or smaller is preferred, typically even approximately 6 mm or smaller. In addition, with a small diameter, in combination with the large width of the working area (e.g. 50 cm), the stiffness of the roller construction may be challenging. The roller has to withstand the tension force of the foil, and still remain straight. A shaft through the centre of the roller typically is not stiff enough. Advantageously the peeling roller is supported by bearings on the outside. These can be positioned at as many positions along the length of the roller as is necessary to achieve the desired straightness. In FIG. 12 outside bearings are shown as friction bearings 198, supported on the stiff peeling unit frame 195; of course any other type of bearing can also be used, in particular roller bearings. In an embodiment, at least four bearings are used. In another embodiment, at least one bearing is located on the horizontal floor of the peeling unit frame and at least one bearing is located on the vertical wall of the peeling unit frame.

The foil may be clamped lengthwise by the clamps 501a and 501b in FIG. 11. A mechanism may be provided (not shown) to keep the length of the foil under a predefined tension. The optimum tension depends on the type and thickness of the foil, but may typically be around 10 N per cm of foil width (500 N for a foil width of 50 cm). This tension may keep the foil flat over the area where this is necessary: the part that is at the object contacting height (H in FIG. 1). Significantly lengthwise tension can be sufficient to keep the foil flat over the whole of this area, including its side edges and not require clamps or other tension devices on the side edges.

In another embodiment of the invention, there are also types of foil, typically (but not exclusively; it is not fully understood which foil properties exactly are determining in this respect) those with lower modulus of elasticity, where the lengthwise tension by the clamps 501 is insufficient to keep the foil flat over the whole of the relevant area. In particular the side edges in this embodiment can show a tendency to move up or down or wrinkle from the intended plane. In such cases a solution can be found in the addition of side clamps, which may take one of the following forms or other forms:

The edge of the foil is perforated with holes at regular intervals, e.g. 2 cm; on the exposure unit carriage corresponding sprocket wheels are provided, at least one for each side of the foil, the teeth of which engage in the perforation and which sprocket wheels are forced outward by means of e.g. a spring, so that they exert an outward force on the foil edge, and thus provide a widthwise tension in the foil above the exposure unit.

In an embodiment, an improvement over simple sprocket wheels are toothed belts, the teeth of which engage in the foil perforation and which have a certain length (e.g. 5-20 cm) running parallel to the foil plane.

A number of movable mechanical grippers may be positioned on the machine frame along the sides of the foil. Each gripper comes forward, grips the edge of the foil, and exerts an outward force on the foil edge, for as long as the foil in front of the gripper is at the high level H. So from the moment the lifting roller 19 has passed in front of the gripper until just before the peeling roller 19 arrives in front of the gripper.

A suction clamp may be provided above the foil. The clamp is a long, narrow device on each side of the working area, having a length about equal to the length of the work area (object building area). The bottom surface of each clamp is a suction face, typically realised by a porous material backed by an underpressure chamber.

As soon as part of the foil edge is lifted from the lower lever to the level H where it touches the suction clamp, this piece of foil may be kept sucked against the clamp and it cannot move any more. At the lifting roller, the foil is under tension and thereby is also stretched sideways, and in this sideways-stretched condition both edges are fixed against the suction clamps. Due to the clamps the foil remains stretched sideways even after the lifting roller has passed.

The same effect as with the suction clamp can be realised by a sticky surface in stead of a suction surface. For example a clean soft silicone sheet of e.g. 1 mm thickness acts sticky with respect to many foil materials. If such sticky material is mounted on a stiff clamp frame, and positioned such that the lifting rollers lifts and presses the foil edges against the sticky material, we obtain the desired sideways stretching effect.

Figure 13:
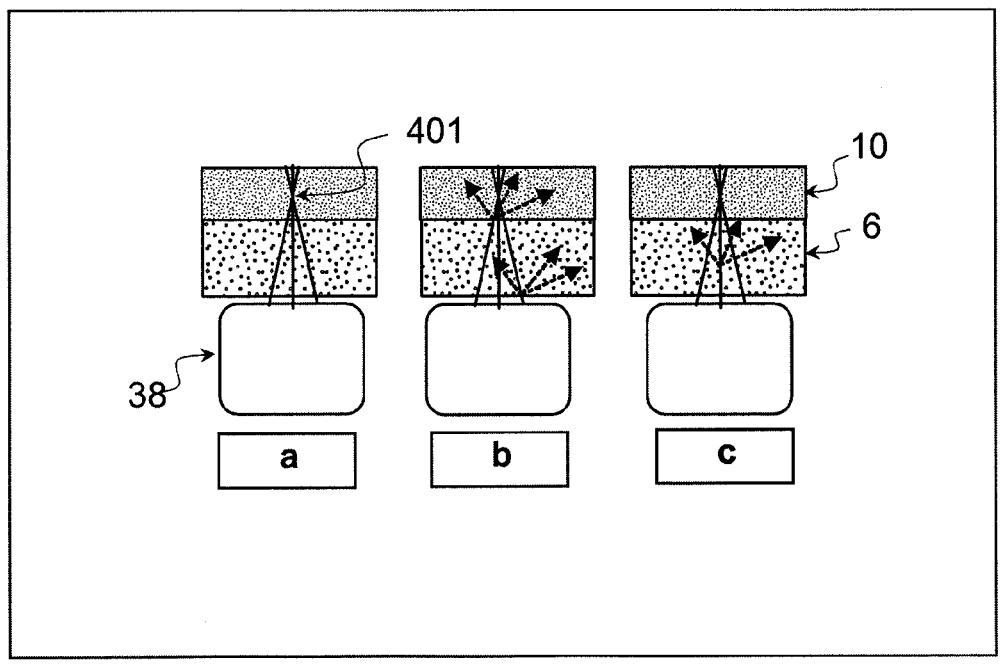
FIG. 13: optical transmission details of a foil.

FIG. 13 discloses an interesting detail since it was found that only the side of the film away from the liquid layer 10 needs to be optically clear; the side facing the liquid layer 10 can be allowed to be diffusive, since surprisingly its diffusiveness is removed by the wetting by the resin that is applied on the surface. This may reduce the manufacturing requirements for the foils.

The foil 6 forms an optical path between the exposure head 38 and the resin to be exposed and thereby influences the optical transmission. In an embodiment illustrated in FIG. 13A, the exposure head can be arranged to give a sharp focus 401 halfway in the resin layer 10 (see FIG. 13a). In such an embodiment diffusive (matte) structures in the optical path are unfavorable. E.g. matte bottom or top surfaces of the foil would give light scattering as illustrated in FIG. 13b. Similarly, diffusiveness of the foil's bulk material (FIG. 13c) would lead to light scattering that could destroy the sharp focus 401.

Experiments were run with foil that was matte on one side. With FIG. 13b in mind we put the matte side upward, to keep the effect of the scattering smaller. Surprisingly we observed that the scattering at the matte top surface was eliminated at the moment the resin layer was applied to the top surface. Surprisingly, in certain embodiments of the invention, only one of the foil surfaces (and the bulk) needs to be optically clear (non-diffusive), the other surface can be allowed to be matte. The matte side is then to be used as the resin-contacting side. This finding is important, since it is much more difficult to produce foil that is optically clear on both surfaces.

It is noted that the foil side facing the liquid layer should easily separate from (fully or partially) cured resin. Materials that meet this condition include but are not limited to TPX (bulk), silicone (applied as a coating on a foil of different material) and other materials that allow for easy separation.

The method and system of the invention have been tested successfully with acrylate and epoxy (and epoxy-acrylate) resins, using exposure with UV light around 365-375 nm. The following commercial types are among these:
DSM Somos 8120 (epoxy-acrylate)
Envisiontec R5 Profactory (acrylate)

To prevent sticking between underside of foil and topside of exposure head, which can occur due to van der Waals forces when these surfaces are very smooth, a very light rubbing with talcum powder or similar may be applied.

Figure 14:
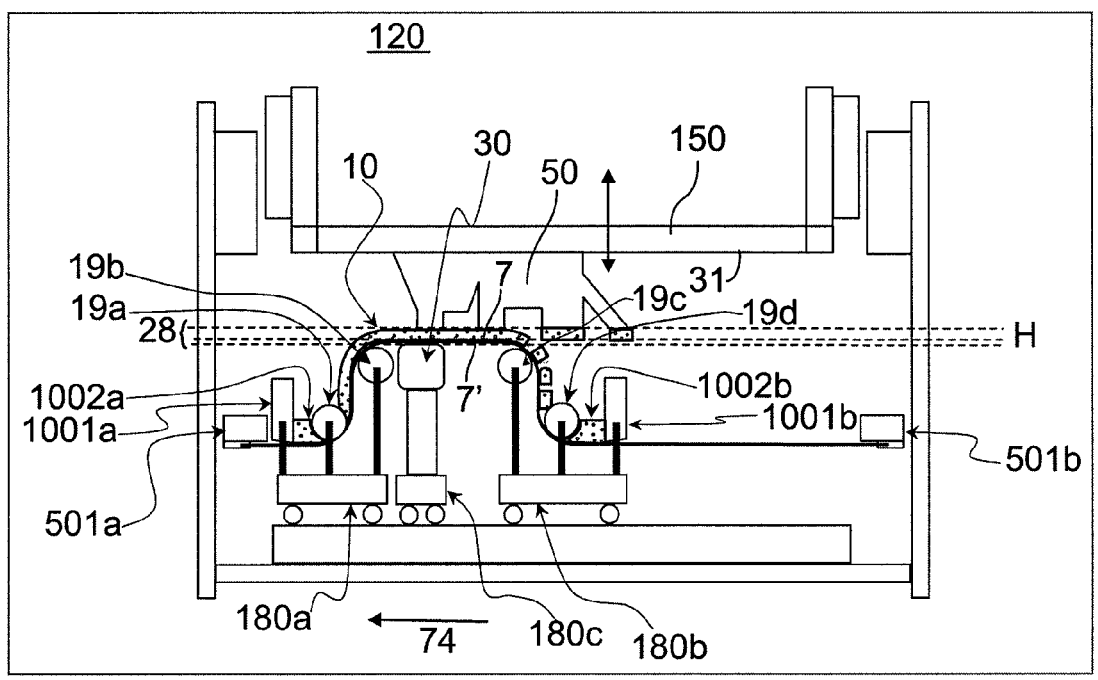
FIG. 14: bidirectional solidification processing.

FIG. 14 provides additional disclosure of a bidirectional embodiment. While the solidifying method can be applied either in a unidirectional way or in a bidirectional way as previously discussed, an advantage of bidirectional use may be that process time can be gained by avoiding to have to return all the process carriages back to their start position before a new cycle can be started. Instead, after a pass in one direction, the carriage(s) can reverse instantly and start the process in the opposite direction.

In one example of a bidirectional embodiment, certain elements of the machine may be configured in mirror-like symmetry so that such elements can switch functions when the direction is switched. Referring to FIG. 14 this can be explained as follows:

As shown here a first process step is carried out in the right-to-left direction 74. Lower roller 19*a* has the function of providing the liquid layer, upper roller 19*b* has the function of lifting the coated foil up to the level H;

On the side of the exposure head 30 opposite rollers 19*a* and 19*b*, upper roller 19*c* has the function of peeling roller, and the lower roller 19*d* has the function of guiding the foil back to the lower level H0 (shown in FIG. 1).

After a single cycle has been completely performed from right to left (the foil has been completely peeled off from the product), a new cycle can be started immediately from left to right. Now the functions of 19*c* and 19*b* are interchanged, and the functions of 19*d* and 19*a* are interchanged.

So upper rollers 19*c* and 19*b* can be designed to be suitable for both the lifting and the peeling function. This constraint may lead to a compromise design w.r.t. e.g. the roller radius, as the peeler roller radius is preferably small, as explained in conjunction with FIG. 12.

In that case the switchable solution discussed in conjunction with FIG. 5 can be used. Additionally, lower rollers 19*a* and 19*d* can be arranged to be suitable for both providing a liquid layer of correct thickness, and for guiding the foil. A reservoir can be present on either sides (1002*aa* and 1002*b*).

Note that the squeegees 1001*a* and 1001*b* are preferably both present even in the case of unidirectional use (even in that case the resin must preferably be retained within the space defined by the squeegees).

In one example of a bidirectional embodiment, separate carriages for the exposure unit (180*c*) and for the equipment on either side of the exposure unit (180*a* and 180*b*) can be used in contrast to previously disclosed single carriages.

This has the advantage that the distances between the carriages can be optimized for the movement direction, in dependency of the times required for the different subprocesses.

One example is that some curing time is required between exposure and peeling, to give the resin sufficient strength to withstand the peeling process. So one preferable configuration is to have the exposure unit following the coating unit immediately, but the peeler roller following the exposure unit at a certain distance, corresponding to the required curing time before peeling. The different distances between the units for the two process directions 74 and 73 are shown in FIGS. 15A and 15B.

Referring to FIGS. 16A through 16D, an example embodiment of the moveable reservoir 16 is shown with features that can be included individually or collectively in various embodiments of a moveable reservoir. In one embodiment, the moveable reservoir 16 includes a plurality of containment surfaces 22 defining a containment area 27 for containing a volume of build material within the moveable reservoir 16. Specifically, a surface 1001' of the squeegee 1001, a surface 190' of the lower roller 190, and a portion 24 of the carrying surface 7 are arranged to contact and contain a volume of build material. The squeegee 1001 may engage the carrying surface 7 and create a liquid seal between the carrying surface 7 and the squeegee 1001 by directly contacting the carrying surface. A gasket (not shown) or similar structure may also be positioned between the squeegee 1001 and the carrying surface 7 to form a seal.

Figure 17A:
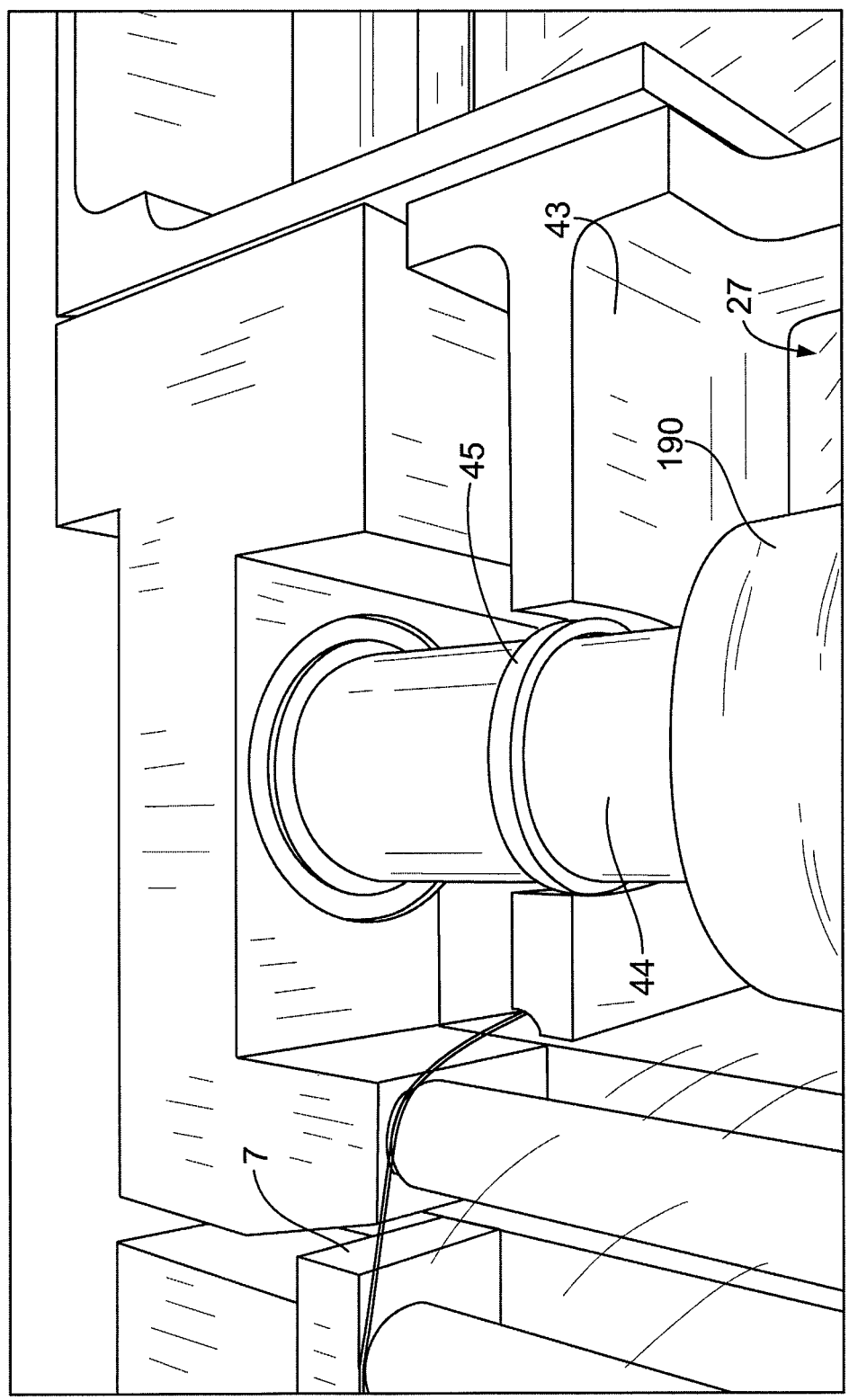
FIG. 17A is a top perspective view of an embodiment of a seal positioned around the shaft of an applicator.
Figure 17B:
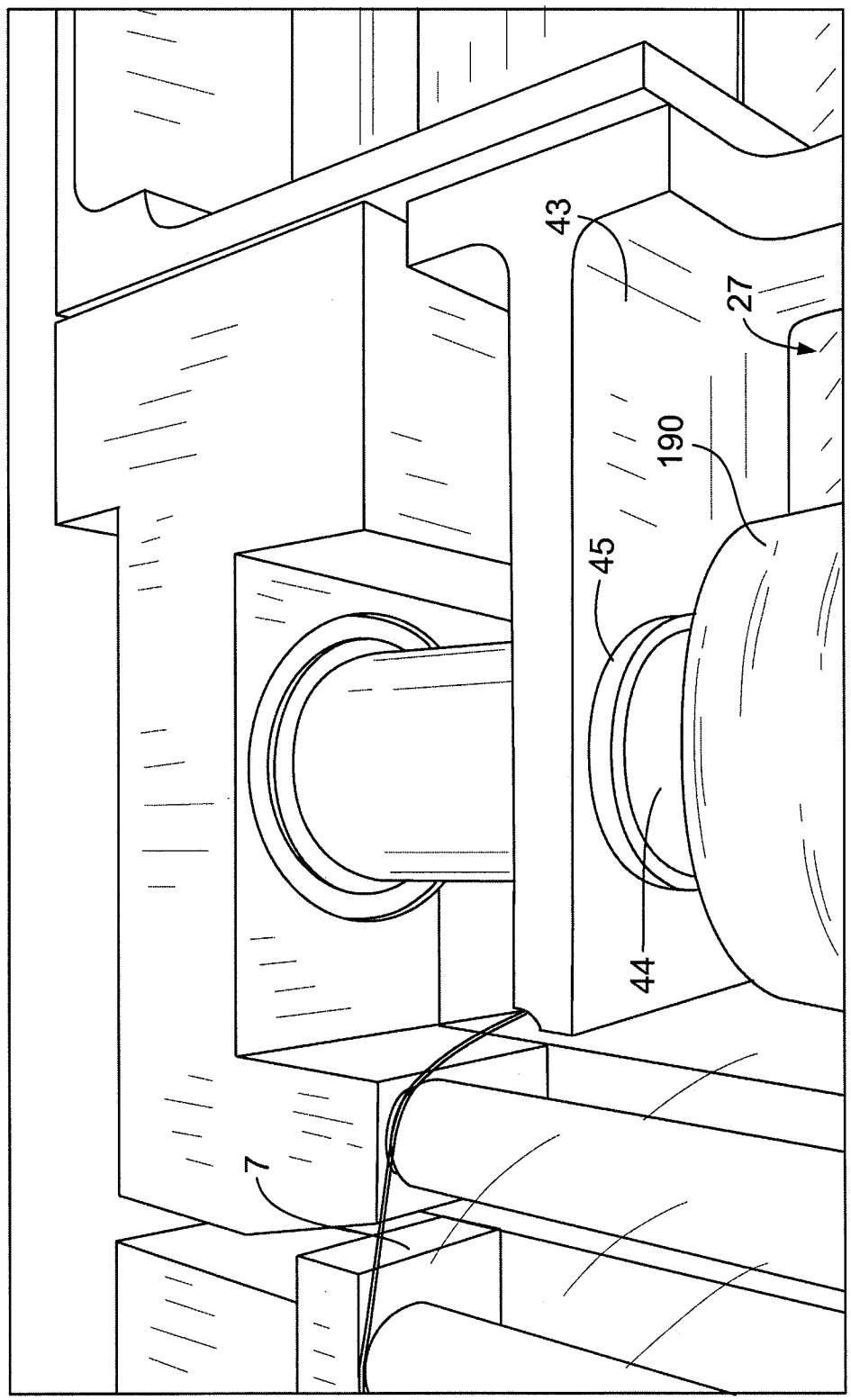
FIG. 17B is a top perspective view of another embodiment of a seal positioned around the shaft of an applicator.
Figure 17C:
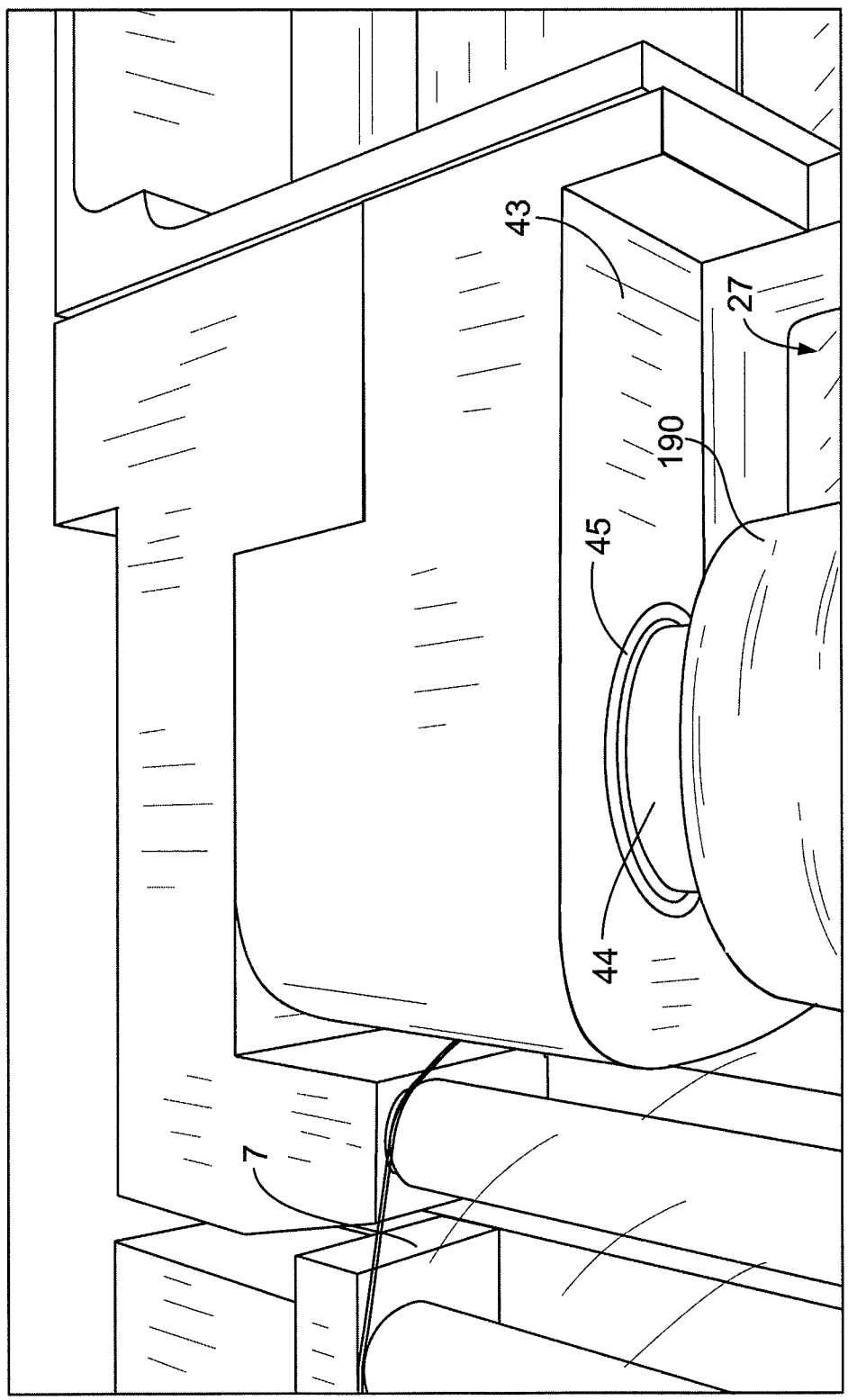
FIG. 17C is a top perspective view of another embodiment of a seal positioned around a shaft of an applicator.

In one embodiment, the squeegee 1001 may include side walls 43*a* and 43*b*, which can also be referred to as extensions, each having an opening for passing a shaft 44*a* or 44*b* of lower roller 190. The side walls 43*a* and 43*b* can include a seal 45 around the shaft passings. The shaft 44*a* or 44*b* can extend through the side wall 43*a* or 43*b* and the seal 45 can be positioned around the shaft where the shaft meets the side wall to prevent build material from leaking from the containment area 27 of the moveable reservoir. FIGS. 17A through 17C show example embodiments of a side wall 43 of the squeegee and seal 45.

In one embodiment, the squeegee 1001 includes a cut-out (46*a* or 46*b*) defined in the surface of the squeegee which engages the foil 6. Referring to FIGS. 16C and 16D, the cut-outs 46*a* and 46*b* may be positioned adjacent an edge of the foil 6 and dimensioned to permit the edge of the flexible foil to curl into at least a portion of the cut-out. The force exerted by the squeegee on the foil may cause the edge of the foil to curl into the cut-out. In addition, a curling guide (not shown) can be used to curl the edge of the foil. The curling guide can be an integrated component of the squeegee or a component separate from the squeegee. The curling of the foil permitted by the cut-out helps to prevent build material which may seep past the squeegee to remain within the boundary of the foil 6.

In one embodiment, the moveable reservoir 16 can include two upper rollers 19*c*-1 and 19*c*-2, (see, e.g., FIG. 16C) which can also be referred to as foil guiding elements, that engage the foil 6 and can position the foil 6 at contact height H in the object build area. Upper roller 19c-2 can be a flexible roller or curved roller in accordance with EP10189599.3, which is incorporated by reference as if fully set forth herein. Embodiments with flexible rollers or curved rollers can be used, for example, to control motion of the foil 6.

Figure 16A:
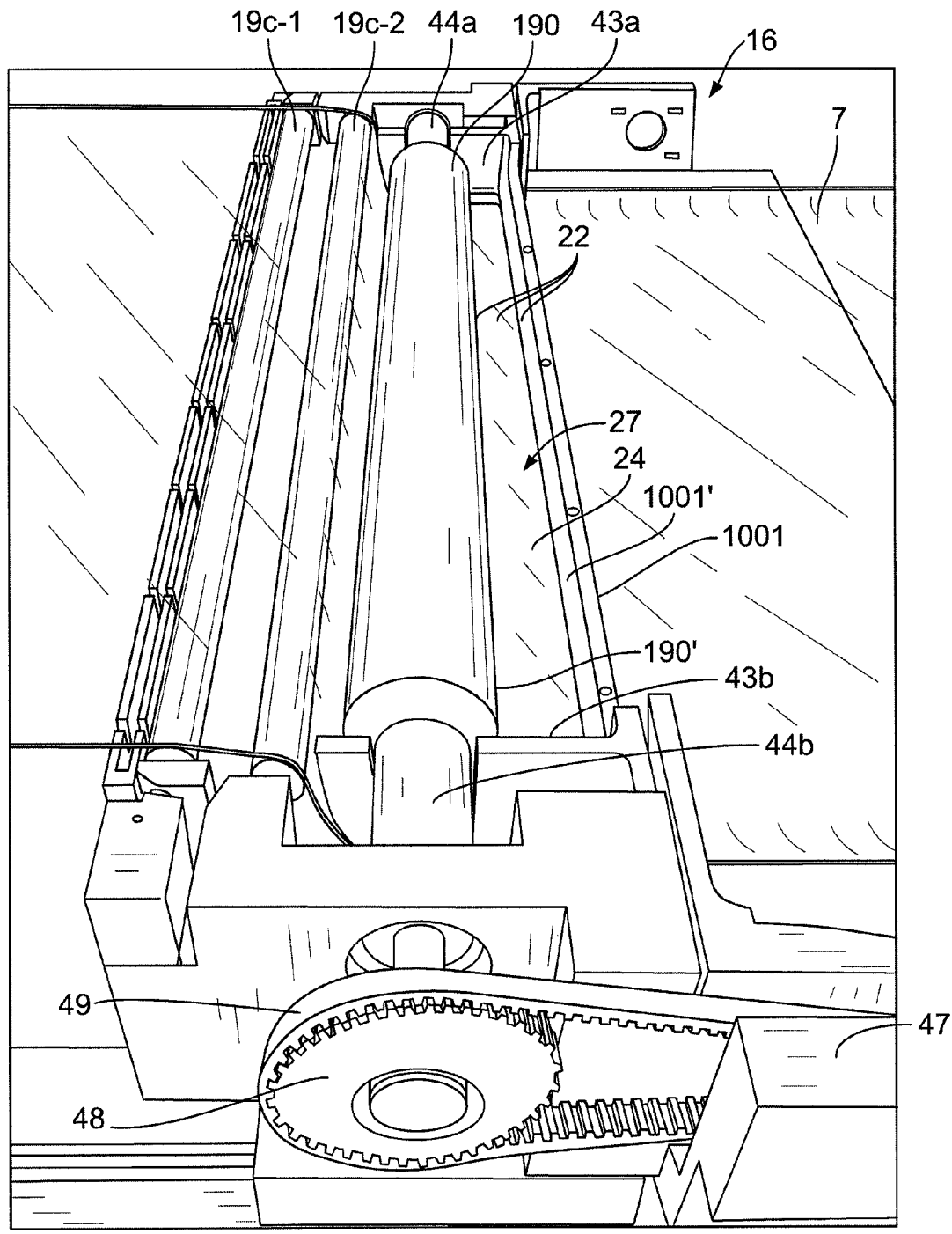
FIG. 16A is a top perspective view of an embodiment of a moveable reservoir.
Figure 16B:
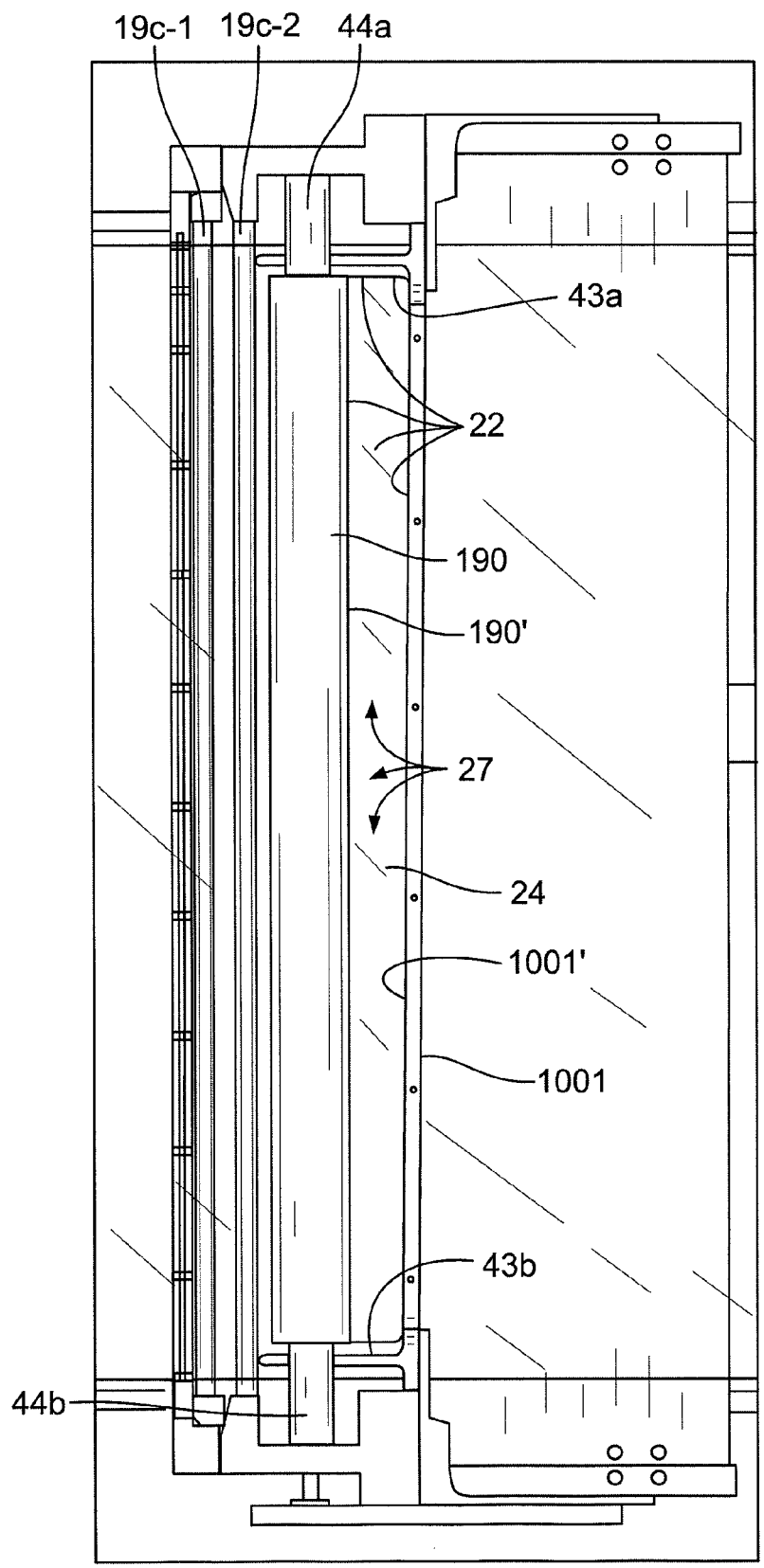
FIG. 16B is a top view of the moveable reservoir of FIG. 16A.
Figure 16C:
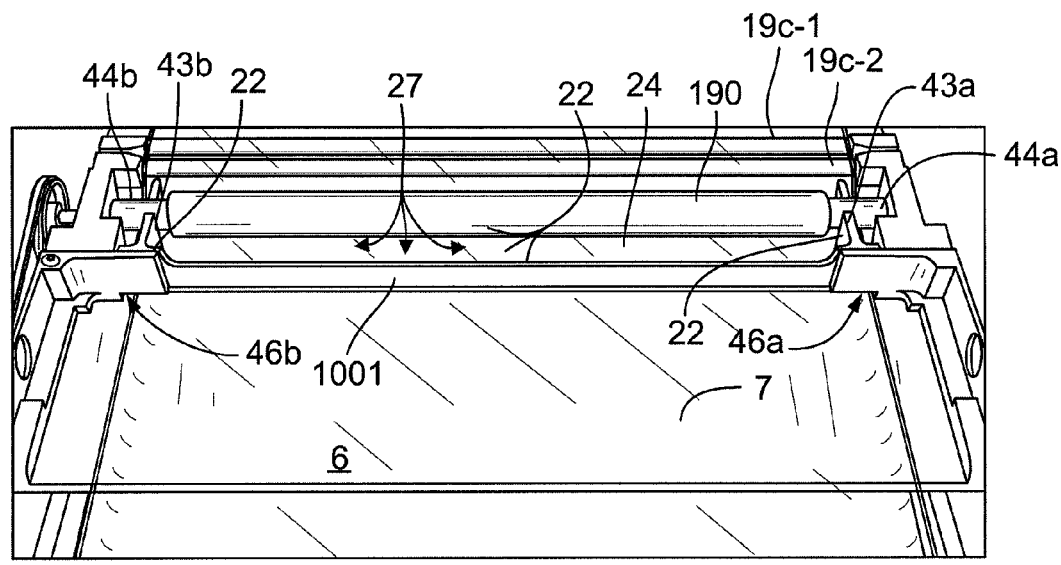
FIG. 16C is a rear perspective view of the moveable reservoir of FIG. 16A.
Figure 16D:
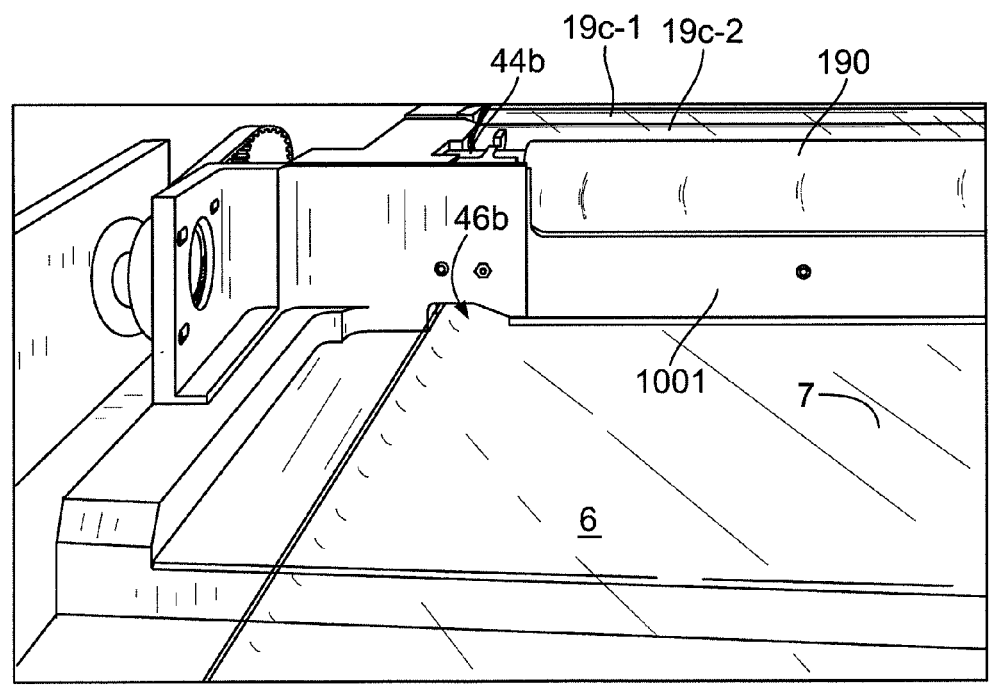
FIG. 16D is a second rear perspective view of the moveable reservoir of FIG. 16A.

In one embodiment, the moveable reservoir 16 includes a rotator 47 engaging the lower roller 190 to apply torque to the lower roller 190 (see, e.g., FIG. 16A). The rotator 47 can rotate the lower roller 190 in the direction of travel of the moveable reservoir. FIGS. 23 and 24, discussed below, depict examples of the lower roller 190 rotating in the direction of travel of moveable reservoir 16. The roller 190 can be rotated so that the surface of the roller that engages the carrying surface 7 of the flexible foil 6 moves at a linear velocity that is equal to the linear velocity of the moveable reservoir 16. Such rotation can, for example, help prevent the flexible foil 6 from being held up or wrinkling at the point were the roller 190 engages the carrying surface as the roller 190 is moved across the carrying surface 7 with the moveable reservoir 16.

In one embodiment, rotator 47 can include, for example, a belt-driven gear and motor system where a gear 48 engages at least one end of the roller 190 and is driven by a belt 49 and motor that engages the gear 48. Other rotator devices can be used, such as direct drive systems that do not rely on a belt.

Figure 18:
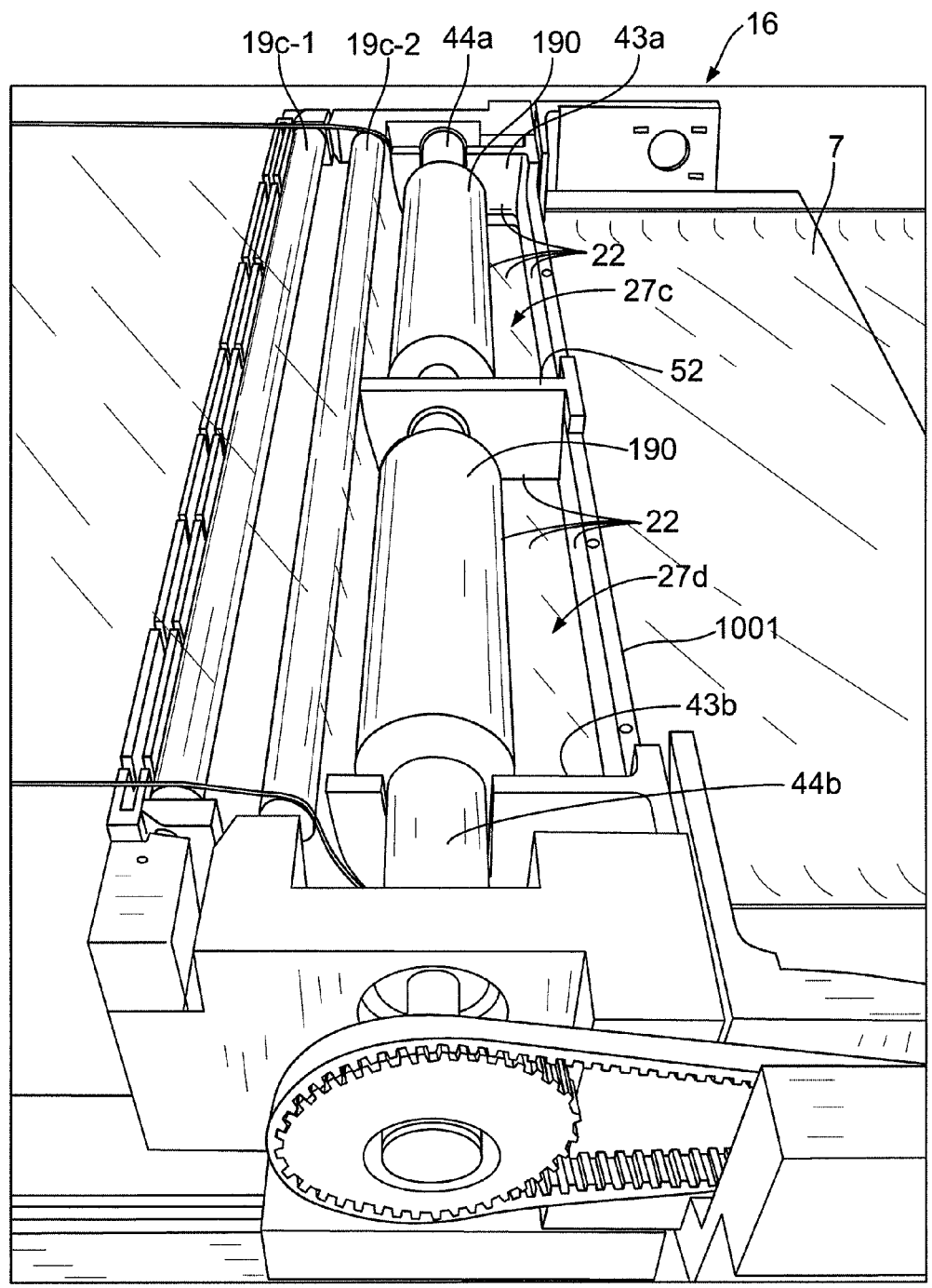
FIG. 18 is a top perspective view of an embodiment of a moveable reservoir with a divided containment area.
Figure 19:
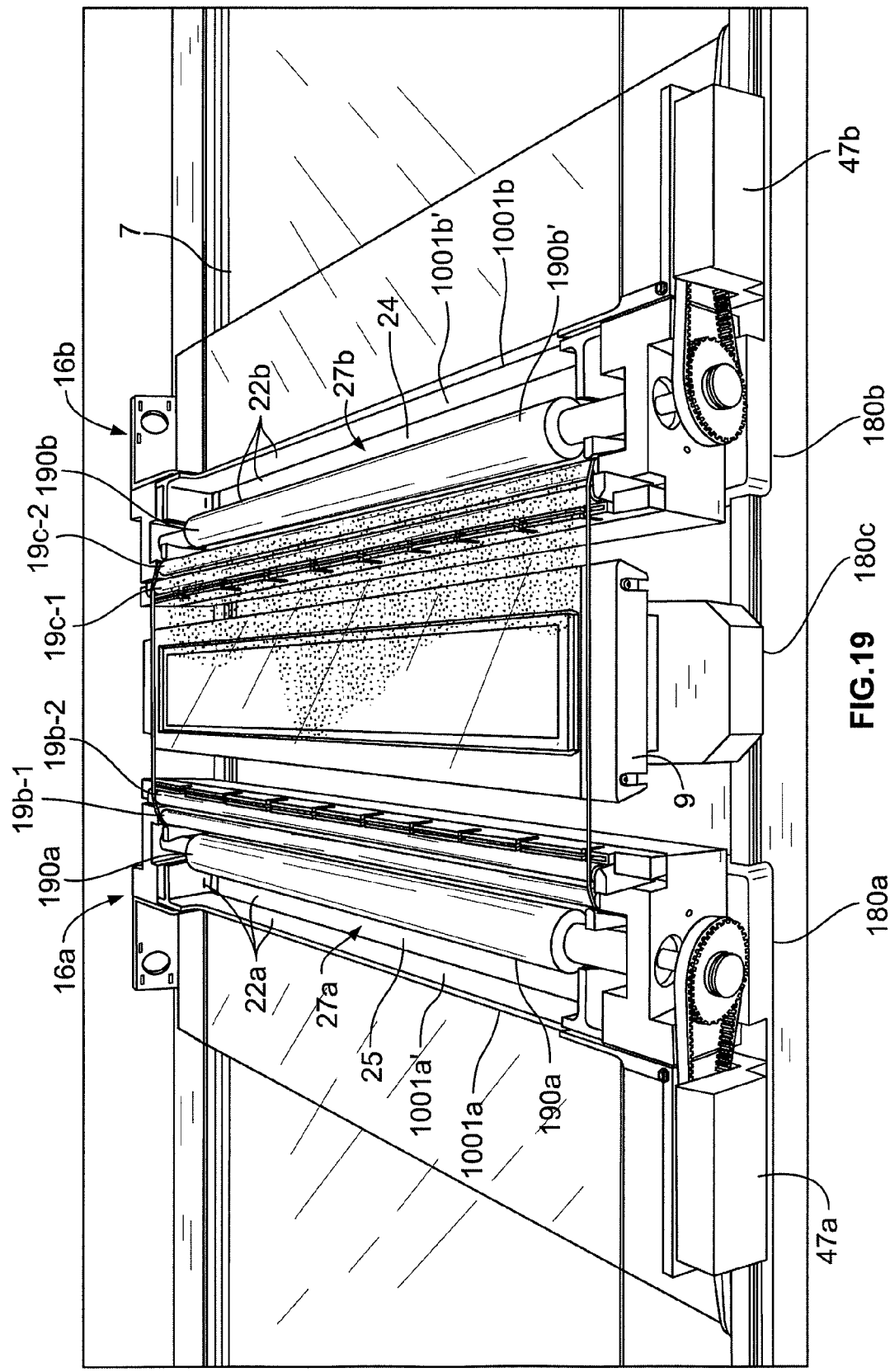
FIG. 19 is a top perspective view of an embodiment of the current invention with two moveable reservoirs.

Referring to FIG. 18, in one embodiment, the moveable reservoir 16, includes a divider 52 to divide the containment area 27 into a first division 27c and a second division 27d. The divider 52 can be configured to form a fluid seal between the first division 27c and the second division 27d so that a volume of build material in the first division 27c cannot mix or leak into a volume of build material in the second division 27d. Embodiments of the moveable reservoir 16 that include a divided containment area can be used for, for example, to build with a first build material from first division 27c and a second build material from the second division 27d. In addition, in circumstances when building an object requires less than the entire surface area of the carrying surface (such as building a small object) only one of the divisions can be used, thereby reducing the amount of resin that is spread across the carrying surface and decreasing the amount of resin subject to loss by evaporation or leakage. In addition, in embodiments with a moveable plate, discussed below, a single object can be made with a first build material from the first division 27c and a second build material from the second division 27d by positioning the object in the object build area covered by the first division 27c to build one layer of the object and positioning the object in the object build area covered by the second division 27d to build another layer of the object.

Referring to FIGS. 10, 10A, 14, 15A, 15B, and 19 through 21, embodiments of the system 1 can include two moveable reservoirs 16a and 16b. Embodiments with two moveable reservoirs can be used, for example, in a bidirectional system, such as the bidirectional system described above in reference to FIGS. 10, 10A, 14, 15A, and 15B. The two moveable reservoirs 16a and 16b can include the same elements and be configured in mirror-like symmetry so that such elements can switch functions when the direction is switched, as described above with regard to FIGS. 14, 15A, and 15B.

Figure 20:
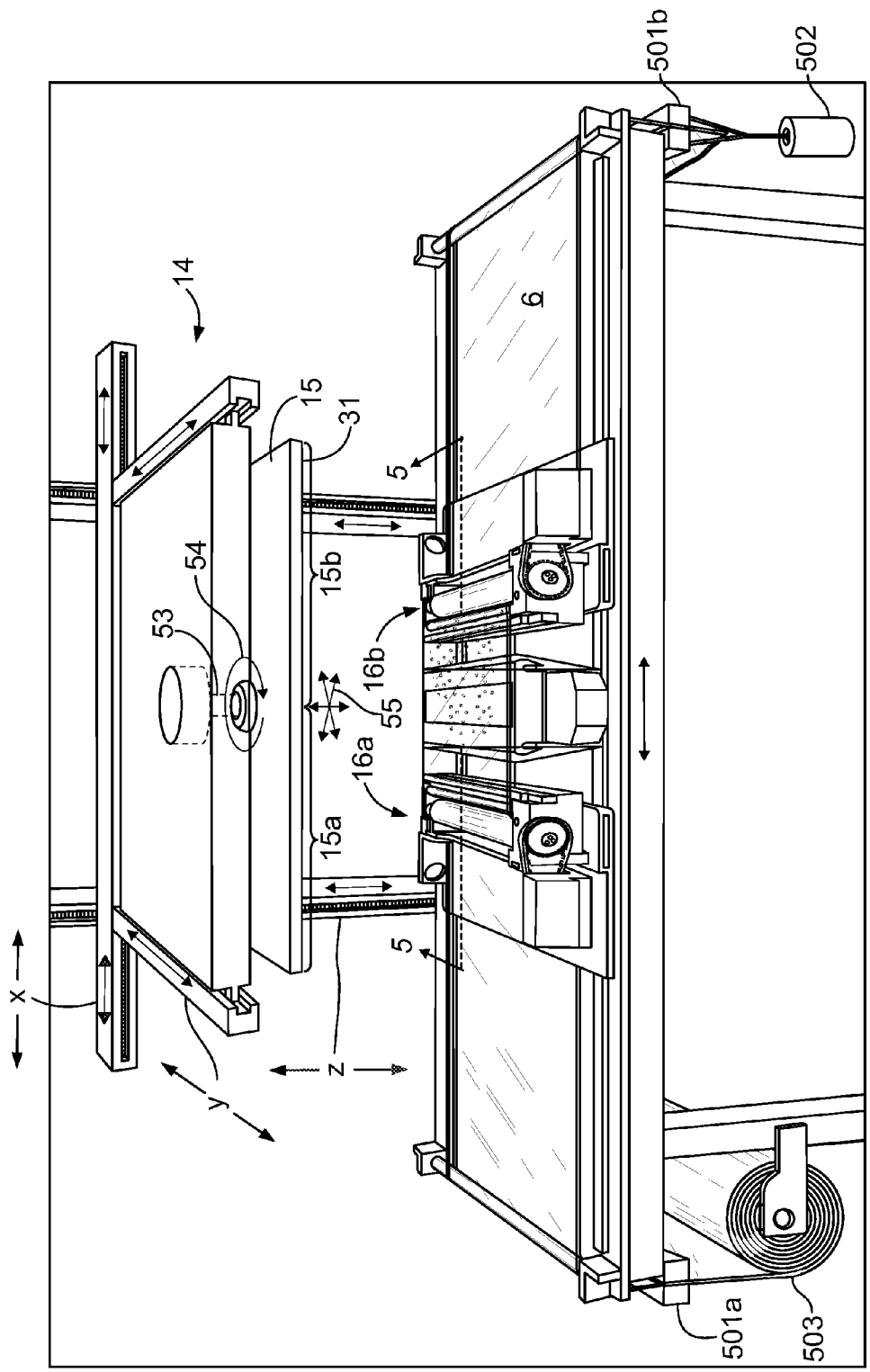
FIG. 20 is a top perspective view of an embodiment of the current invention with two moveable reservoirs and moveable plate.
Figure 21:
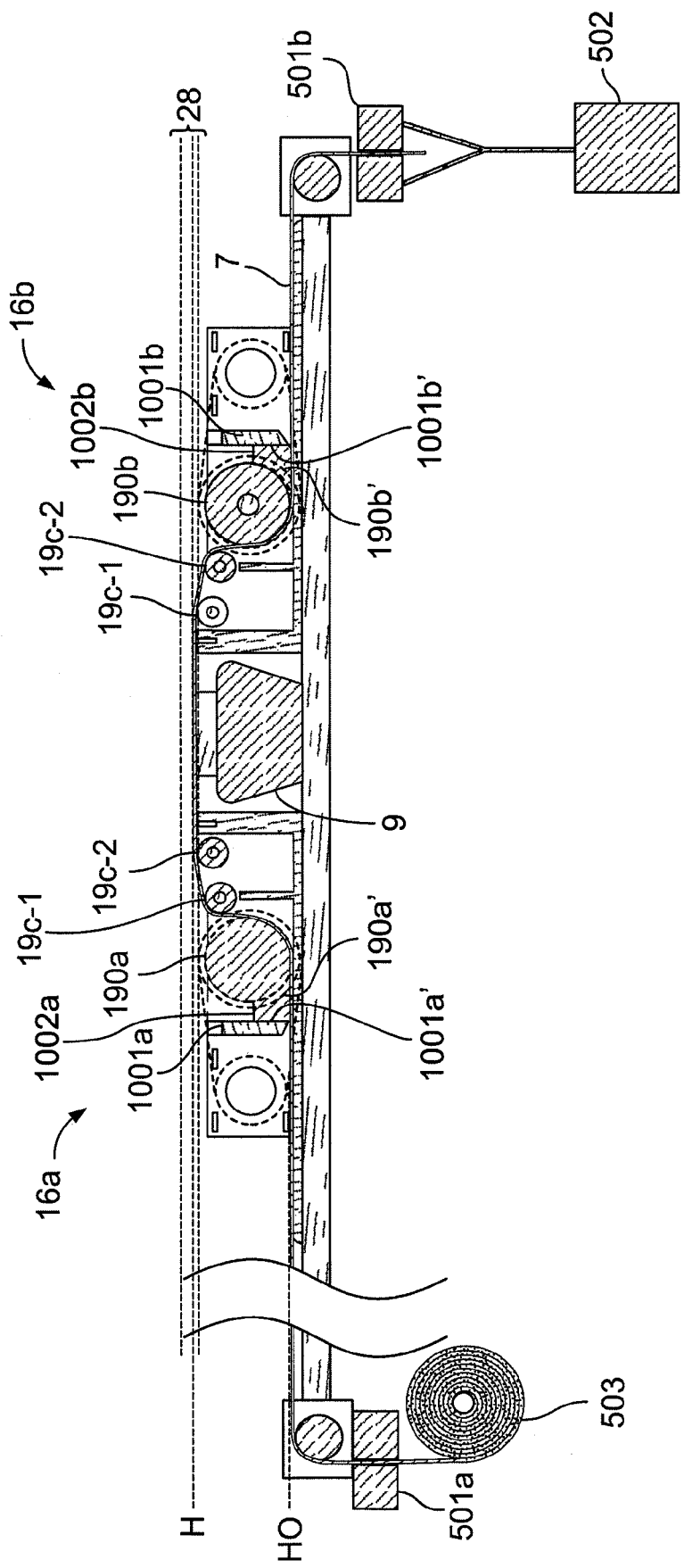
FIG. 21 is a cross sectional view taken along line 5 of FIG. 20.
Figure 22:
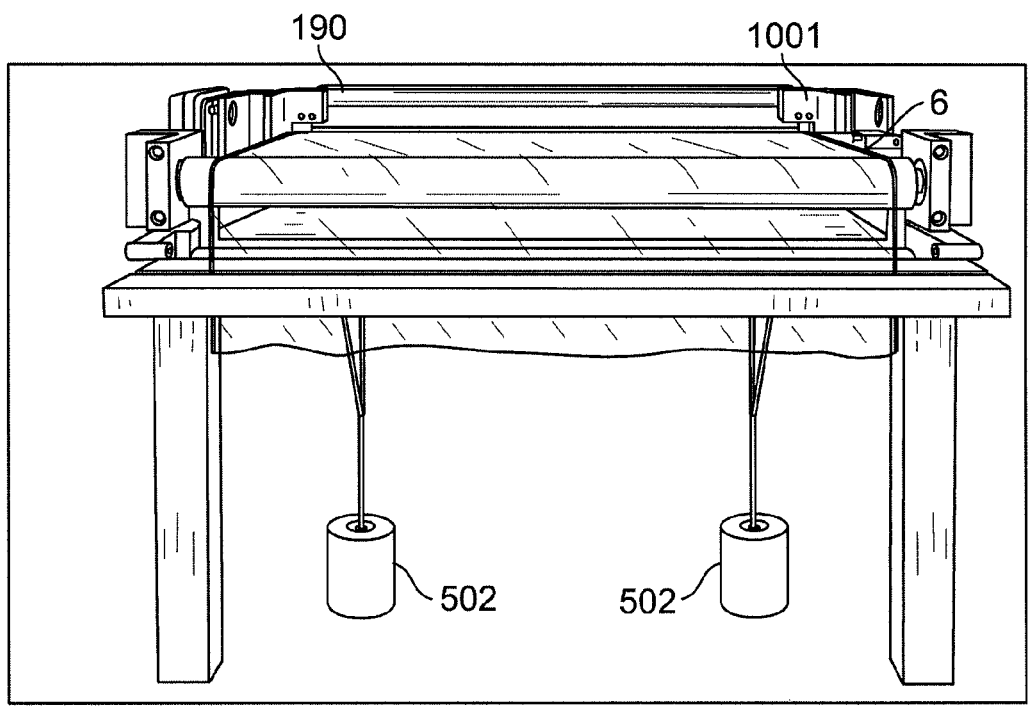
FIG. 22 is a rear perspective view of a portion of the embodiment shown in FIG. 21.

Referring to FIG. 20, in one embodiment, the moveable z-stage 14 is configured to move the plate 15 in all directions and position the plate 15 in any orientation relative to the object build area or the carrying surface 7. The moveable z-stage 14 can also be referred to as the plate positioner 14. The plate positioner 14 can engage the plate 15 via, for example, a universal joint 53 and move the plate in any direction in an x, y, and z coordinate plane, rotate 54 the plate, and tilt 55 the plate. The plate 15 can be moved in a direction substantially parallel or transverse to the object build area 28 and positioned in any orientation relative to the object build area or the carrying surface. In addition, the plate 15 can be divided into at least two segments (not shown). For example, referring to FIGS. 20 and 24B, in one embodiment a first segment 15a of the plate can hold objects being built on the left side of the plate while a second segment 15b can hold objects being built on the right side of the plate. Each segment 15a, 15b can be configured to move independently from the other and in all directions and orientations as described above, including the vertical direction such that multiply segmented plates can be extended at various distances above the foil 6.

Referring to FIGS. 11, 20, 21, and 22, tension may be applied to the foil by, for example, clamps 501a and 501b positioned on either end of the foil 6. In one embodiment, weights 502 are secured to at least one clamp 501b to keep the length of foil 6 under tension. The force of the weight 502 pulls the foil 6 taught and maintains tension along the length of the foil between the clamps 501a and 501b. In one embodiment, the foil 6 is wrapped around a roll 503 for convenient dispensing of a new length of foil when the previous length is worn out. In one embodiment, to dispense a new length of foil, the weights can be removed, the clamps 501a and 501b cab be opened, and the foil can be pulled from the roll to draw a new length of foil from the roll and through the moveable reservoirs until unused foil replaces the length of worn foil. The foil can then be cut and clamps and weight secured to fix the foil and reapply tension to the length of foil between the clamps.

Referring to FIGS. 10, 10a, 14, 15A, 15B, and 21, the foil and elements of the moveable reservoir can be arranged such that movement of the moveable reservoir moves portions of the carrying surface of the foil into and out of the object build area 28. The lower roller 190a and squeegee 1001a and lower roller 190b and squeegee 1001b can be arranged to engage the carrying surface of the foil at a position H0, outside the object build area 28. Upper rollers 19b and 19c (or 19b-2 and 19c-1) can engage the non-carrying surface 7' of the foil at or adjacent a position H to position the carrying surface 7 of the foil in the object build area 28. In such arrangement, lateral movement of the moveable reservoirs from left to right or right to left can guide the portion of the carrying surface between the upper rollers into and out of the object building area 28.

Referring to FIGS. 23A-23L, an example of various states of a bidirectional embodiment described with regard to FIGS. 14, 15A, and 15B in operation are shown. Referring to FIG. 23A, the building of a layer of object 5 may begin by positioning a previously built layer of object 5 in the object build area 28 and separate from (i.e., apart from or a distance from or out of contact with) the carrying surface 7 of the construction shape 6 (the construction shape is sometimes referred to herein as a foil).

Referring to FIG. 23B, the moveable reservoirs 16a and 16b and exposure unit 9 have begun moving from left to right across the foil 6. The movement of the moveable reservoirs to the right causes the volume of build material 1002a and 1002b to shift or sway towards the left. The shifting or swaying of the volume of build material causes mixing of the build material. Such mixing can have beneficial effects on the build material and the build. For example, mixing of the build material can prevent the settling of particles in the build material, such as fillers, and thereby can reduce the need for anti-settling agents in the build material. In addition, mixing of the volume of build material by movement of the moveable reservoirs can eliminate the need for baffles or blades for mixing the build material. Baffles and blades can introduce air bubbles which are detrimental to the building of a layer of the object as bubbles can leave voids in the layer of build material and thereby create voids in the solidified layer of the object.

In addition, the mixing of the volume of build material by movement of the moveable reservoirs can also result in equilibrating the temperature of fresh build material with that of the moveable reservoir. As described above, heating elements can apply heat to the carrying surface and/or elements of the moveable reservoir, such as the plurality of containment surfaces 22. The movement of the moveable reservoirs and shifting of the volume of build material within the containment area causes the volume of build material to contact various portions of the carrying surface and containment surfaces and thereby can increase incidence of heat transfer between the carrying surface and containment surfaces. In an embodiment, build material added to moveable reservoir 16a will reach a uniform temperature during one lateral pass of the moveable reservoir 16a (e.g., the motion of the moveable reservoir from its position in FIG. 23A to its position in FIG. 23I)

Referring again to FIG. 23B, movement of the moveable reservoir 16b from left to right causes the applicator roller 190b to apply a substantially uniform layer of build material 10 to the carrying surface 7 of the foil 6 and causes the upper rollers 19c-1 and 19c-2 to guide the portion of the foil on which the layer was applied into the object building area 28. For example, referring to FIG. 23B, moveable reservoir 16b is in first position 41, where a portion 24 of the carrying surface 7 forms one of the containment surfaces 22b of the containment area 27b for containing a volume of build material 1002b. In addition, in position 41 as shown in FIG. 23B, the portion 24 is outside of the object build area 28.

As moveable reservoir 16b continues movement to the right of position 41, toward second position 42 (as shown in FIG. 23C), the applicator roller 190b moves across the portion 24. As the applicator roller 190b moves across the portion 24, it draws build material from the volume of build material 1002b and applies a layer of build material 10 onto the portion 24. Also, as the moveable reservoir 16b continues movement to the right, the upper rollers 19c-1 and 19c-2 lift the portion 24 to position the portion 24 and the layer of build material 10 on the portion 24 into the object building area 28. When the moveable reservoir 16b reaches position 42, as shown in FIG. 23C, the portion 24 is positioned in the object build area 28 and the layer of build material 10 on the portion 24 contacts the object 5.

The movement of the applicator rollers 190a and 190b across the construction shape can help reduce or eliminate bubbles in the layer of build material 10. In one embodiment, the space between the applicator rollers 190a and 190b and the carrying surface of the construction shape can be small and, therefore, force out air bubbles drawn from the volume of build material 1002a and 1002b by, for example, squeezing the bubbles out of the layer 10, substantially preventing the bubbles from entering the layer 10, and/or forcing bubbles to the surface of the layer 10 where the bubbles are susceptible to breaking and being displaced by build material.

Referring to FIG. 23B, the applicator rollers 190a and 190b rotate in the direction of travel of their respective moveable reservoirs. In one embodiment, the surface 190a' and 190b' of the rollers 190a and 190b move at a linear velocity equal to a linear velocity of the moveable reservoirs 16a and 16b, respectively. As described above, this can, for example, help prevent the foil from wrinkling or catching at the point where the roller engages the carrying surface as the moveable reservoir moves across the foil.

Referring to FIGS. 23D through 23F, as the moveable reservoir 16b continues movement to the right, the exposure unit 9 reaches the position where it exposes a portion 10' of the layer of build material 10 in the object build area 28 to radiation to cure the portion of the layer 10' so that the portion 10' solidifies to form a solidified layer 4 of the object 5. In addition, as described above with regard to FIGS. 15A and 15B, the distance between the exposure unit 9 and moveable reservoir 16a allows for the portion of the layer 10' to experience greater curing time than if the units were positioned closer together. The increased curing time can allow the portion 10' of the layer of build material to achieve sufficient strength to withstand the peeling process performed by moveable reservoir 16a. Referring to FIGS. 23F through 23H, movement of the moveable reservoir 16a from left to right causes the upper rollers 19b-1 and 19b-2 to peel the carrying surface 7 from the portion 10' of the layer of build material that was exposed to radiation, remove from the object building area portions of the layer of build material that were not exposed to radiation, and guide the foil outside of the object build area. For example, referring to FIG. 23F, moveable reservoir 16a is in third position 63, where the portion 24 of the carrying surface 7 is in the object building area 28 and in contact with the portion 10' of the layer of build material that was exposed by the exposure unit 9. The upper roller 19b-2 is positioned to the left of the portion 24 of the carrying surface 7 in the object building area.

As moveable reservoir 16a continues movement to the right of position 63, toward fourth position 64 (shown in FIG. 23H), the upper roller 19b-2 moves across the portion 24, on the non-carrying surface 7' side of the foil 6. As the upper roller 19b-2 moves across the portion 24, it peels the portion 24 of the carrying surface from the portion 10' of the layer that was exposed to radiation and removes from the object build area 28 portion 24 and portions 10" of the layer of build material on the carrying surface that were not exposed to radiation. When the moveable reservoir 16a reaches position 64, shown in FIG. 23H, the portion 24 is outside the object build area 28 and forms one of the containment surfaces 22a of the containment area 27a for containing volume of build material 1002a.

Referring to FIG. 23I, when the moveable reservoirs 16a and 16b and the exposure unit 9 reach the end of the right to left movement, the plate 15 is moved up a distance of one layer 4 of the object to accommodate the next layer of build material to be applied on the object. The layer 10' that was exposed to radiation becomes the solidified layer 4' on which the next layer of build material will be applied. Such layer 4' is often not completely solidified.

Referring to FIG. 23J through 23L, the next layer of build material can be applied on the object during the right to left movement of the reservoirs 16a and 16b and exposure unit 9. In moving from right to left, the functions of the moveable reservoirs 16a and 16b are interchanged (as discussed above with regard to FIGS. 14, 15A, and 15B). Specifically, during right to left movement, moveable reservoir 16a will apply the layer of curable material to the carrying surface of the foil and position the carrying surface and layer of curable material thereon in the object building area while the moveable reservoir 16b will peel the carrying surface of the foil from the solidified portion of the object and position the carrying surface outside the object build area.

Referring to 23J, in one embodiment, the right to left movement can begin by moving the exposure unit 9 to the left to create distance between exposure unit 9 and moveable reservoir 16b. As discussed above, distance between the exposure unit 9 and the peeling assembly 40 allows time for the portion of the layer that is exposed to radiation to cure and achieve sufficient strength to withstand the peeling process. During the right to left movement of the embodiment shown in FIGS. 23J-23L, moveable reservoir 16b performs the peeling function.

Referring to FIG. 23K, moveable reservoirs 16a and 16b have begun moving from right the left with exposure unit 9. The movement of the moveable reservoirs to the left can cause the volume of build material 1002a and 1002b to shift or sway to the right. In addition, the applicator rollers 190a and 190b can rotate toward a direction substantially parallel to a direction of movement of their respective moveable reservoir, as shown in FIG. 23K.

Referring to FIGS. 23K and 23L, movement of the moveable reservoir 16a from right to left causes the applicator roller 190a to apply a substantially uniform layer of build material 10 to the carrying surface 7 of the foil 6 and causes the upper rollers 19b-1 and 19b-2 to guide the portion of the foil on which the layer was applied into the object building area 28. Movement of the moveable reservoir 16b from right to left causes the upper rollers 19c-1 and 19c-2 to peel the carrying surface 7 from the portion 10' of the layer of build material that was exposed to radiation, remove from the object building area portions of the layer of build material that were not exposed to radiation, and guide the foil to a position outside of the object build area. Once moveable reservoirs 16a and 16b and exposure unit 9 complete the right to left movement, the plate 15 can be moved up a distance of one layer of the object to accommodate the next layer of build material to be applied on the object and subsequent layers of the object can be formed by repeating process as described above for FIGS. 23A through 23L. Accordingly, in one embodiment, the system can be arranged such that coordinated left to right movement of the moveable reservoirs 16a and 16b (as described above with regard to FIGS. 23A through 23I) and coordinated right to left movement of the moveable reservoirs 16a and 16b (as described above with regard to FIGS. 23J through L) can result in the building of two successive layers of the object. As described above, such an arrangement can provide the benefits of, for example, reduction in cycle time and building time for creating objects.

Referring to FIGS. 24A-24I, an example of various states of a dual-unidirectional embodiment is shown. Referring to FIG. 24A, the building of a layer of object 5 and a layer of a second object 75 may begin by positioning a previously built layer of object 5 and object 75 in the object build area 28 and out of contact with the carrying surface 7 of the foil 6. Moveable reservoir 16b can be positioned in first position 41, where a portion 24 of the carrying surface 7 forms one of the containment surfaces 22b of the containment area 27b for containing a volume of build material 1002b. In addition, in position 41, as shown in FIG. 24A, the portion 24 is outside of the object build area 28.

Referring to FIG. 24B, the moveable reservoir 16b and exposure unit 9 have begun moving from left to right across the foil 6. Movement of the moveable reservoir 16b from left to right causes the applicator roller 190b to apply a substantially uniform layer of build material 10 to the carrying surface 7 of the foil 6 and causes the upper rollers 19c-1 and 19c-2 to guide the portion of the foil on which the layer was applied into the object building area 28. For example, as moveable reservoir 16b continues movement to the right of position 41, toward second position 42, the applicator roller 190b moves across the portion 24. As the applicator roller 190b moves across the portion 24, it draws build material from the volume of build material 1002b and applies a layer of build material 10 onto the portion 24. Also, as the moveable reservoir 16b continues movement to the right, the upper rollers 19c-1 and 19c-2 lift the portion 24 to position the portion 24 and the layer of build material 10 on the portion 24 into the object building area 28. When the moveable reservoir 16b reaches position 42, as shown in FIG. 24B, the portion 24 is positioned in the object build area 28 and the layer of build material 10 on the portion 24 contacts the object 5. Referring to FIG. 24C, the moveable reservoir 16b and exposure unit 9 will continue movement to the right until the portion of the layer 10 to be exposed is exposed and thereby form the exposed portion 10' of the layer 10.

Referring to FIGS. 24D and 24E, movement of the moveable reservoir 16b from right to left causes the upper roller 19c-1 to peel the carrying surface 7 from the portion 10' of the layer of build material that was exposed to radiation, remove from the object building area portions of the layer of build material that were not exposed, and guide the foil outside of the object build area. For example, referring to FIG. 24D, moveable reservoir 16b is in position 42, where the portion 24 of the carrying surface is in the object building area 28 and is in contact with the portion 10' of the layer of build material that was exposed by the exposure unit 9 to form the next layer of object 5. Referring to FIGS. 24D and 24E, as moveable reservoir 16b continues movement toward the left, toward first position 41, the upper roller 19c-1 moves across the portion 24, while engaging the non-carrying surface 7' of the foil 6. As the upper roller 19c-1 moves across the portion 24, it peels the portion 24 of the carrying surface from the portion 10' of the layer that was exposed to radiation and removes from the object build area 28 the portion 24 and portions 10'' of the layer of build material on the carrying surface that were not exposed to radiation. When the moveable reservoir 16b reaches position 41, shown in FIG. 24E, the portion 24 is outside the object build area 28 and forms one of the containment surfaces 22b of the containment area 27b for containing volume of build material 1002b. Accordingly, in the embodiment described above regarding FIGS. 24A through 24E, the moveable reservoir 16b can be used to apply a layer of build material to a portion of the carrying surface, position the layer of build material and the portion of the carrying surface on which it was applied in the object build area and in contact with an object, and peel the portion of the carrying surface from the solidified layer of the object and guide the portion of the carrying surface out of the object build area.

In addition, in the embodiment shown in FIGS. 24A through 24I, a second moveable reservoir 16a can be used to build a layer of a second object 75. Referring to FIG. 24E, moveable reservoir 16a can be positioned in third position 65, where a second portion 25 of the carrying surface 7 forms one of the containment surfaces 22a of the containment area 27a for containing a volume of build material 1002a. In addition, in position 65 as shown in FIG. 24E, the portion 25 is outside of the object build area 28.

Referring to FIG. 24F, the moveable reservoir 16a and exposure unit 9 have begun moving from right to left across the foil 6. Movement of the moveable reservoir 16a from right to left causes the applicator roller 190a to apply a substantially uniform layer of build material 10 to the carrying surface 7 of the foil 6 and causes the upper rollers 19b-1 and 19b-2 to guide the portion of the foil on which the layer was applied into the object building area 28. For example, as moveable reservoir 16a continues movement to the left of position 65, toward fourth position 66, the applicator roller 190a moves across the portion 25. As the applicator roller 190a moves across the portion 25, it draws build material from the volume of build material 1002a and applies a layer of build material 10 onto the portion 25. Also, as the moveable reservoir 16a continues movement to the left, the upper rollers 19b-1 and 19b-2 lift the portion 25 to position the portion 25 and the layer of build material 10 on the portion 25 into the object building area 28. When the moveable reservoir 16a reaches position 66, as shown in FIG. 24F, the portion 25 is positioned in the object build area 28 and the layer of build material 10 on the portion 25 contacts the object 75. Referring to FIG. 24G, the moveable reservoir 16a and exposure unit 9 will continue movement to the left until the portion of the layer 10 to be exposed is exposed and thereby forms the exposed portion 10' of the layer 10.

Referring to FIGS. 24H and 24I, movement of the moveable reservoir 16a from left to right causes the upper roller 19b-2 to peel the carrying surface 7 from the portion 10' of the layer of build material that was exposed to radiation, remove from the object building area portions 10" of the layer of build material that were not exposed, and guide the foil outside of the object build area. For example, referring to FIG. 24H, moveable reservoir 16a is in position 66, where the portion 25 of the carrying surface is in the object building area 28 and is in contact with the portion 10' of the layer of build material that was exposed by the exposure unit 9 to form the next layer of object 75. As moveable reservoir 16a moves toward the right, toward position 65, the upper roller 19b-2 moves across the portion 25, on the non-carrying surface 7' side of the foil 6. As the upper roller 19b-2 moves across the portion 25, it peels the portion 25 of the carrying surface from the portion 10' of the layer that was exposed to radiation and removes from the object build area portion 25 and portions 10" of the layer of build material on the carrying surface that were not exposed to radiation. When the moveable reservoir 16a reaches position 65, shown in FIG. 24I, the portion 25 is outside the object build area 28 and forms one of the containment surfaces 22a of the containment area 27a for containing volume of build material 1002a. Accordingly, in the embodiment described above regarding FIGS. 24E through 24I, the moveable reservoir 16a can be used to apply a layer of build material to a portion of the carrying surface, position the layer of build material and the portion of the carrying surface on which it was applied in the object build area and in contact with an object, and peel the portion of the carrying surface from the solidified layer of the object and guide the portion of the carrying surface out of the object build area. To form a successive layer of objects 5 and 75, the plate 15 can be moved up a distance of one layer of the object to accommodate the next layer of build material to be applied on the object and subsequent layers of the object can be formed by repeating process as described above for FIGS. 24A through 24I. In addition, in one example of a dual-unidirectional embodiment describe above, the moveable reservoirs 16a and 16b can be configured so that movement of moveable reservoir 16b, such as for example between the positions 41 and 42, does not overlap with movement of moveable reservoir 16a, such as for example between positions 65 and 66. The embodiments described with regard to FIGS. 24A through 24I can be used, for example, to build one object 5 from a build material of a different composition than the build material used to build object 75.

The detailed drawings, specific examples and particular formulations given serve the purpose of illustration only. While the specific embodiments of the apparatus 12, 120 described and shown herein concern building the model 5, 50 upside down, the teachings of the present invention may be applied to apparatuses that build models right side up or even any other orientation. The aspects of the present invention can also be applied in apparatuses for conventional RP and RM techniques like Selective Laser Sintering (SLS) and Stereo Lithography (SLA). In the foregoing specification, the invention has been described with reference to specific examples of embodiments of the invention. It will, however, be evident that various modifications and changes may be made therein without departing from the broader spirit and scope of the invention as set forth in the appended claims. Furthermore, the object may have any suitable size and shape. Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. However, other modifications, variations and alternatives are also possible. The specifications and drawings are, accordingly, to be regarded in an illustrative rather than in a restrictive sense. While certain embodiments detail certain optional features as further aspects of the invention, the description is meant to encompass and specifically disclose all combinations of these features unless specifically indicated otherwise or physically impossible.

The invention claimed is:

1. A system for layer-by-layer production of an object comprising:
   a construction shape comprising a carrying surface adapted for carrying a layer of build material;
   a plate comprising a holding surface adapted for holding an object in an object build area;
   a plate positioner engaging the plate, wherein the plate positioner is configured to move the plate in at least one of a direction substantially parallel to the object build area and a direction transverse to the object build area
   a moveable reservoir comprising a plurality of containment surfaces defining a containment area adapted for containing a volume of build material within the moveable reservoir;
   wherein the moveable reservoir is adapted such that the layer of build material is dispensed onto the carrying surface from the volume of build material within the moveable reservoir;
   wherein the moveable reservoir is moveable between a first position and a second position;
   wherein a portion of the carrying surface forms at least one of the plurality of containment surfaces of the moveable reservoir when the moveable reservoir is in the first position, and the portion of the carrying surface is positioned in the object build area when the moveable reservoir is in the second position; and
   an exposure unit adapted for exposing at least a portion of the layer of build material in the object build area so that the portion of the layer of build material solidifies to form a solidified layer of the object.

2. The system of claim 1 wherein the plate positioner is further configured to rotate the plate around at least one axis.

3. The system of claim 1 wherein the plate positioner is configured to move the plate rectilinearly.

4. The system of claim 1, wherein the plate positioner is further configured to position the plate in any orientation relative to the object build area or the carrying surface of the construction shape.

5. A system for layer-by-layer production of a three-dimensional object comprising:
   a construction shape comprising a carrying surface adapted for carrying a layer of build material;

a plate comprising a holding surface adapted for holding an object in an object build area;

a moveable reservoir comprising a plurality of containment surfaces defining a containment area adapted for containing a volume of build material within the moveable reservoir;

wherein the moveable reservoir is adapted such that the layer of build material is dispensed onto the carrying surface from the volume of build material within the moveable reservoir;

the moveable reservoir is movable between a first position and a second position, wherein a portion of the carrying surface of the construction shape forms at least one of the plurality of containment surfaces and is adapted to be in contact with the volume of build material when the moveable reservoir is in the first position, and the portion of the carrying surface of the construction shape is positioned in the object build area and adapted to position the layer of build material in the object build area when the reservoir is in the second position; and wherein the plurality of containment surfaces includes a divider, wherein the divider divides the containment area of the moveable reservoir into a first division of the containment area and a second division of the containment area and forms a fluid seal between the first division and the second division.

6. The system of claim 5 wherein the first division of the containment area is adapted to contain a first build material and the second division of the containment area is adapted to contain a second build material of a different composition than the first build material.

7. The system of claim 5 wherein the moveable reservoir further comprises a guide surface engaging the construction shape, wherein the guide surface is moveable with the moveable reservoir such that the guide surface guides the construction shape to position the layer of build material in the object build area when the movable reservoir is moved to the second position.

8. A system for layer-by-layer production of an object comprising:

a construction shape comprising a carrying surface adapted for carrying a layer of build material;

a plate comprising a holding surface adapted for holding an object in an object build area, wherein the plate comprises at least two segments, wherein each segment is configured to move in at least one of a direction substantially parallel to the object build and a direction transverse to the object build area;

a guide surface engaging the construction shape and adapted to guide the construction shape to position the layer of build material in the object build area and in contact with the object;

an exposure unit adapted for exposing at least a portion of the layer of build material in the object build area so that the portion of the layer of build material solidifies to form a solidified layer of the object.

9. The system of claim 8 wherein the at least two segments are configured to move independently.

10. The system of claim 1 wherein the moveable reservoir is configured to move in at least one of a direction parallel to the object build area and a direction transverse to the object build area.

11. A system for layer-by-layer production of an object comprising:

a construction shape comprising a carrying surface adapted for carrying a layer of build material;

a plate comprising a holding surface adapted for holding an object in an object build area;

a moveable reservoir comprising a plurality of containment surfaces defining a containment area adapted for containing a volume of build material within the moveable reservoir;

wherein the moveable reservoir is adapted such that the layer of build material is dispensed onto the carrying surface from the volume of build material within the moveable reservoir;

wherein the moveable reservoir is moveable between a first position and a second position;

wherein a portion of the carrying surface forms at least one of the plurality of containment surfaces of the moveable reservoir when the moveable reservoir is in the first position, and the portion of the carrying surface is positioned in the object build area when the moveable reservoir is in the second position;

a second moveable reservoir comprising a second plurality of containment surfaces defining a second containment area adapted for containing a second volume of build material within the second moveable reservoir;

wherein the second moveable reservoir is moveable between a third position and a fourth position;

wherein at least one of the second plurality of containment surfaces of the second moveable reservoir comprises a second portion of the carrying surface when the second moveable reservoir is in the third position, and the second portion of the carrying surface is positioned in the object build area when the moveable reservoir is in the fourth position;

wherein the moveable reservoir and the second moveable reservoir are configured such that movement of the moveable reservoir between the first position and the second position does not overlap with movement of the second moveable reservoir between third position and the fourth position; and an exposure unit adapted for exposing at least a portion of the layer of build material in the object build area so that the portion of the layer of build material solidifies to form a solidified layer of the object.

12. A method for layer-by-layer production of an object comprising:

a) positioning an object in an object build area and out of contact with a portion of a carrying surface of a construction shape, wherein the portion of the carrying surface of the construction shape is positioned outside of the object build area, and wherein the construction shape comprises a carrying surface adapted for carrying a layer of build material;

b) positioning a moveable reservoir in a first position, wherein the moveable reservoir comprises a plurality of containment surfaces defining a containment area adapted for containing a volume of build material within the moveable reservoir, and wherein at least one of the plurality of containment surfaces is formed by the portion of the carrying surface of the construction shape, wherein the portion of the carrying surface is positioned outside of the object build area when the moveable reservoir is in the first position;

c) moving the moveable reservoir to a second position, wherein movement of the moveable reservoir from first position to the second position moves the portion of the carrying surface such that the portion of the carrying surface is positioned in the object build area when the moveable reservoir is in the second position;

d) applying on the portion of the carrying surface the a layer of build material from the volume of build material within the moveable reservoir during movement of the moveable reservoir from the first position to the second position e) contacting the object in the object build area with at least a portion of the layer of build material when the moveable reservoir is in the second position; and f) exposing at least a portion of the layer of build material in the object build area so that the portion of the layer of build material solidifies to form a solidified layer of the object;

(g) positioning the object in a second location in the object build area, wherein the second location is different than a first location resulting from the positioning of the object in the object build area of step (a); and repeating steps (b) though (f) to make a second solidified layer of the object.

13. A method for layer-by-layer production of an object comprising:

a) positioning an object in an object build area and out of contact with a portion of a carrying surface of a construction shape, wherein the portion of the carrying surface of the construction shape is positioned outside of the object build area;

b) positioning a moveable reservoir in a first position, wherein the moveable reservoir comprises a plurality of containment surfaces defining a containment area adapted for containing a volume of build material within the moveable reservoir, and wherein at least one of the plurality of containment surfaces is formed by the portion of the carrying surface of the construction shape, wherein the portion of the carrying surface is positioned outside of the object build area when the moveable reservoir is in the first position;

c) moving the moveable reservoir to a second position, wherein movement of the moveable reservoir from first position to the second position moves the portion of the carrying surface such that the portion of the carrying surface is positioned in the object build area when the moveable reservoir is in the second position;

d) applying a layer of build material on the portion of the carrying surface during movement of the moveable reservoir from the first position to the second position e) contacting the object in the object build area with at least a portion of the layer of build material when the moveable reservoir is in the second position;

f) exposing at least a portion of the layer of build material in the object build area so that the portion of the layer of build material solidifies to form a solidified layer of the object;

g) positioning a second object in an object build area and out of contact from a second portion of the carrying surface of the construction shape, wherein the second portion of the carrying surface is positioned outside of the object build area;

h) positioning a second moveable reservoir in a third position, wherein the second moveable reservoir comprises a second plurality of containment surfaces defining a second containment area adapted for containing a second volume of build material within the second moveable reservoir, and wherein at least one of the second plurality of containment surfaces comprises the second portion of the carrying surface of the construction shape when the second moveable reservoir is in the third position;

i) moving the second moveable reservoir to a fourth position, wherein the second portion of the carrying surface is positioned in the object build area when the second moveable reservoir is in the fourth position;

j) applying a second layer of build material on the second portion of the carrying surface during movement of the moveable reservoir from the third position to the fourth position so that the second layer of build material contacts the second object in the object build area when the second moveable reservoir is in the fourth position; and k) exposing at least a portion of the second layer of build material in the object build area so that the portion of the second layer of build material solidifies to form a solid layer of the second object.

14. A system for layer-by-layer production of an object comprising:

a construction shape comprising a carrying surface adapted for carrying a layer of build material;

a plate comprising a holding surface adapted for holding an object in an object build area;

a moveable reservoir comprising a plurality of containment surfaces defining a containment area adapted for containing a volume of build material within the moveable reservoir;

wherein the moveable reservoir is moveable between a first position and a second position;

wherein a portion of the carrying surface forms at least one of the plurality of containment surfaces of the moveable reservoir when the moveable reservoir is in the first position, and the portion of the carrying surface is positioned in the object build area when the moveable reservoir is in the second position;

wherein at least one of the plurality of containment surfaces includes a squeegee engaging the carrying surface of the construction shape;

wherein a surface of the squeegee in contact with the carrying surface is angled in relation to the carrying surface and adapted for scraping the build material from the carrying surface;

wherein the construction shape is a flexible foil and wherein the squeegee comprises a cut-out defined in the surface of the squeegee, the cut-out is positioned adjacent an edge of the flexible foil, wherein the cut-out is dimensioned to permit the edge of the flexible foil to curl into at least a portion of the cut-out; and an exposure unit adapted for exposing at least a portion of the layer of build material in the object build area so that the portion of the layer of build material solidifies to form a solidified layer of the object.

15. A system for layer-by-layer production of a three-dimensional object comprising:

a construction shape comprising a carrying surface adapted for carrying a layer of build material;

a plate comprising a holding surface adapted for holding an object in an object build area;

a moveable reservoir comprising a plurality of containment surfaces defining a containment area adapted for containing a volume of build material within the moveable reservoir;

the moveable reservoir is movable between a first position and a second position, wherein a portion of the carrying surface of the construction shape forms at least one of the plurality of containment surfaces and is adapted to be in contact with the volume of build material when the moveable reservoir is in the first position, and the portion of the carrying surface of the construction shape is positioned in the object build area and adapted to position the layer of build material in the object build area when the reservoir is in the second position;

wherein at least one of the plurality of containment surfaces includes a squeegee engaging the carrying surface of the construction shape;

wherein a surface of the squeegee in contact with the carrying surface is angled in relation to the carrying surface and adapted for scraping the build material from the carrying surface; and wherein the construction shape is a flexible foil and wherein the squeegee comprises a cut-out defined in the surface of the squeegee, the cut-out is positioned adjacent an edge of the flexible foil, wherein the cut-out is dimensioned to permit the edge of the flexible foil to curl into at least a portion of the cut-out.

16. The system of claim 14 wherein the moveable reservoir further comprises a guide surface engaging the construction shape, wherein the guide surface is moveable with the moveable reservoir such that the guide surface guides the construction shape to position the carrying surface in the object build area when the movable reservoir is moved to the second position.

17. The system of claim 14 wherein an angle between the squeegee and the carrying surface is about 10 degrees.

18. The system of claim 14 further comprising a curling guide engaging the flexible foil and adapted to curl the edge of the edge of the flexible foil.

19. The system of claim 18 wherein the curling guide is a component of the squeegee.

\* \* \* \* \*